United States Patent [19]

Porter et al.

[11] 4,312,036

[45] Jan. 19, 1982

[54] INSTRUCTION BUFFER APPARATUS OF A CACHE UNIT

[75] Inventors: Marion G. Porter, Phoenix; Robert W. Norman, Jr., Glendale, both of Ariz.

[73] Assignee: Honeywell Information Systems Inc., Waltham, Mass.

[21] Appl. No.: 968,050

[22] Filed: Dec. 11, 1978

[51] Int. Cl.³ .............................................. G06F 9/30
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,292,153 | 12/1966 | Barton et al. | 364/200 |
| 3,401,376 | 9/1968 | Barnes et al. | 364/200 |
| 3,588,829 | 6/1971 | Boland et al. | 364/200 |
| 3,699,533 | 10/1972 | Hunter | 364/200 |
| 3,928,857 | 12/1975 | Carter et al. | 364/200 |
| 4,047,244 | 9/1977 | Finkemeyer et al. | 364/200 |

*Primary Examiner*—Gareth D. Shaw
*Assistant Examiner*—Thomas M. Heckler
*Attorney, Agent, or Firm*—Faith F. Driscoll; Nicholas Prasinos

[57] ABSTRACT

A data processing system comprises a data processing unit coupled to a cache unit which couples to a main store. The cache unit includes a cache store organized into a plurality of levels, each for storing blocks of information in the form of data and instructions. The cache unit further includes an instruction buffer having first and second sections for storing instructions received from main store. Each instruction buffer section includes a plurality of word storage locations, each location having a number of bit positions. A predetermined bit position of each location is used to indicate when an instruction word has been written into the location. Control apparatus coupled to each of the buffer sections is operative to reset all of the word locations to binary ZEROS when a command requesting an instruction block from main store is ready to be transferred thereto. It is set to a binary ONE state when an instruction word is loaded into the location. Instruction buffer ready circuits included within the control apparatus are conditioned by the states of the predetermined bit positions of the locations to generate output signals to the processing unit enabling the transfer of requested instruction words to the processing unit as soon as they are received from main store.

39 Claims, 16 Drawing Figures

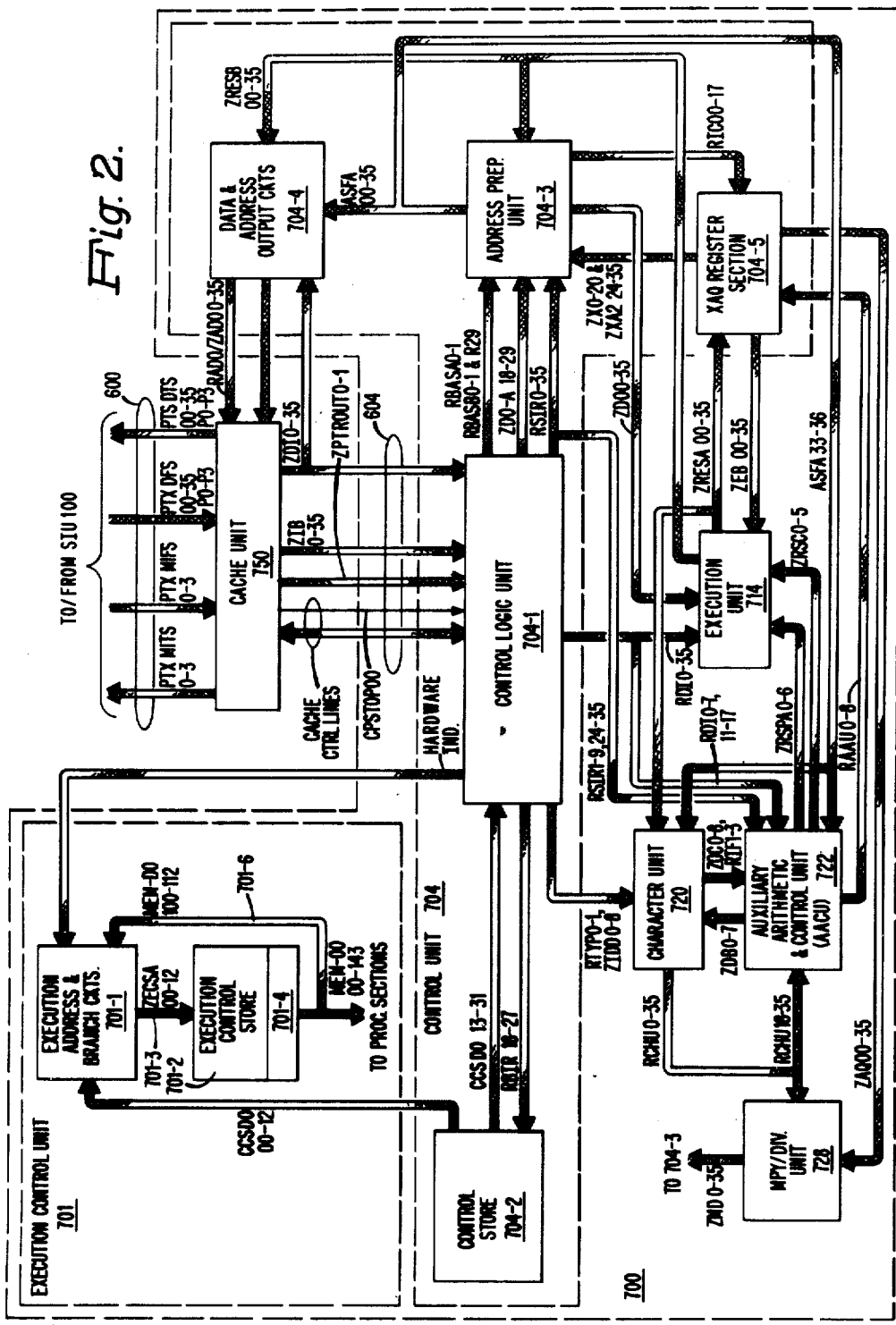

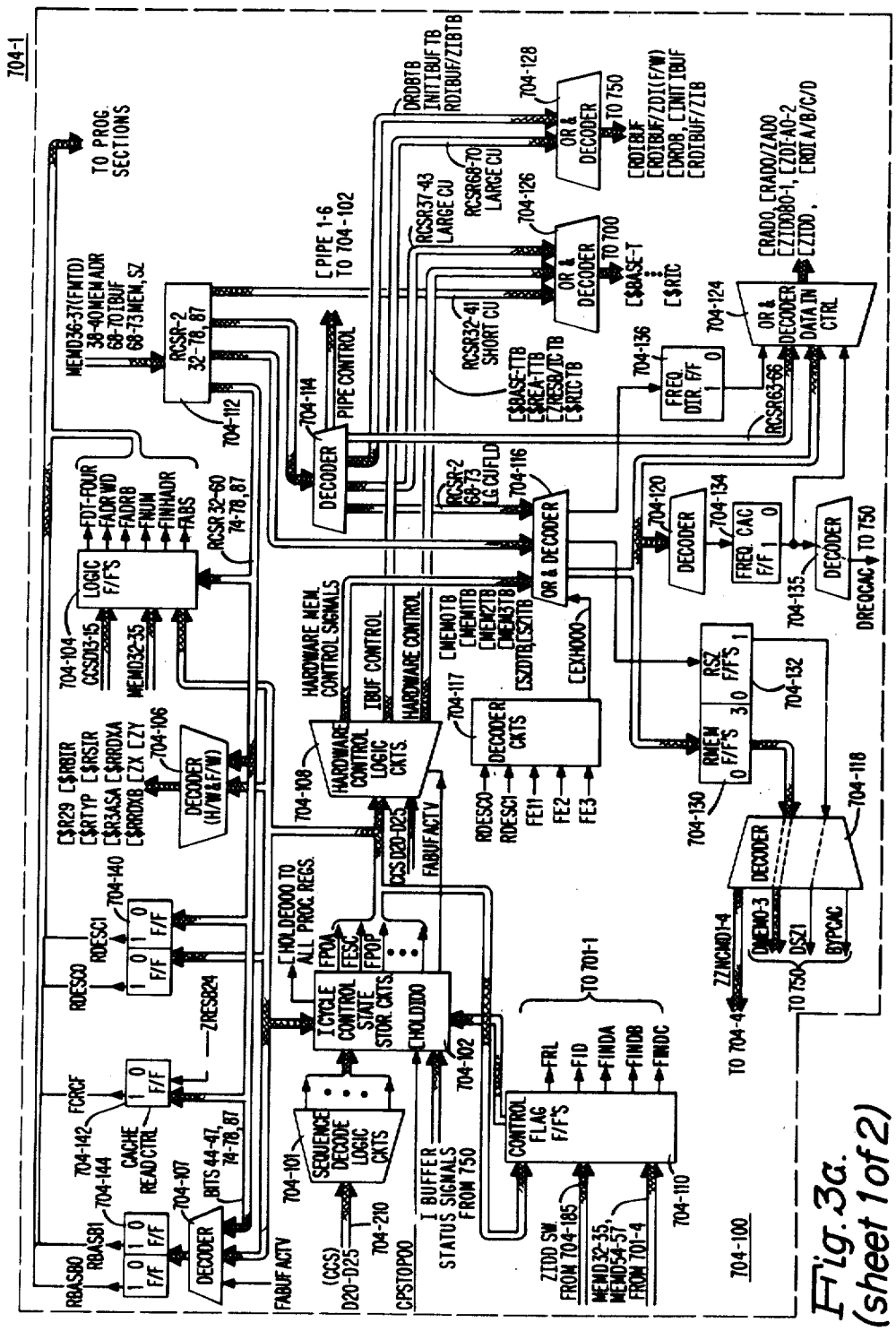
Fig. 3a. (sheet 1 of 2)

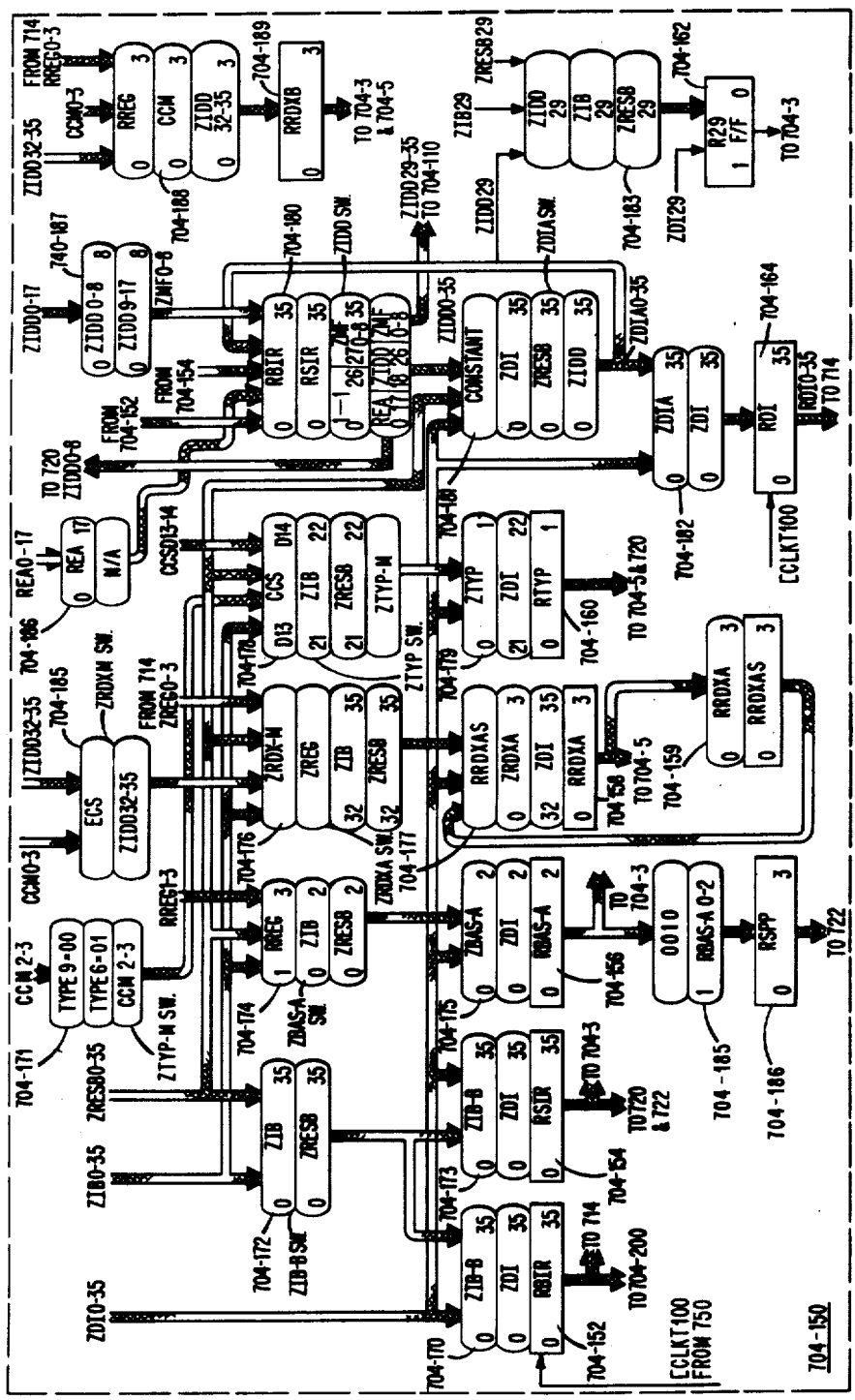
Fig. 3c. (sheet 2 of 2)

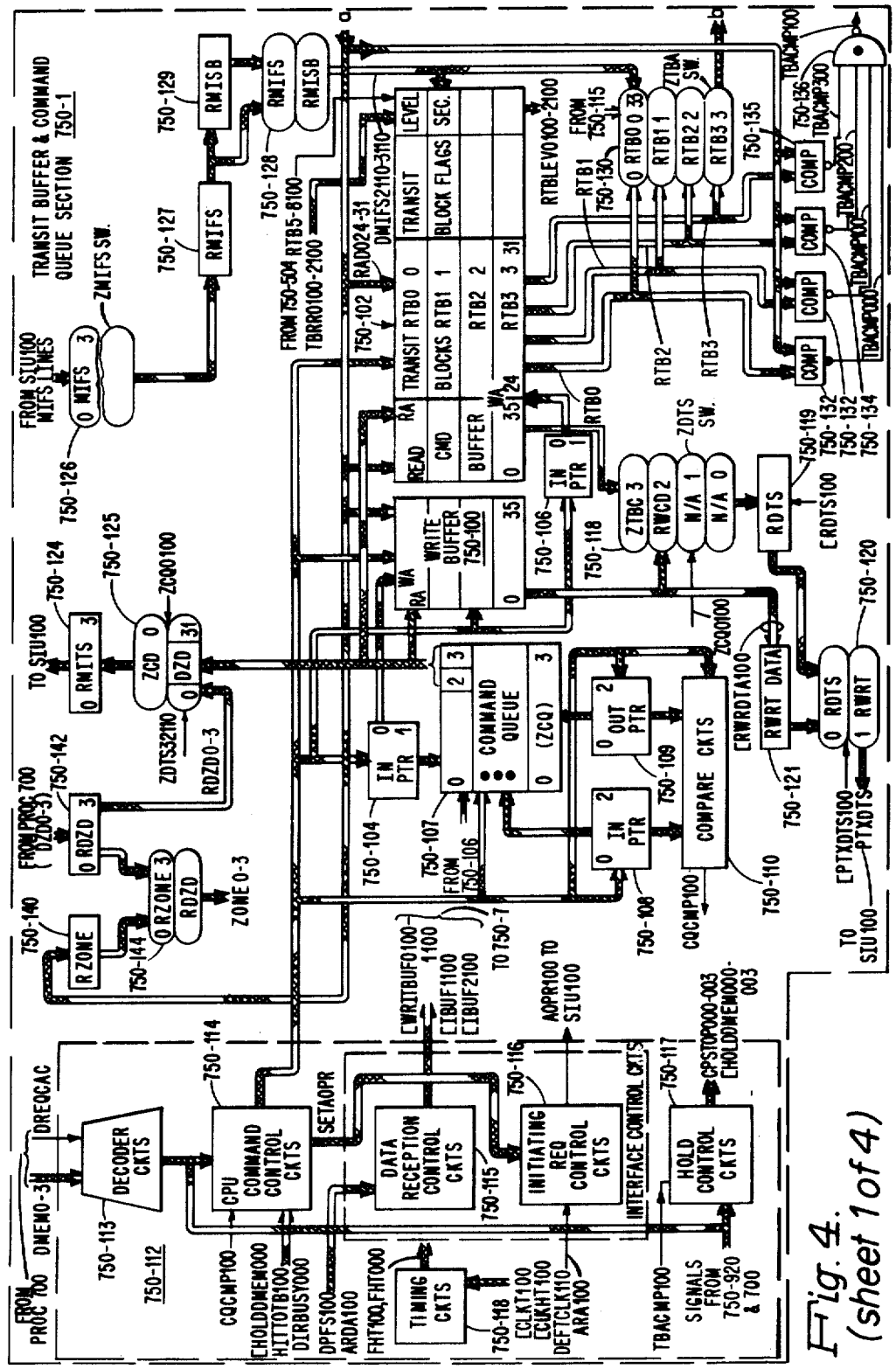
Fig. 4. (sheet 1 of 4)

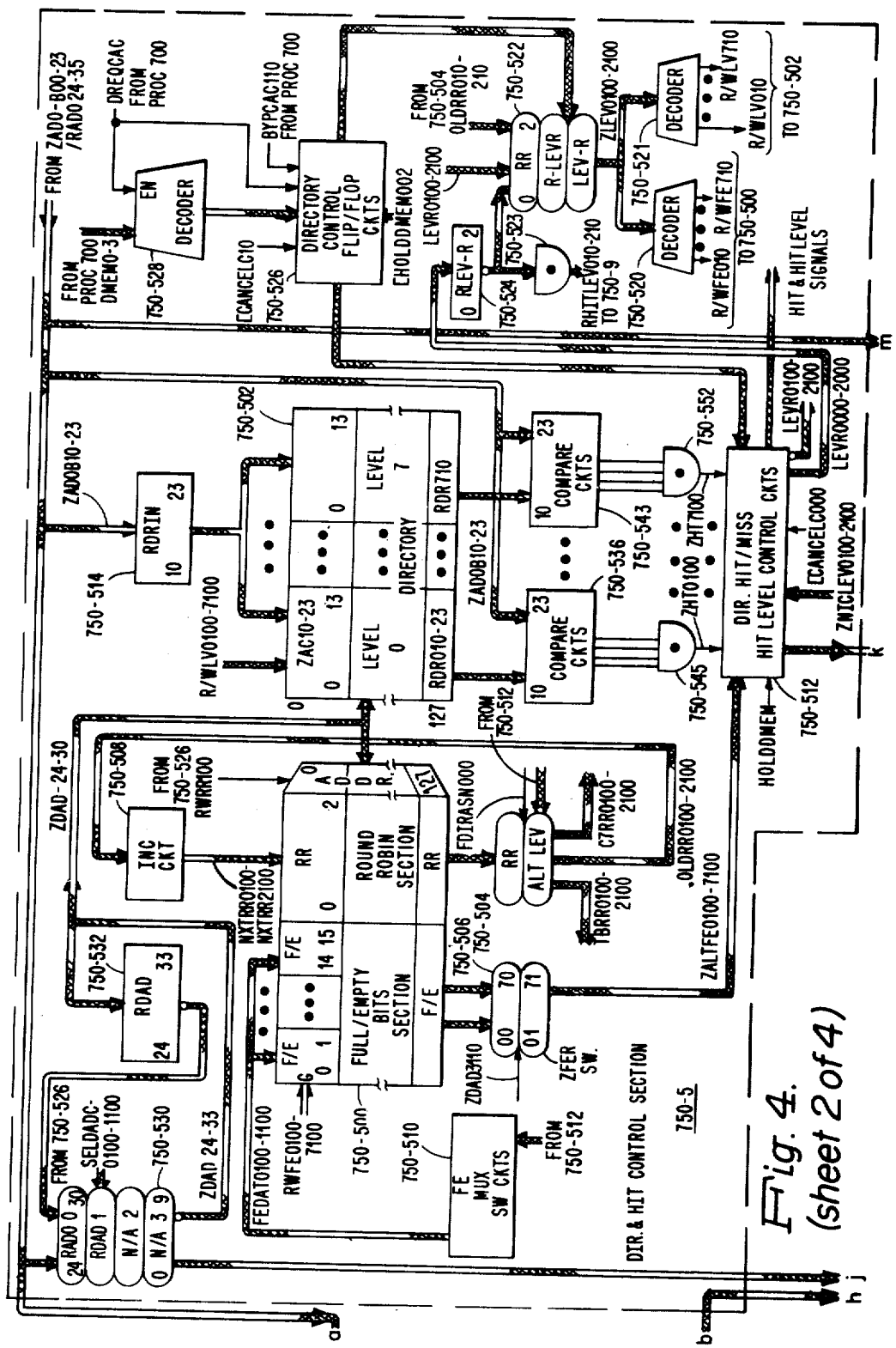
Fig. 4. (sheet 2 of 4)

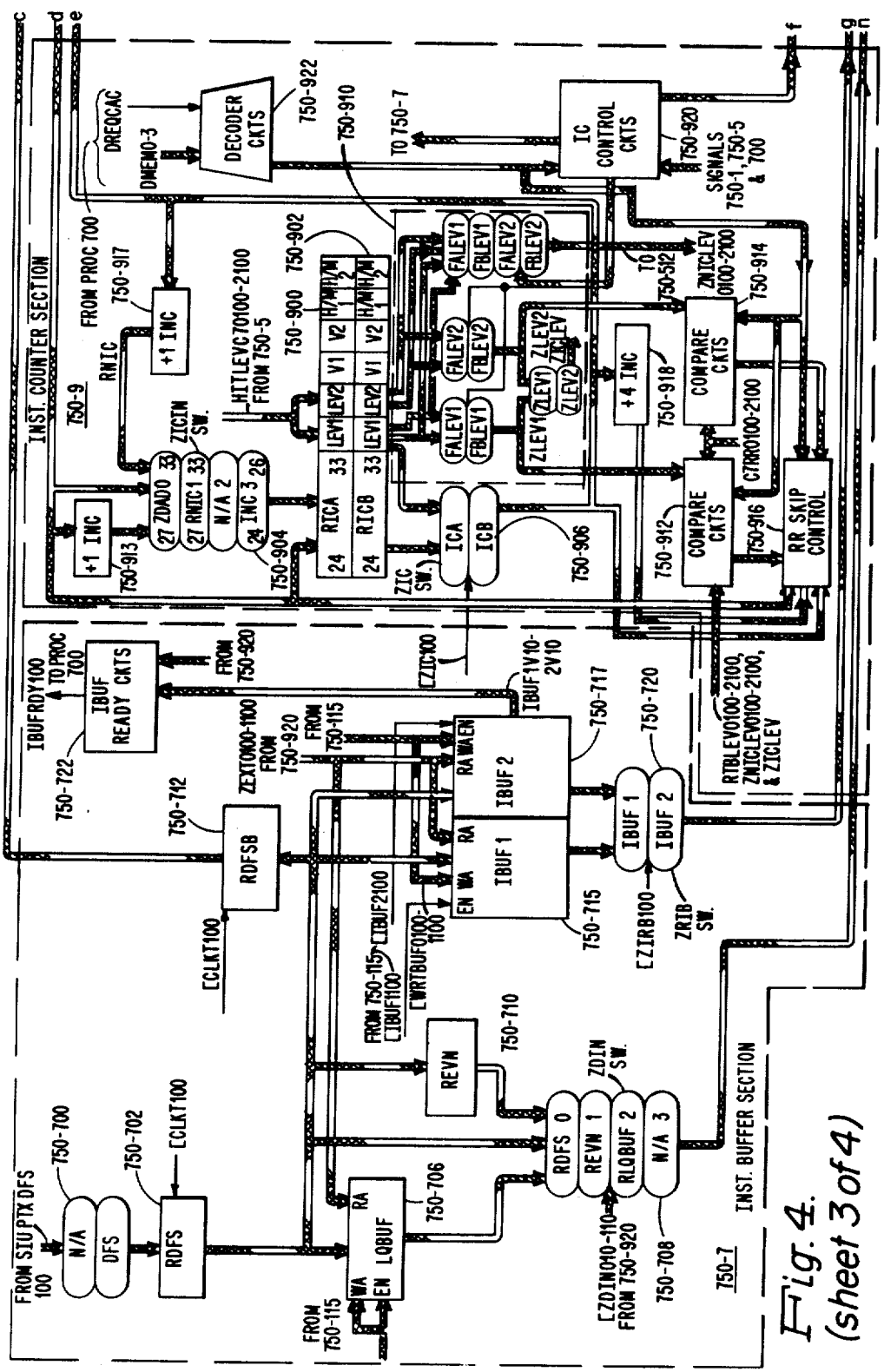
Fig. 4. (sheet 3 of 4)

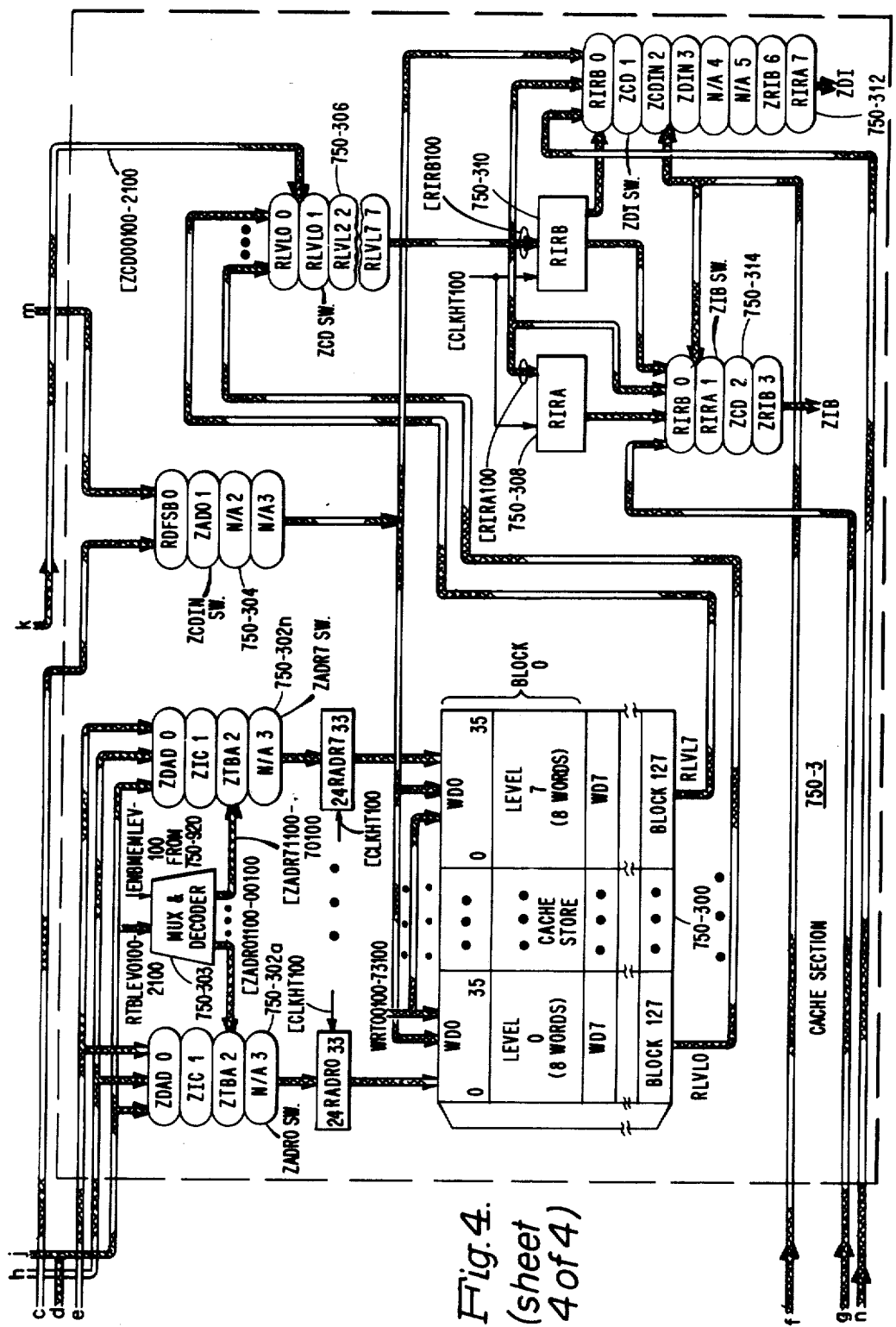
Fig. 4. (sheet 4 of 4)

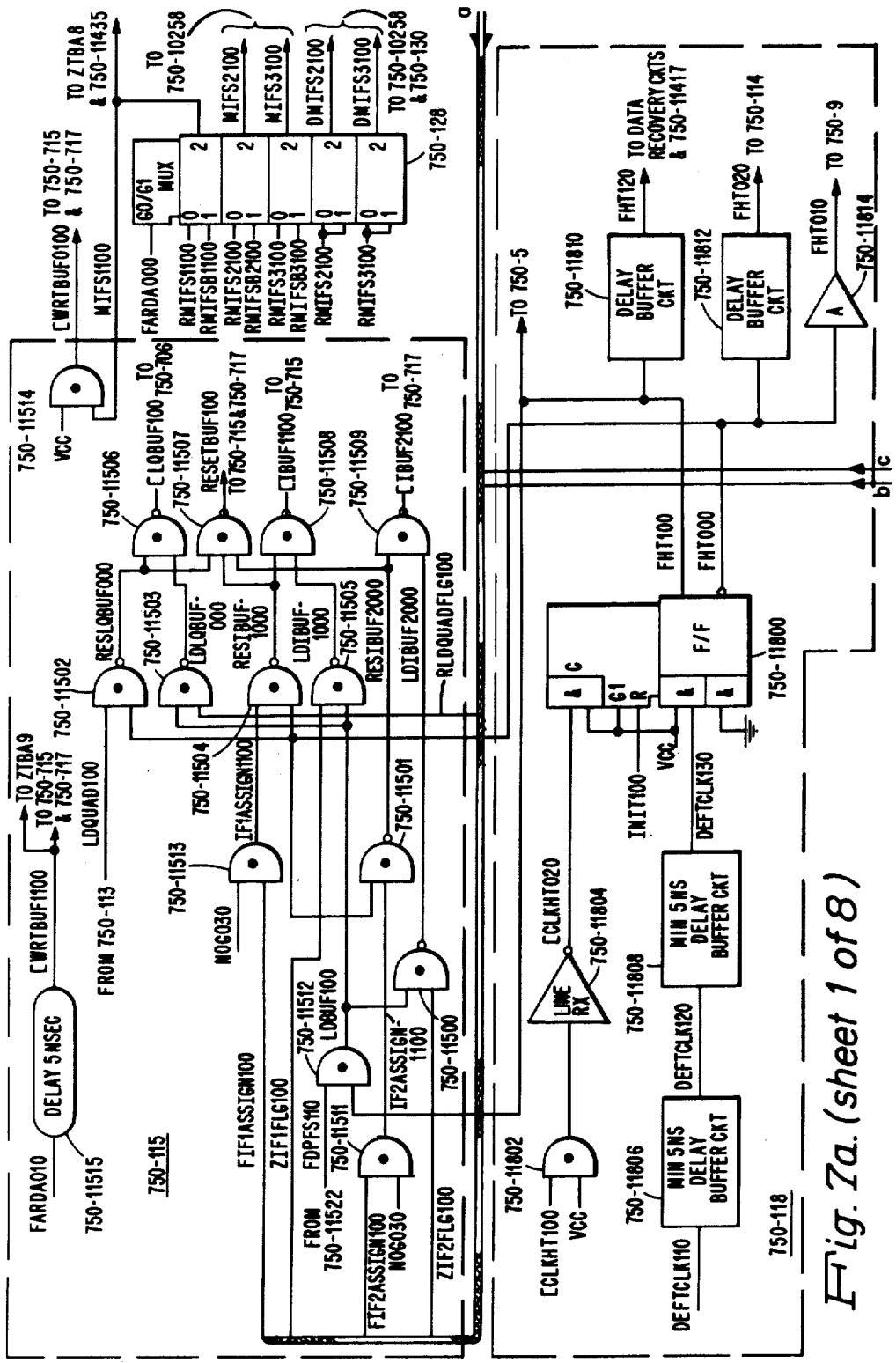
Fig. 7a. (sheet 1 of 8)

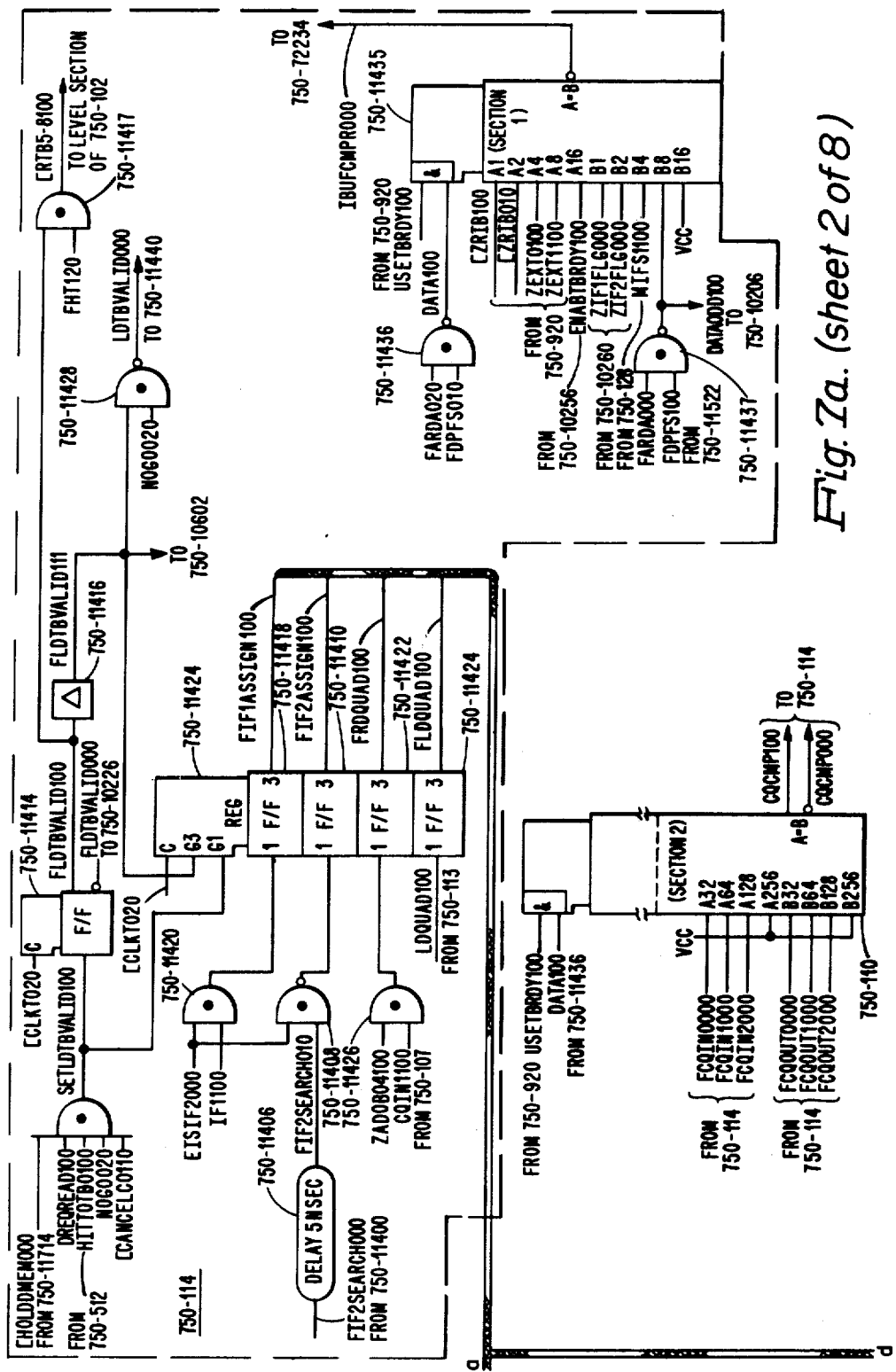
Fig. 7a. (sheet 2 of 8)

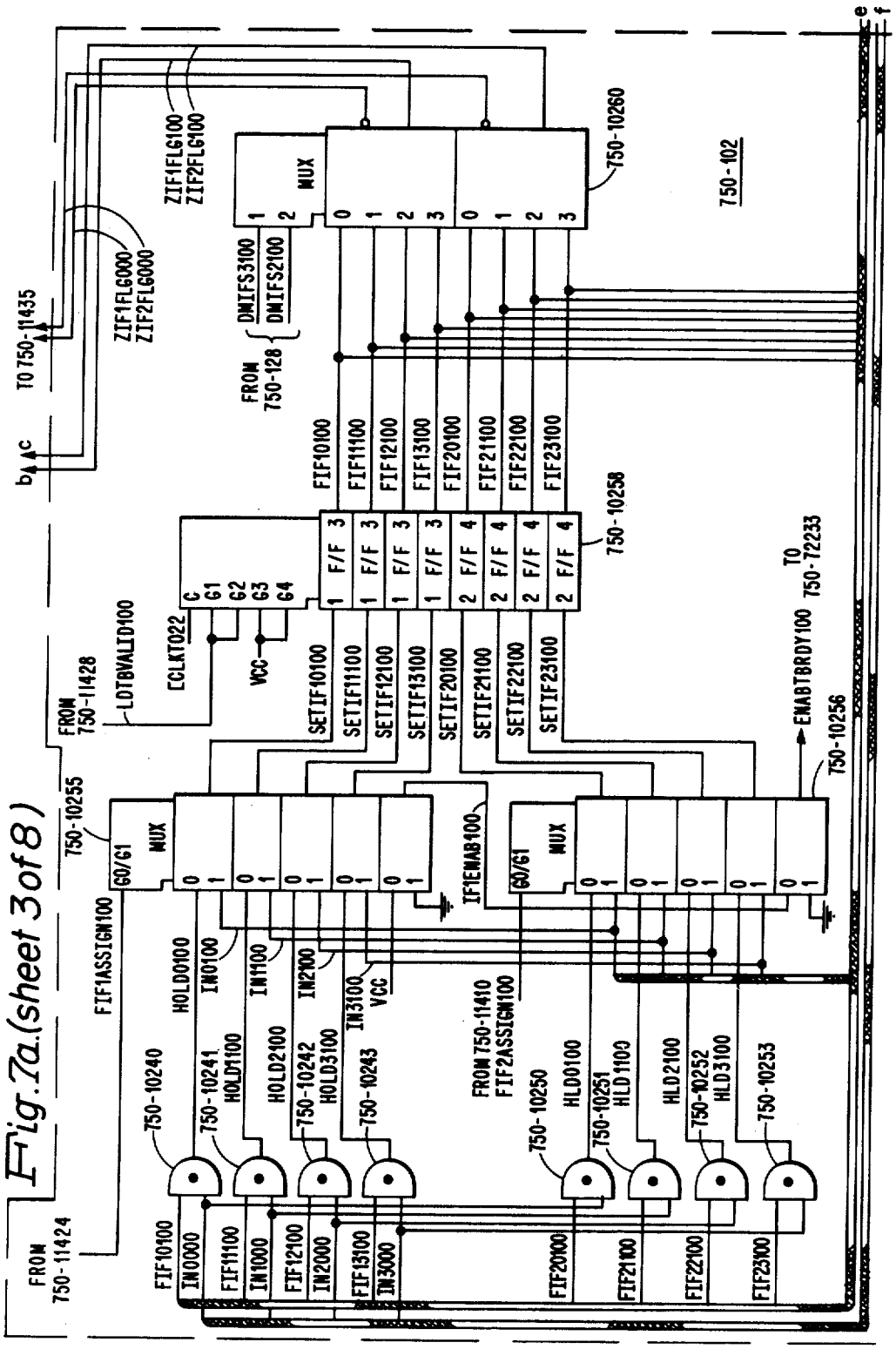
Fig.7a (sheet 3 of 8)

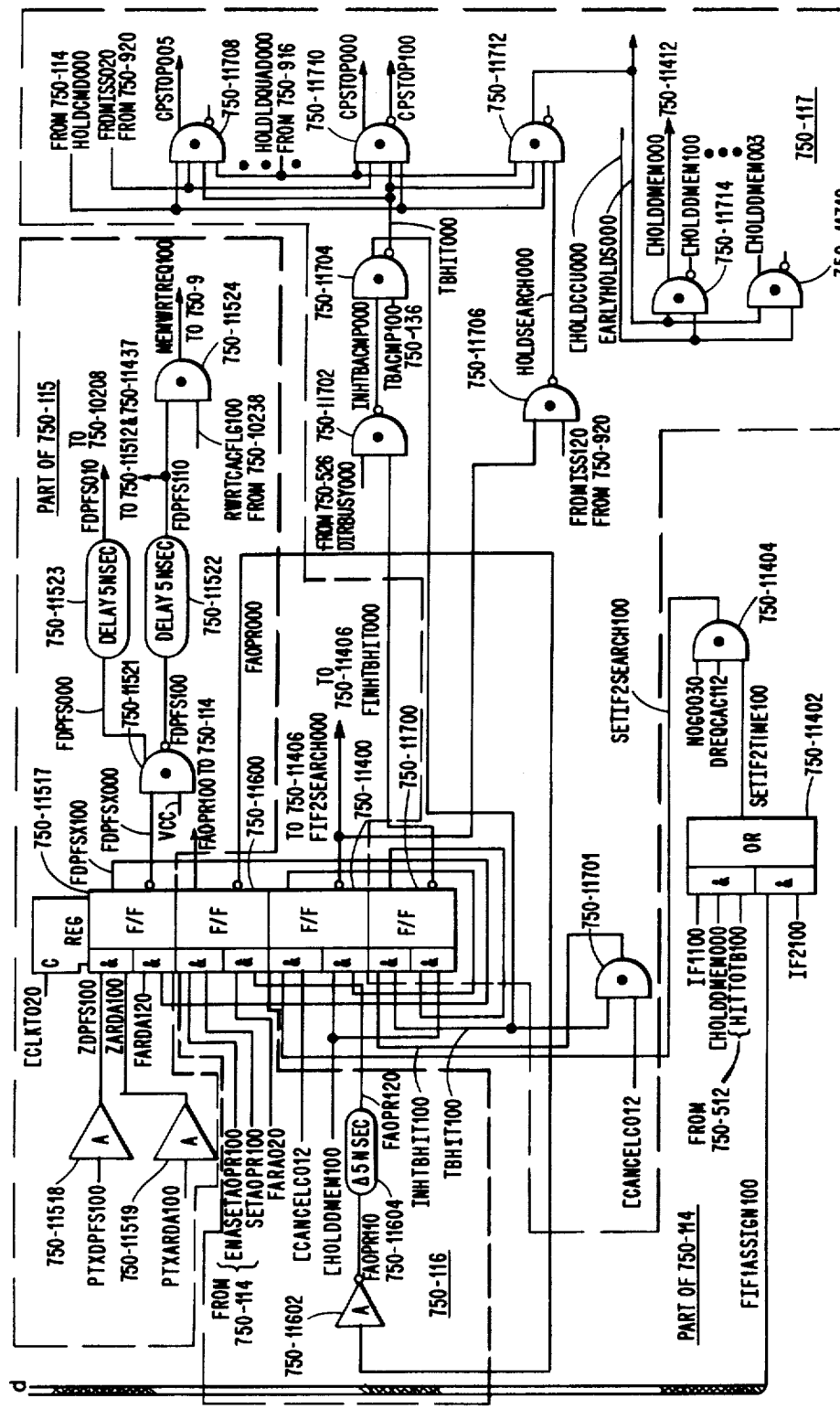
Fig. 7a. (sheet 4 of 8)

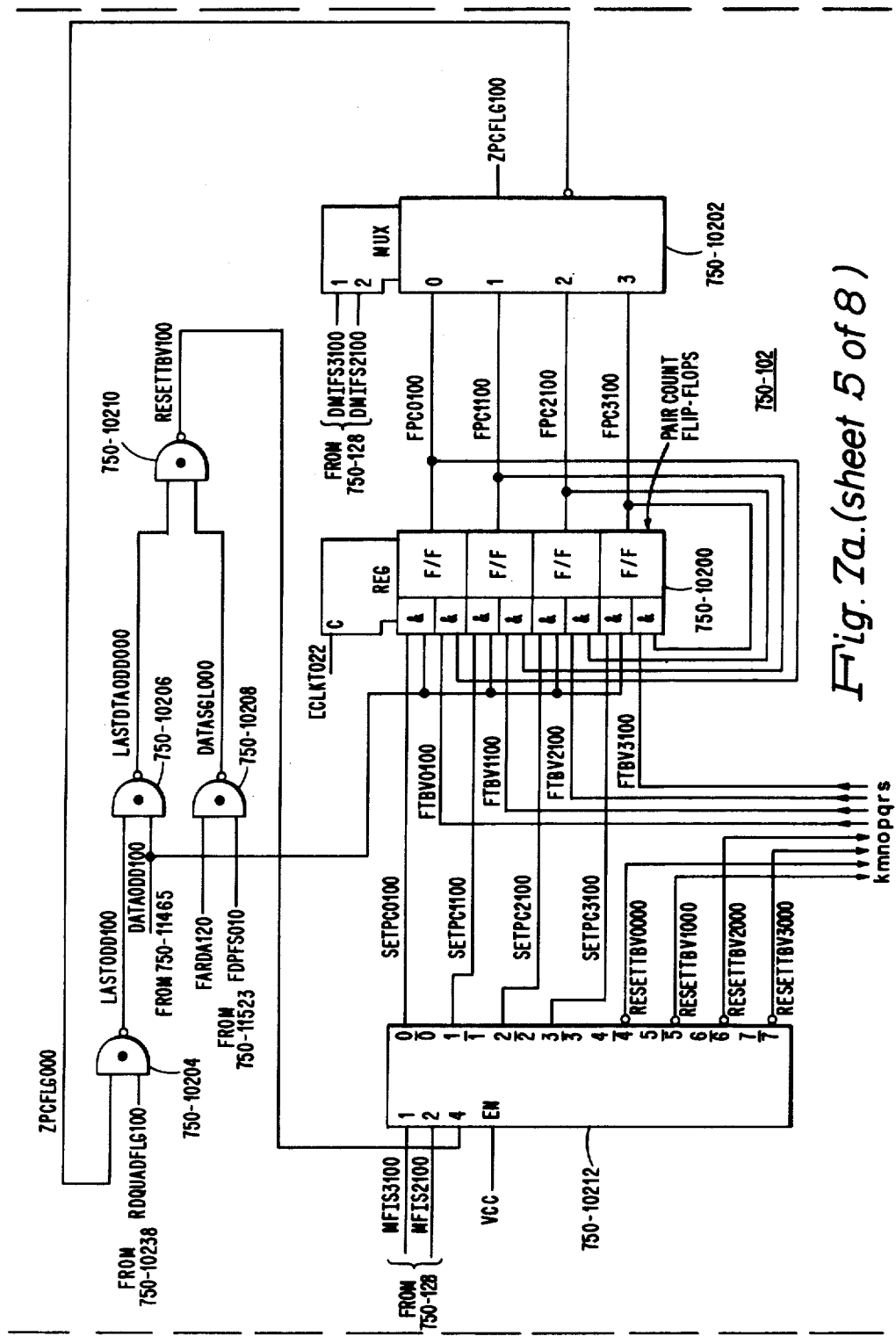
Fig. 7a.(sheet 5 of 8)

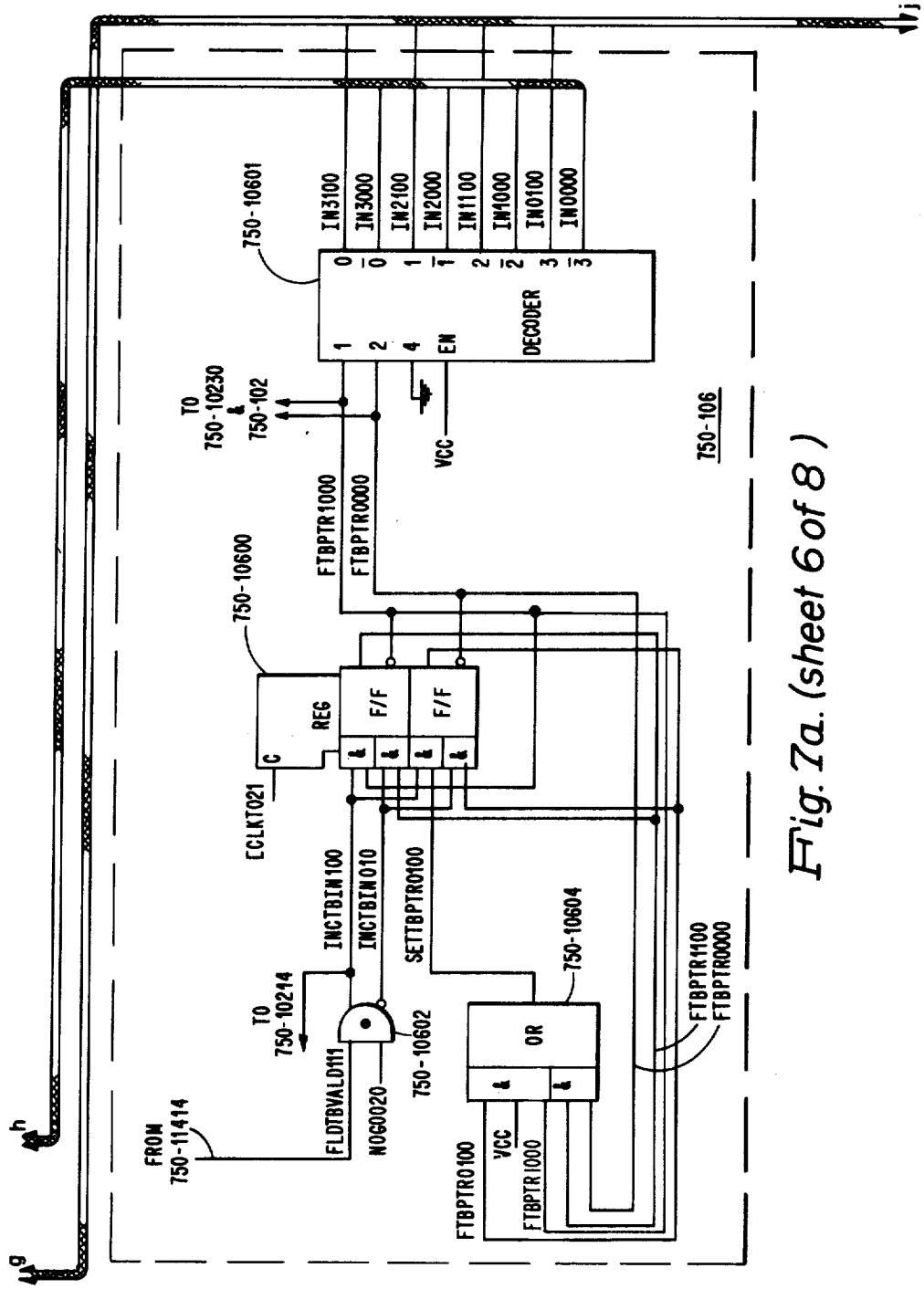
Fig.7a.(sheet 6 of 8)

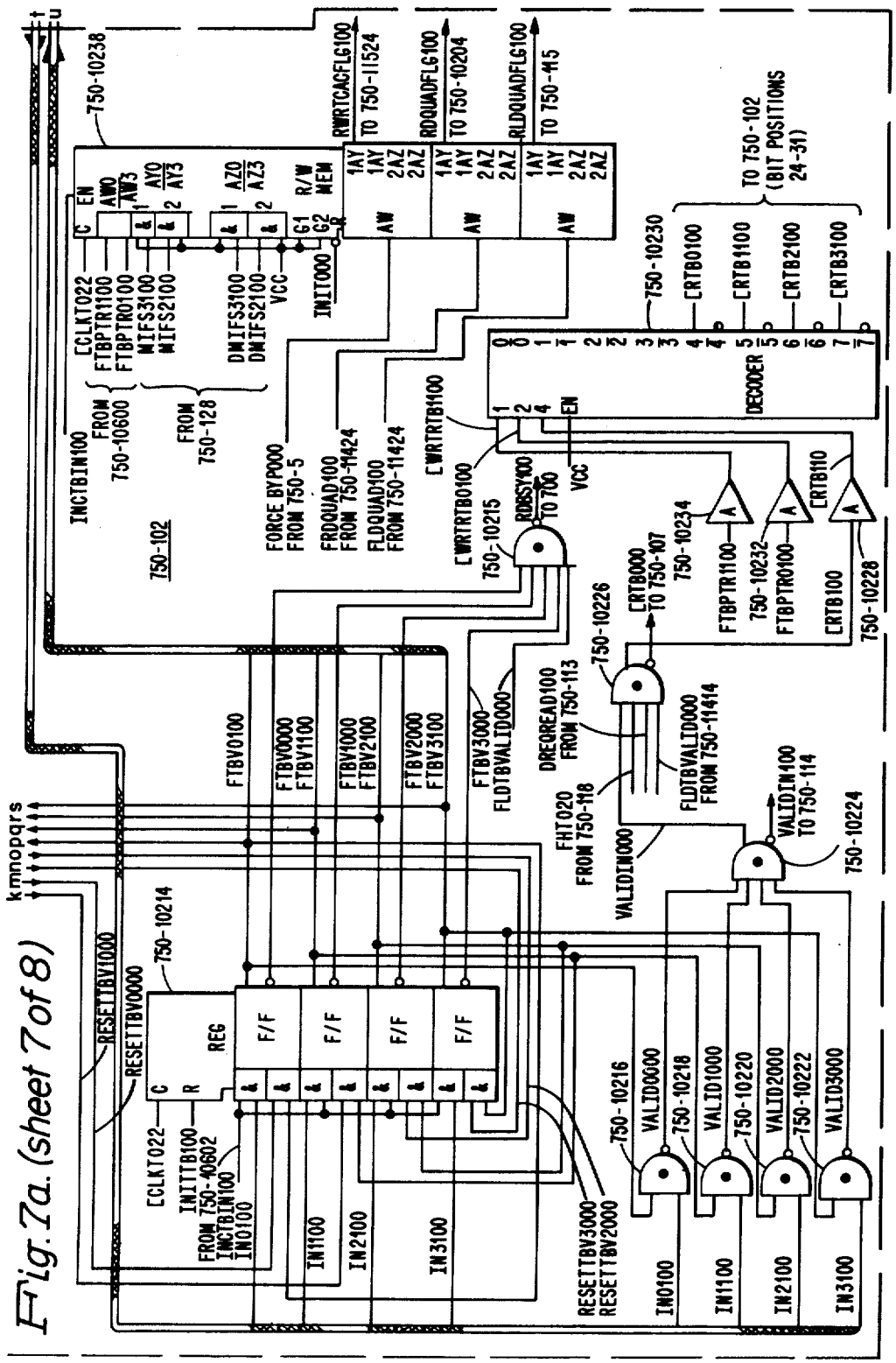
Fig.7a.(sheet 7 of 8)

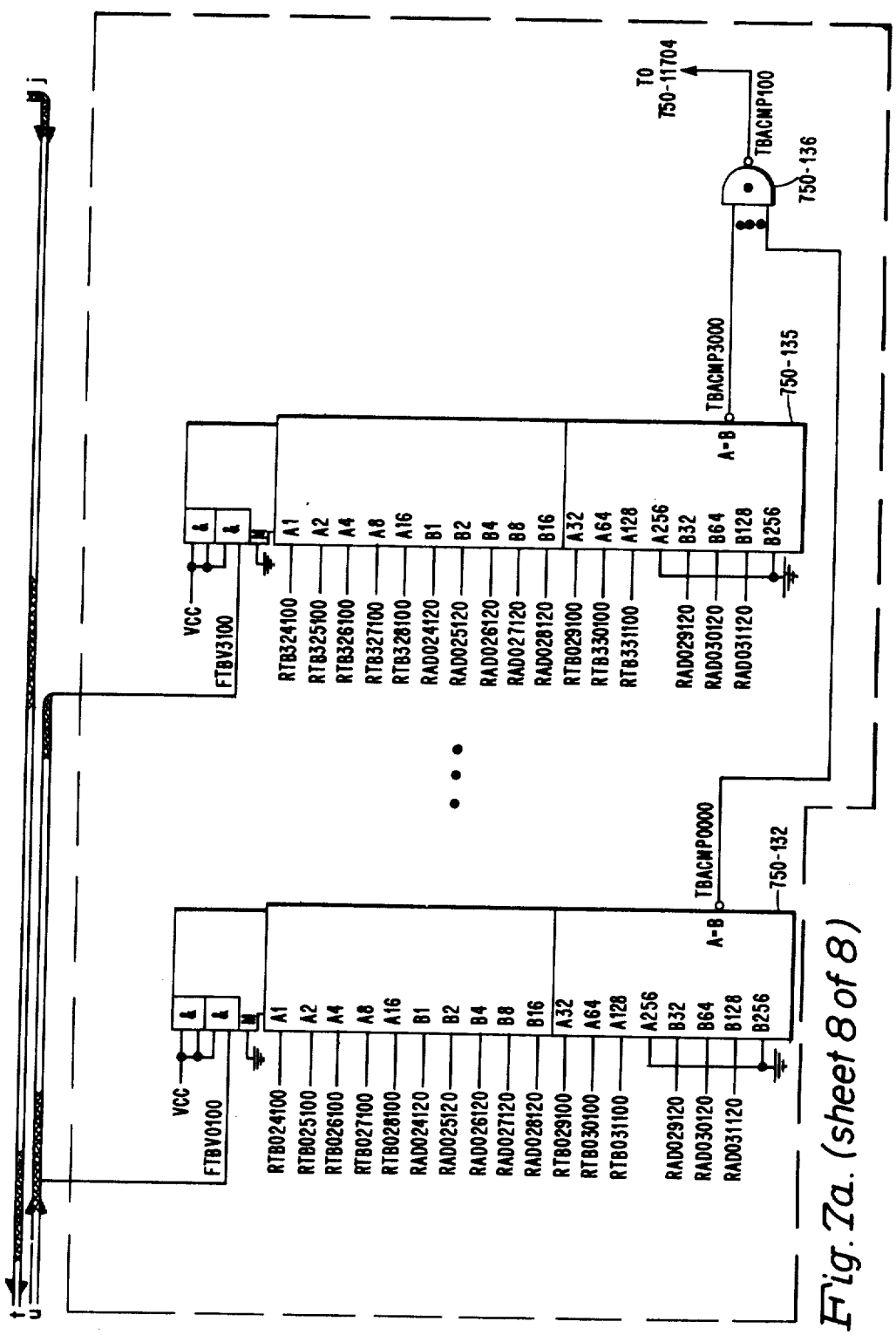
Fig. 7a. (sheet 8 of 8)

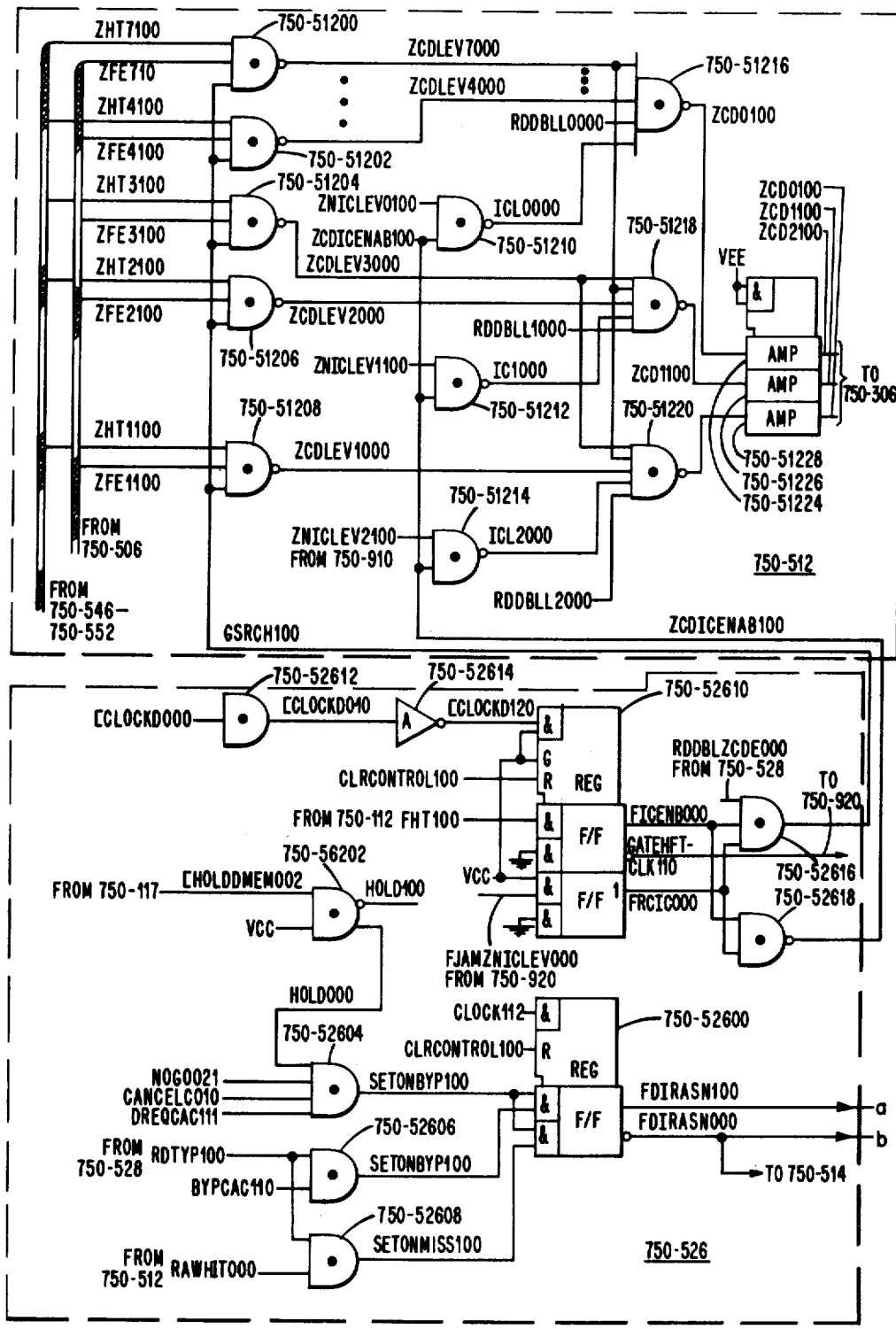
Fig. 7c. (sheet 1 of 3)

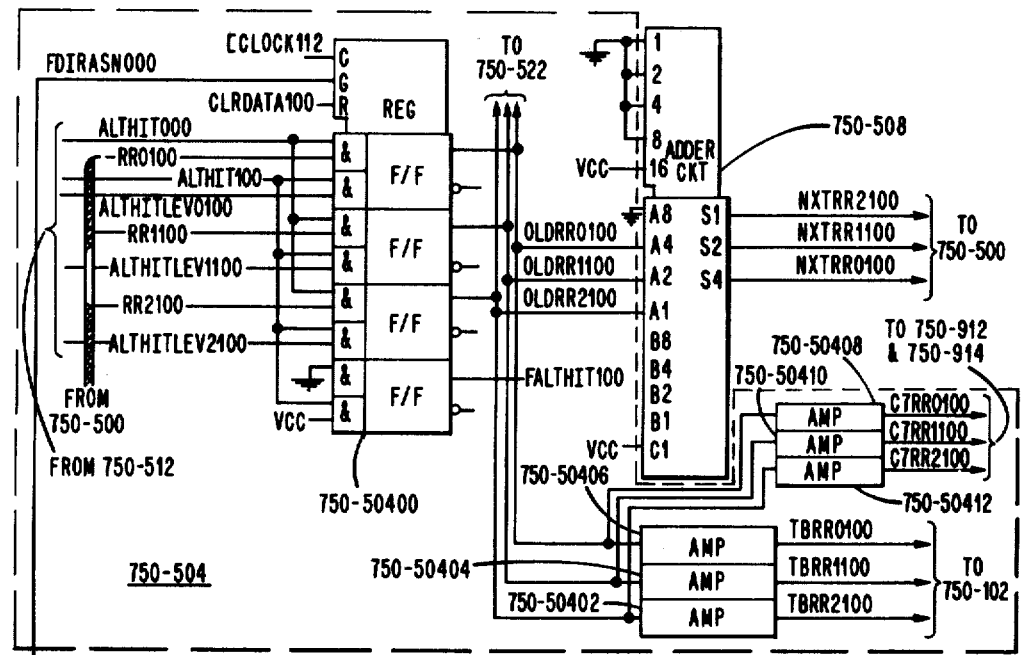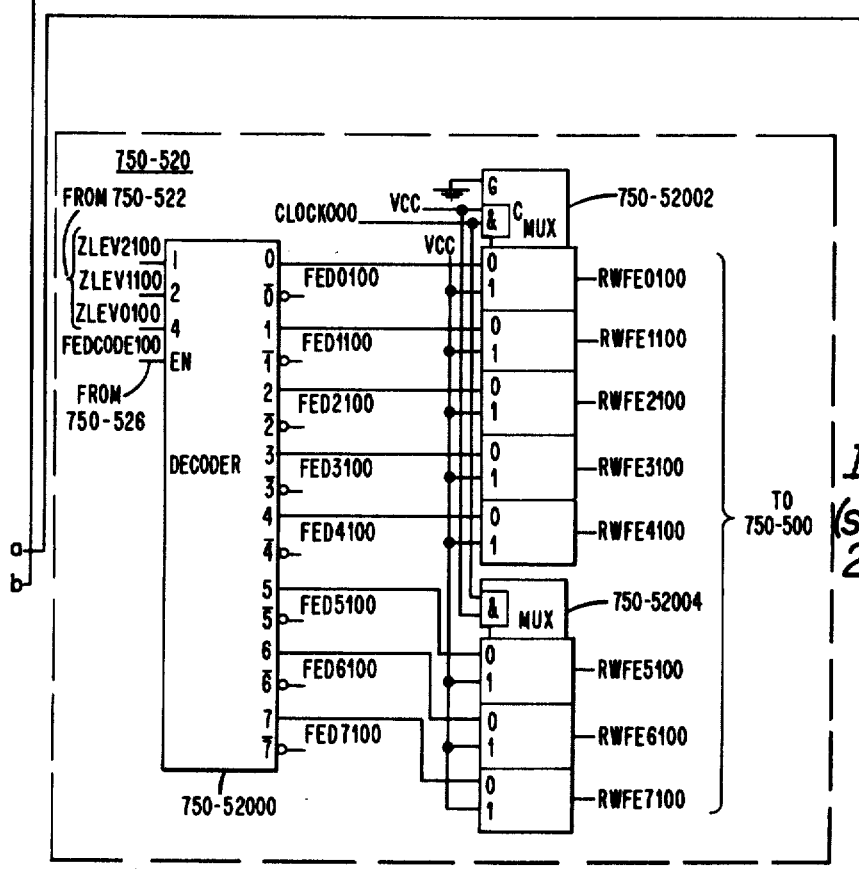
Fig. 7c. (sheet 2 of 3)

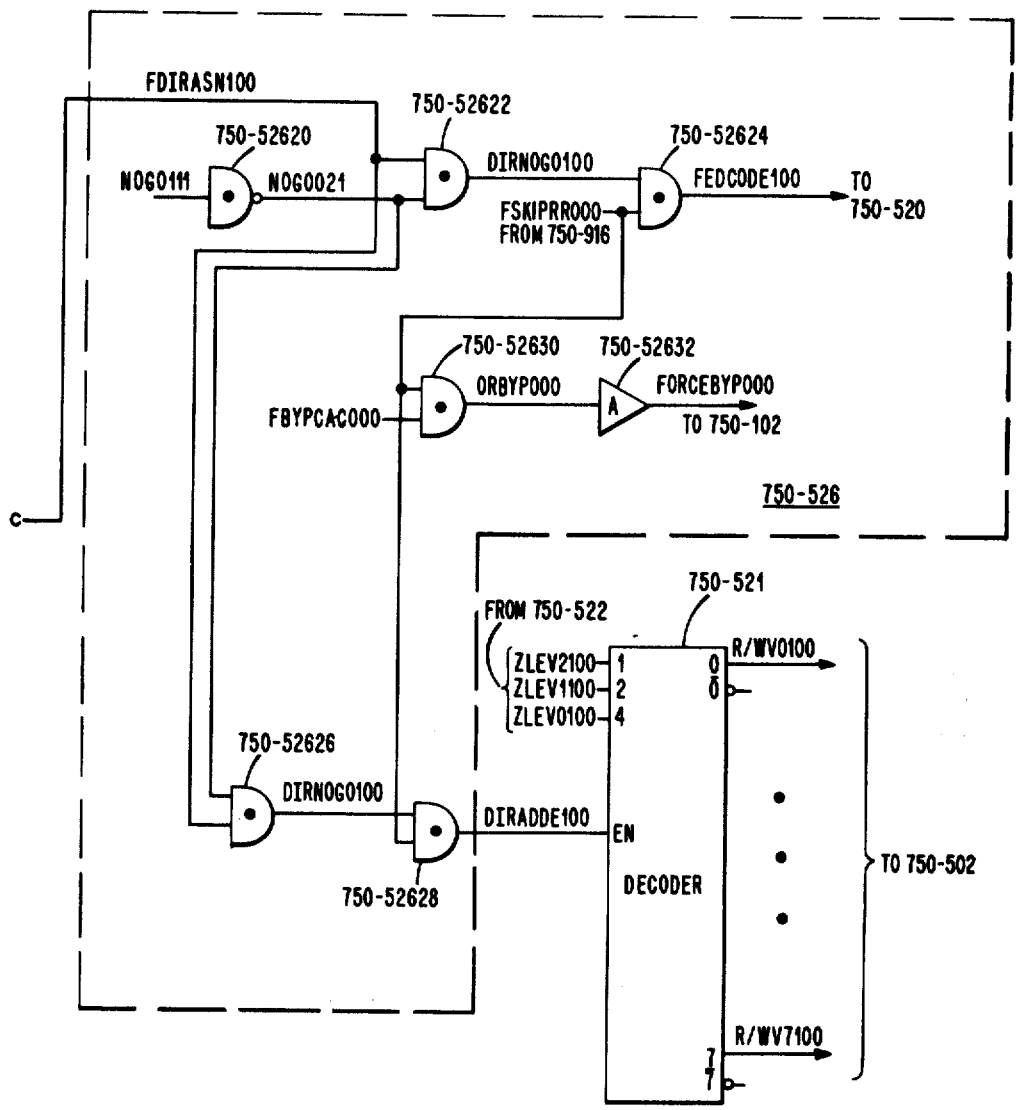
Fig. 7c. (sheet 3 of 3)

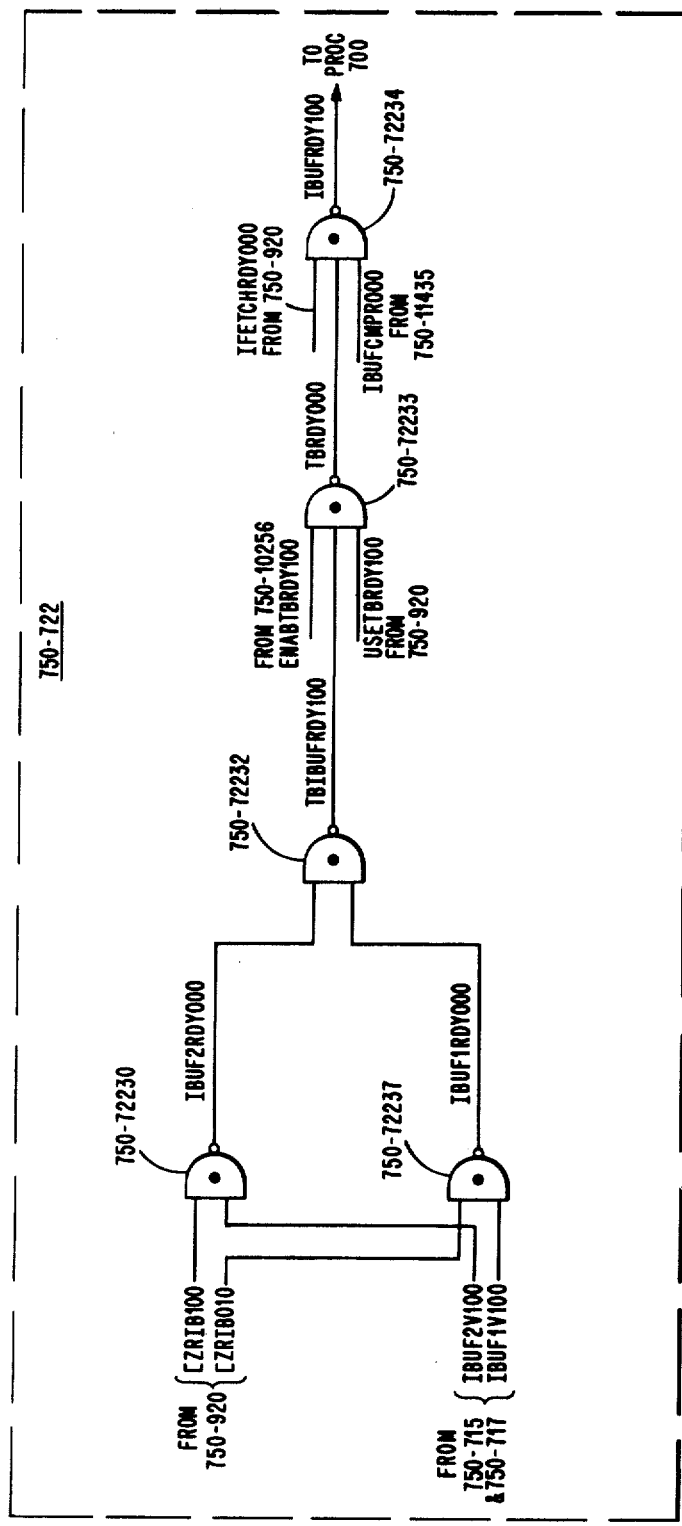
Fig. 7d. (sheet 1 of 3)

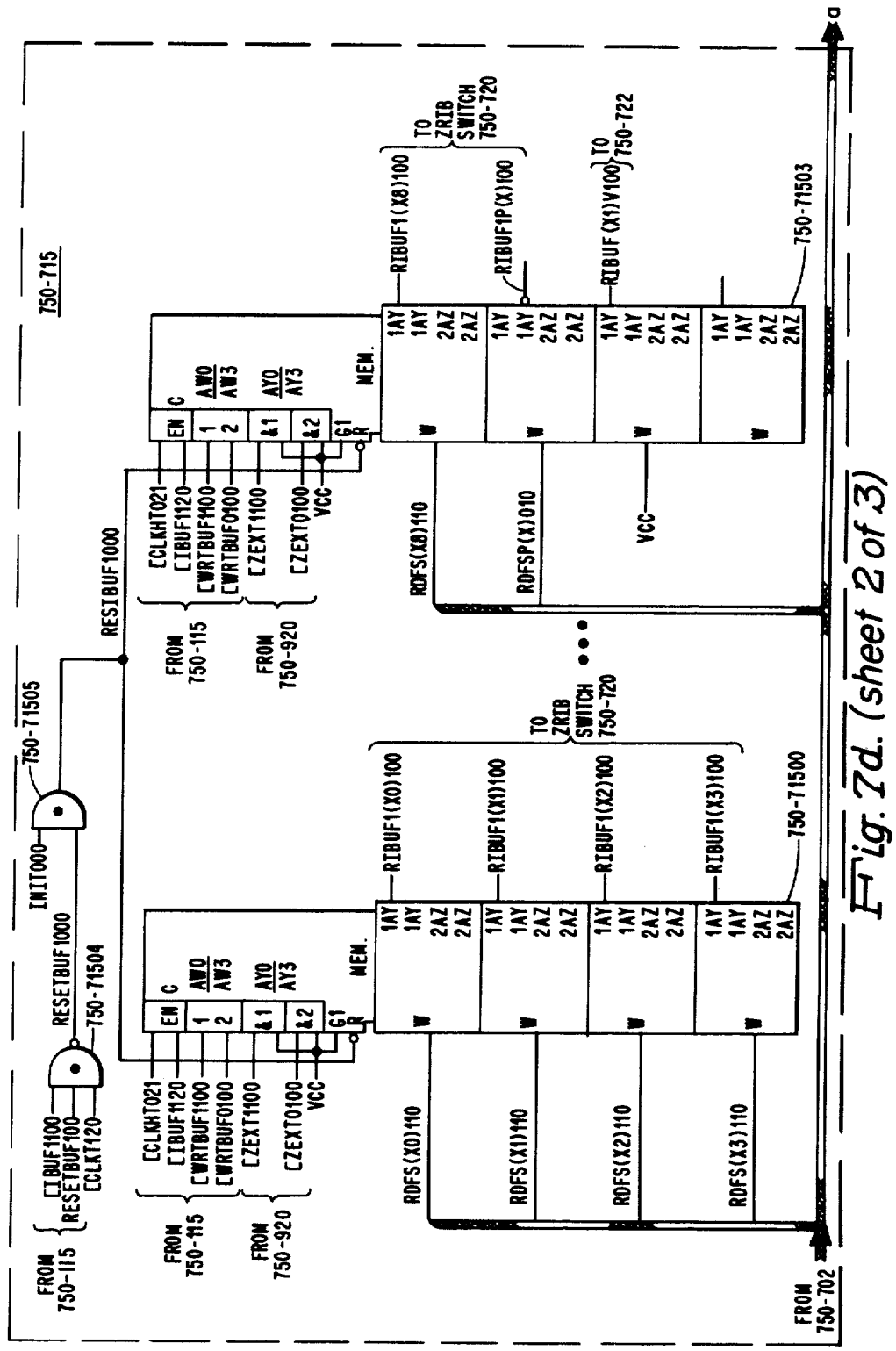
Fig. 7d. (sheet 2 of 3)

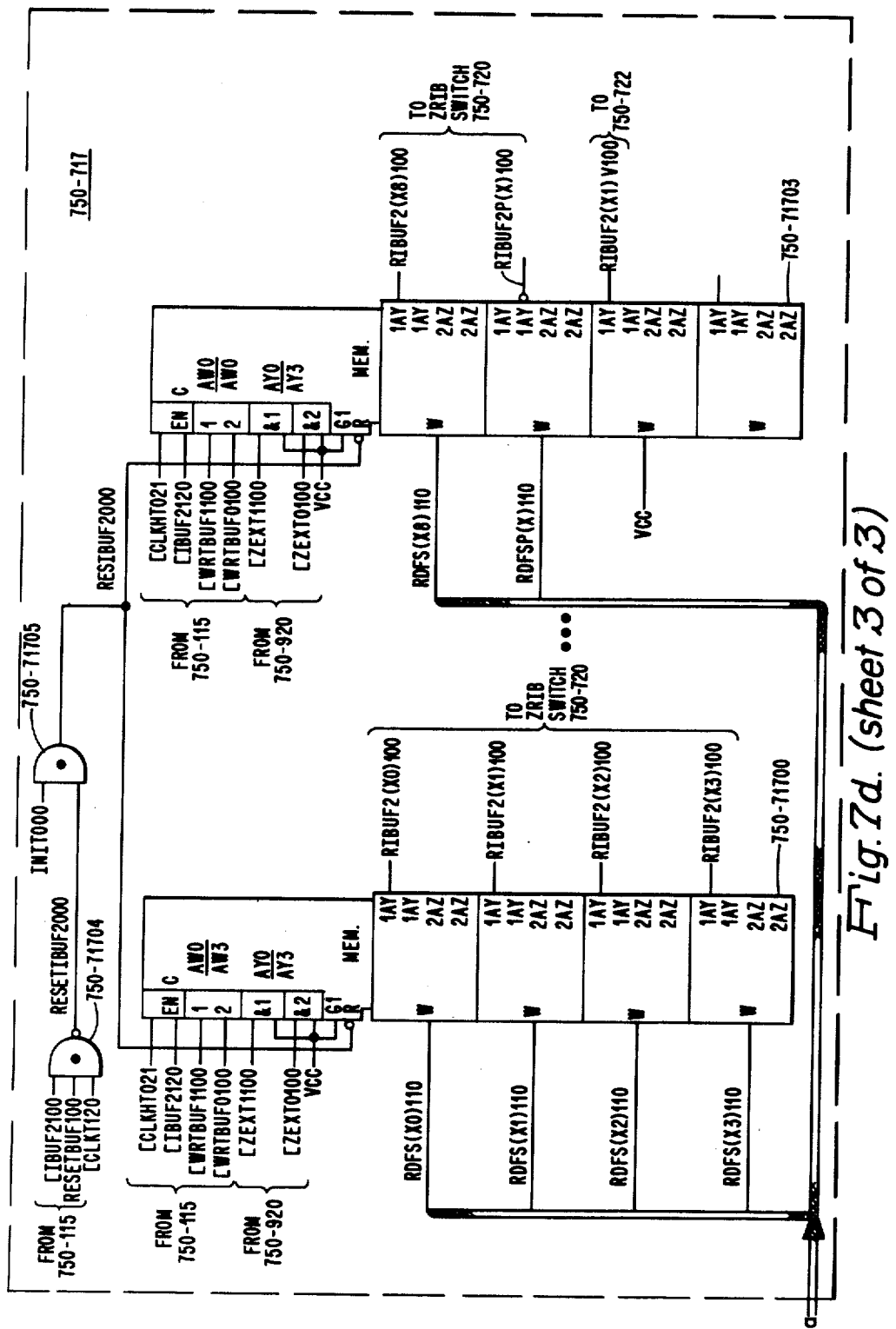
Fig.7d. (sheet 3 of 3)

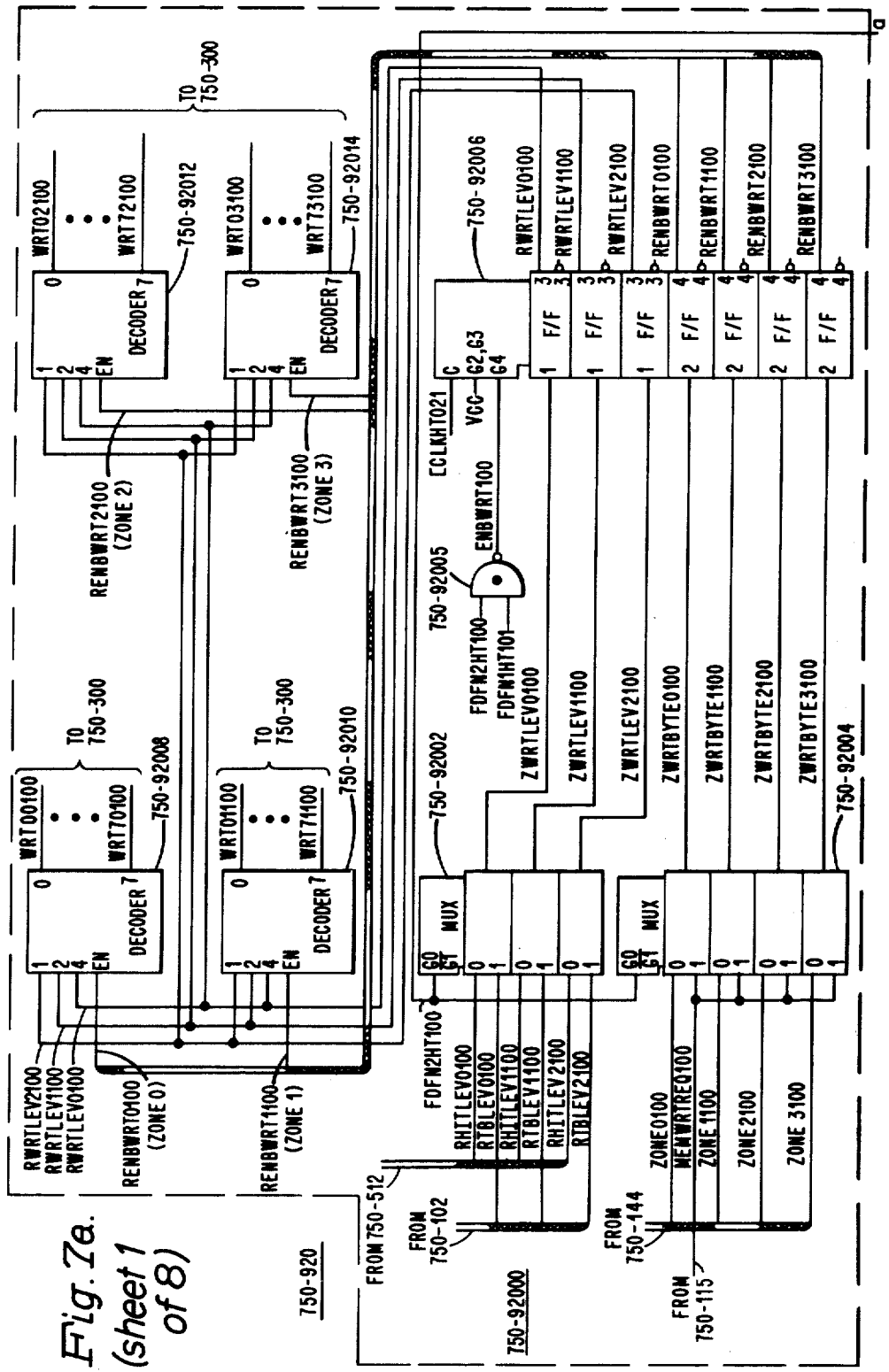
Fig. 7e. (sheet 1 of 8)

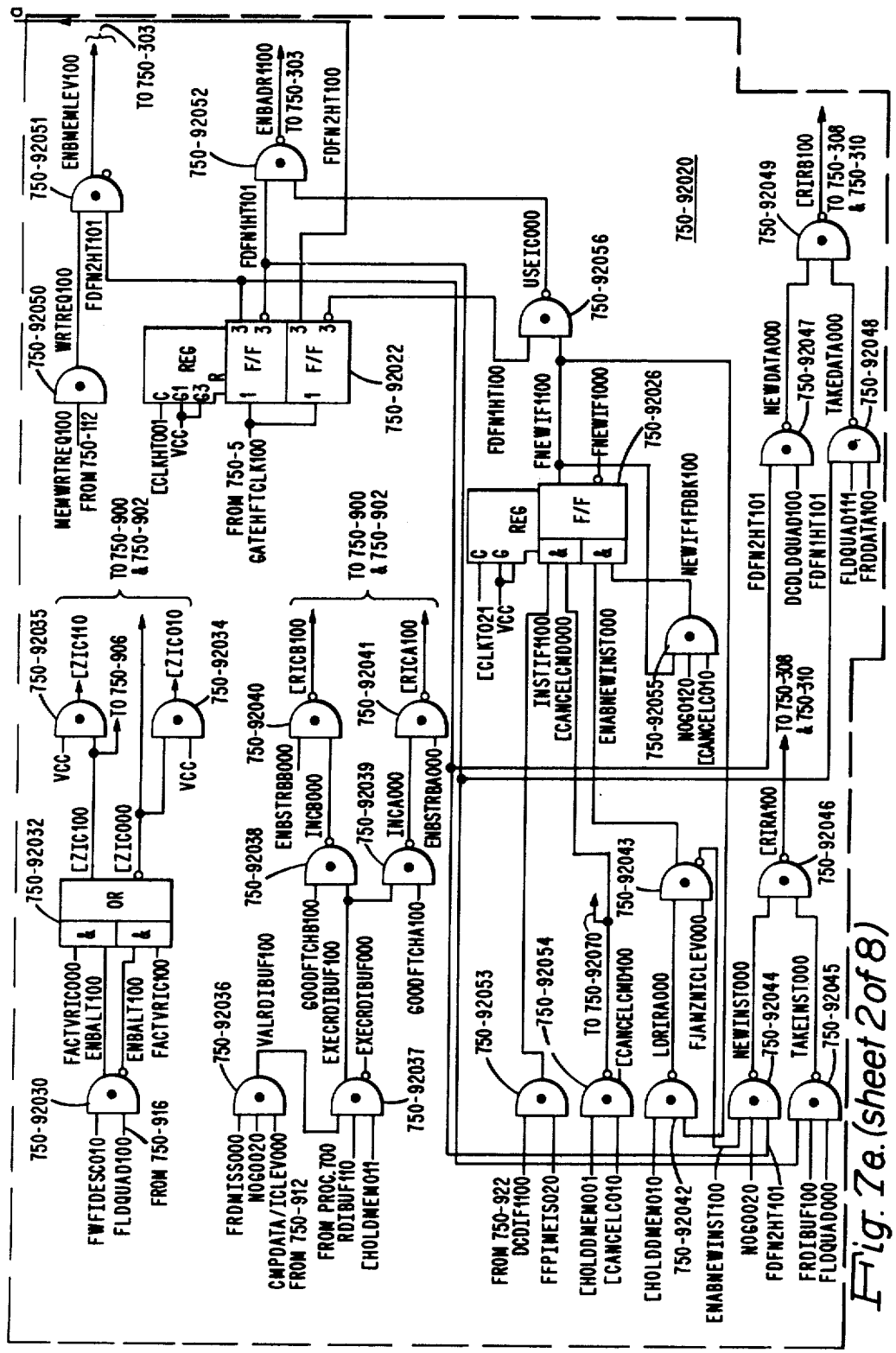
Fig. 7e. (sheet 2 of 8)

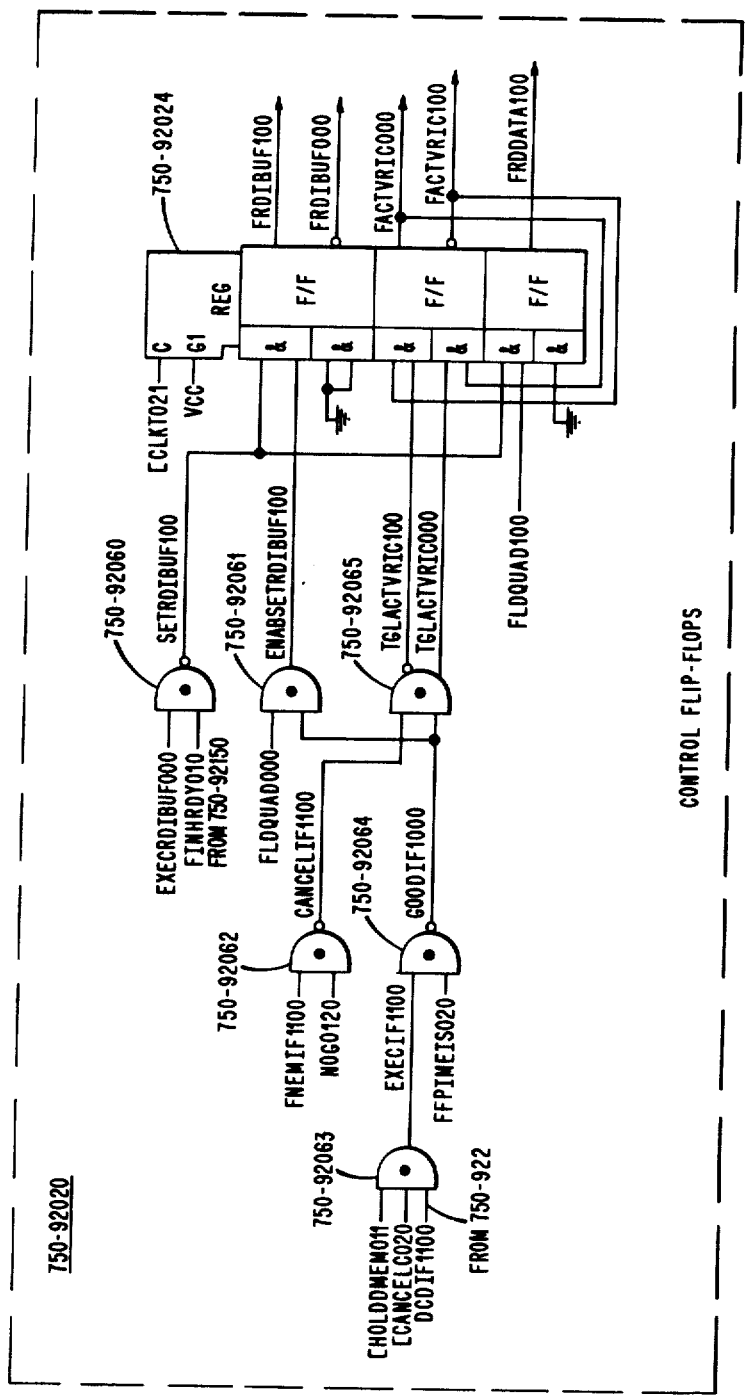
Fig.7e. (sheet 3 of 8)

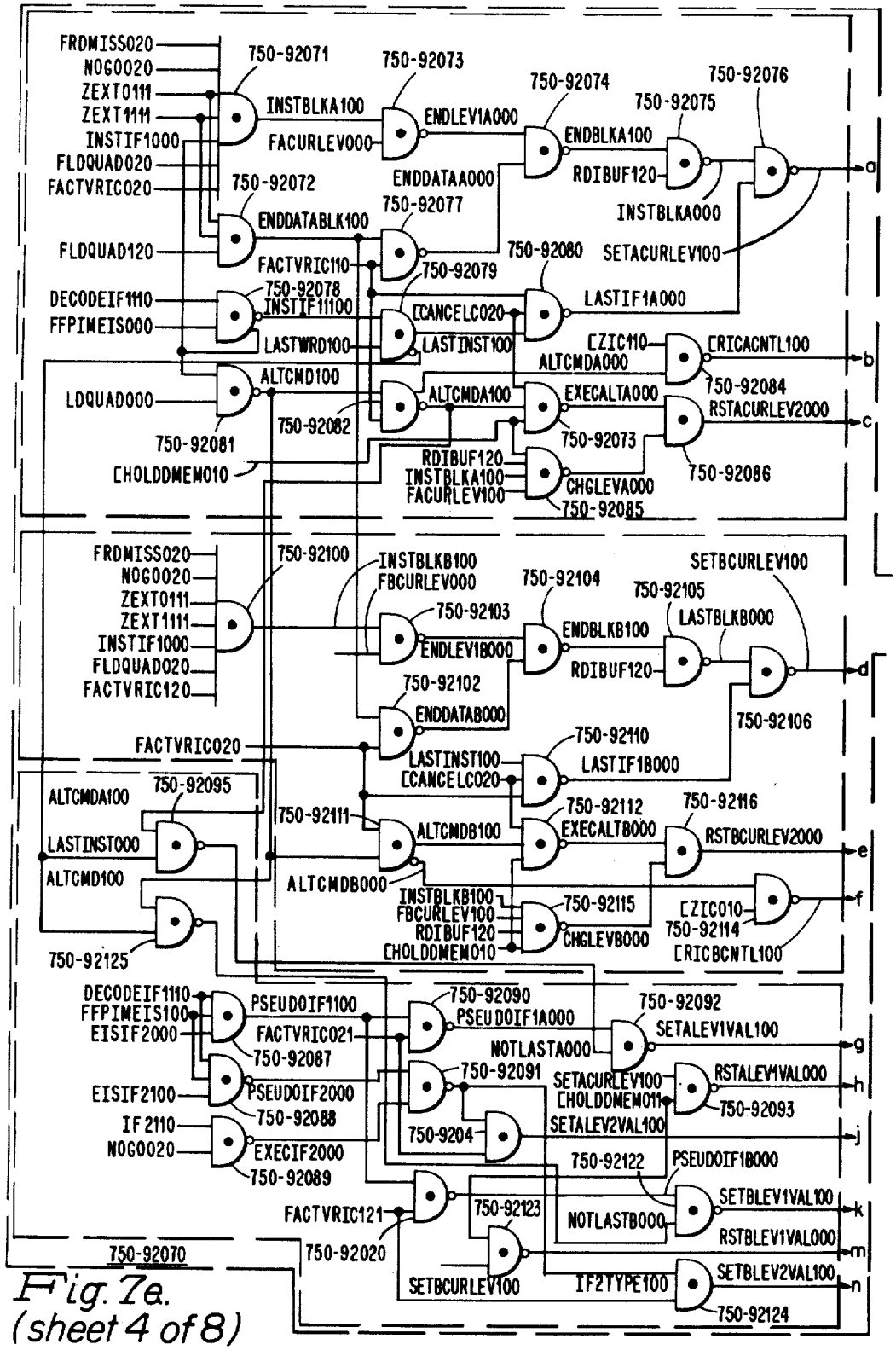
Fig. 7a. (sheet 4 of 8)

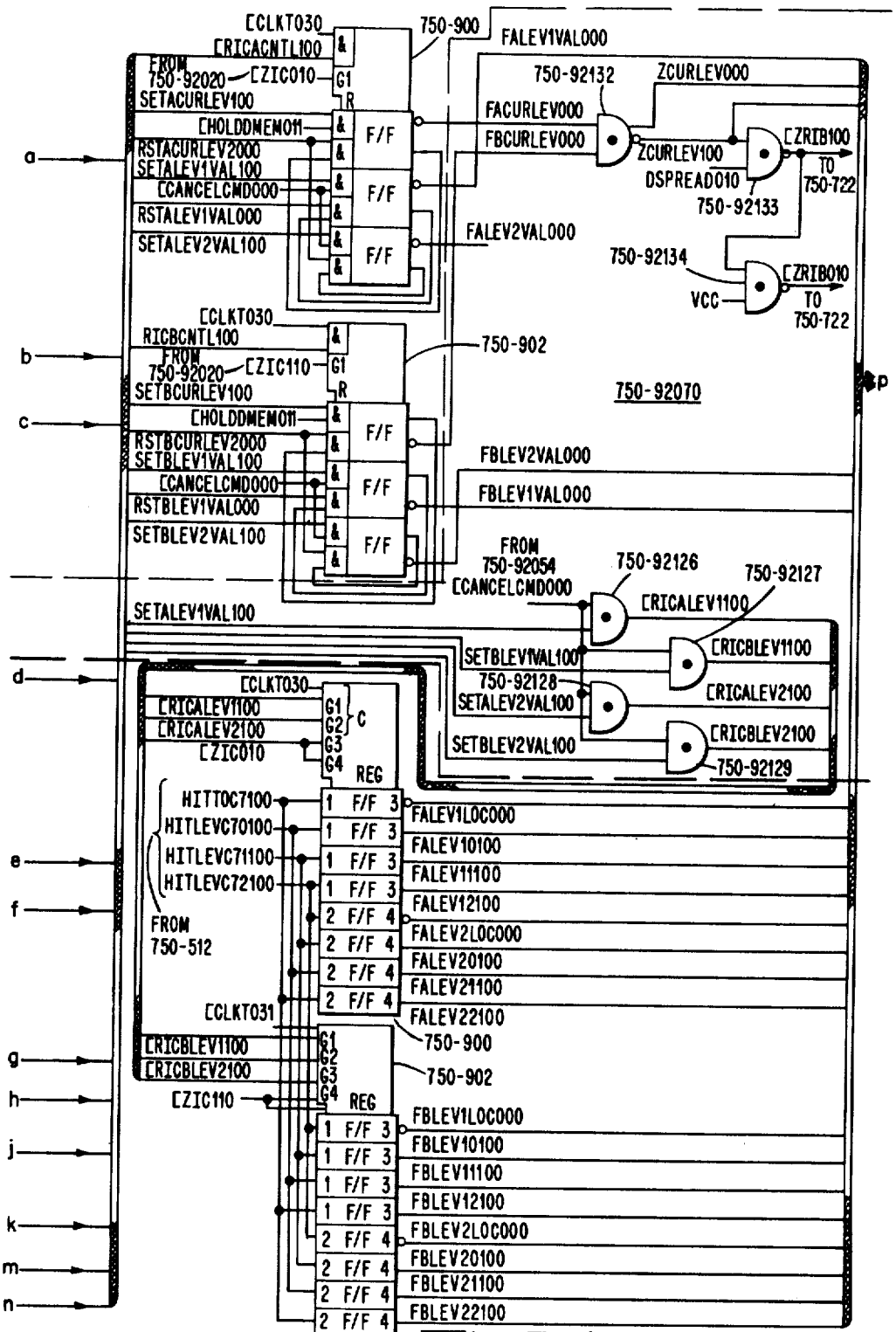
Fig. 7e.(sheet 5 of 8)

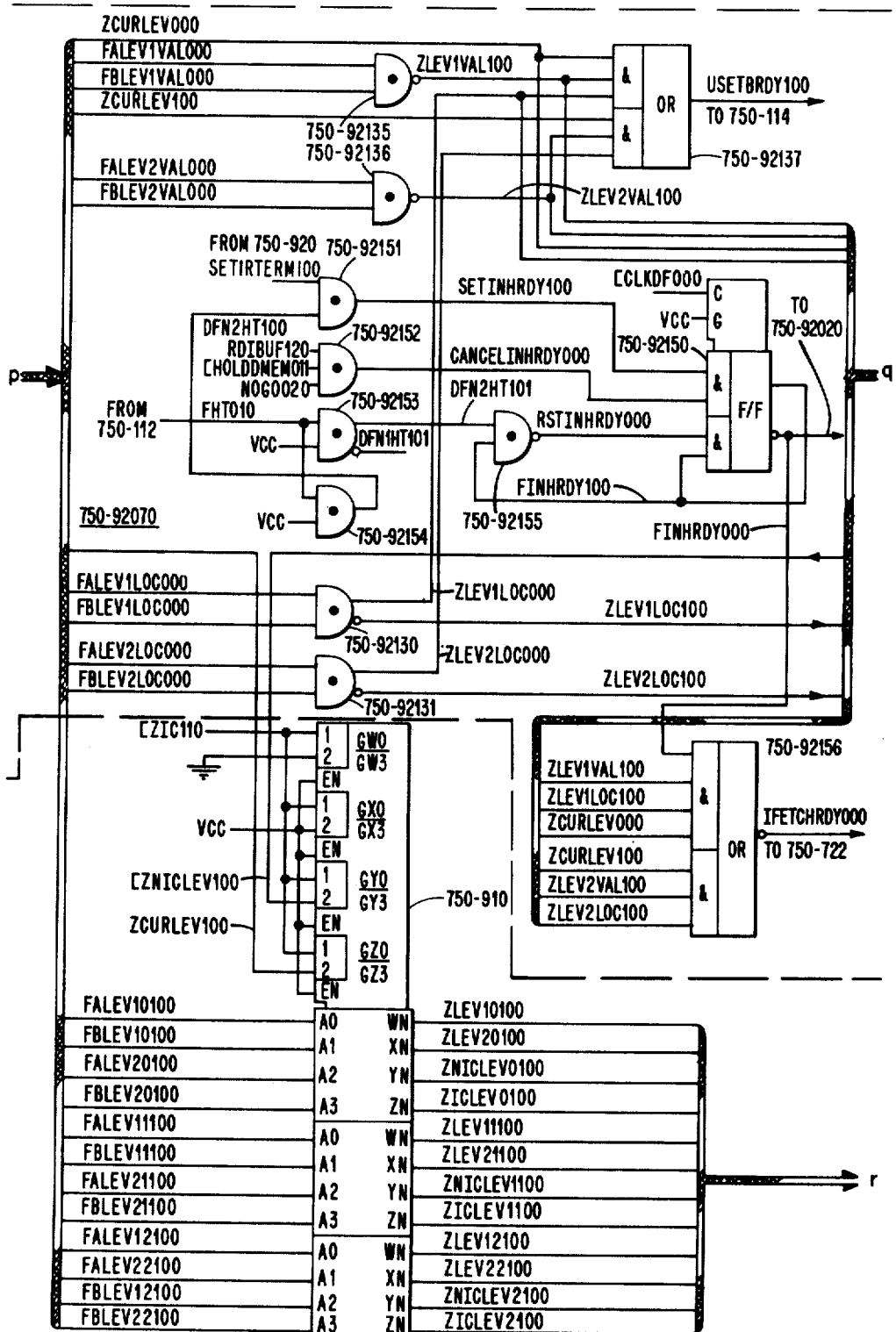
Fig. 7e. (sheet 6 of 8)

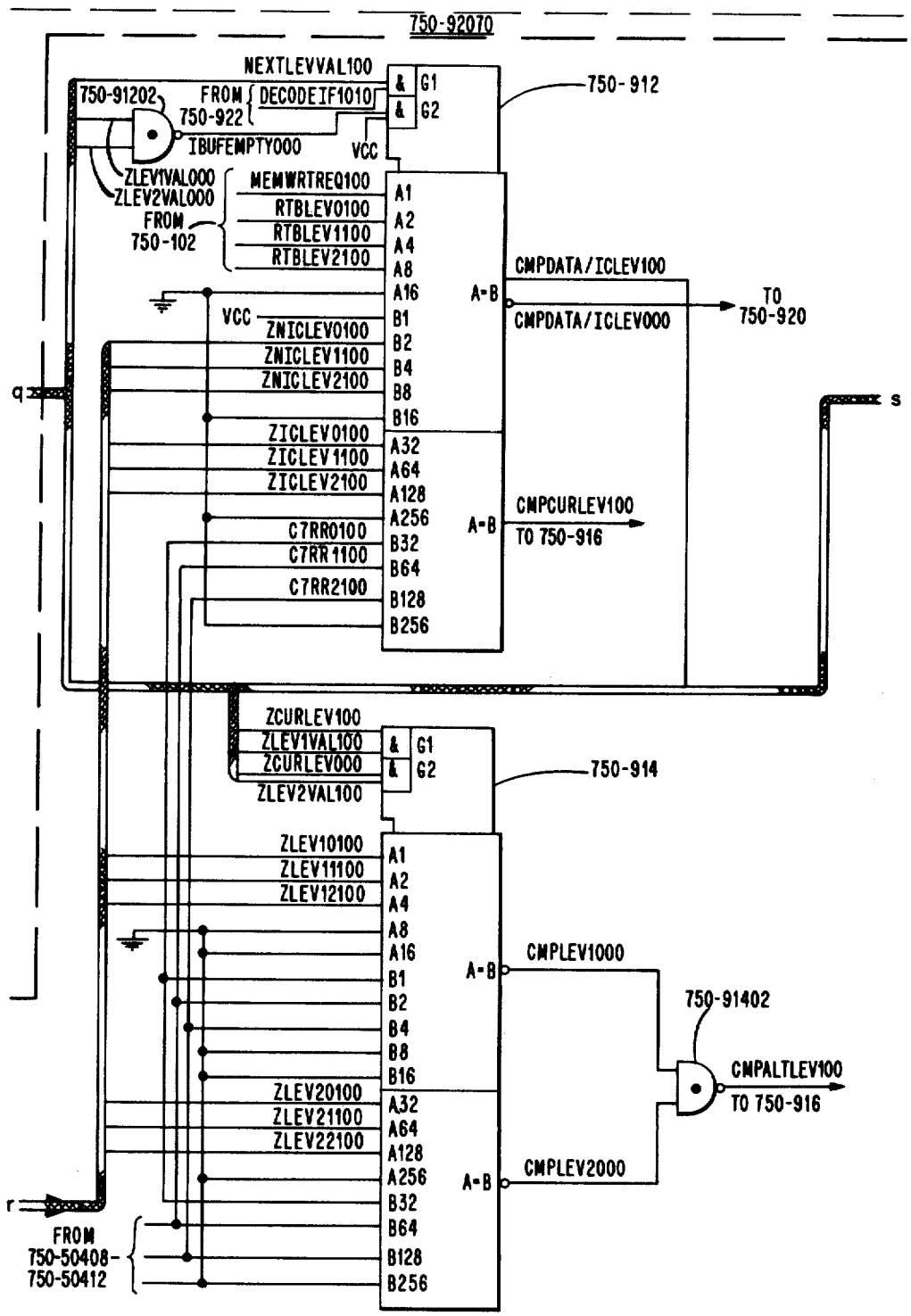
Fig. 7e. (sheet 7 of 8)

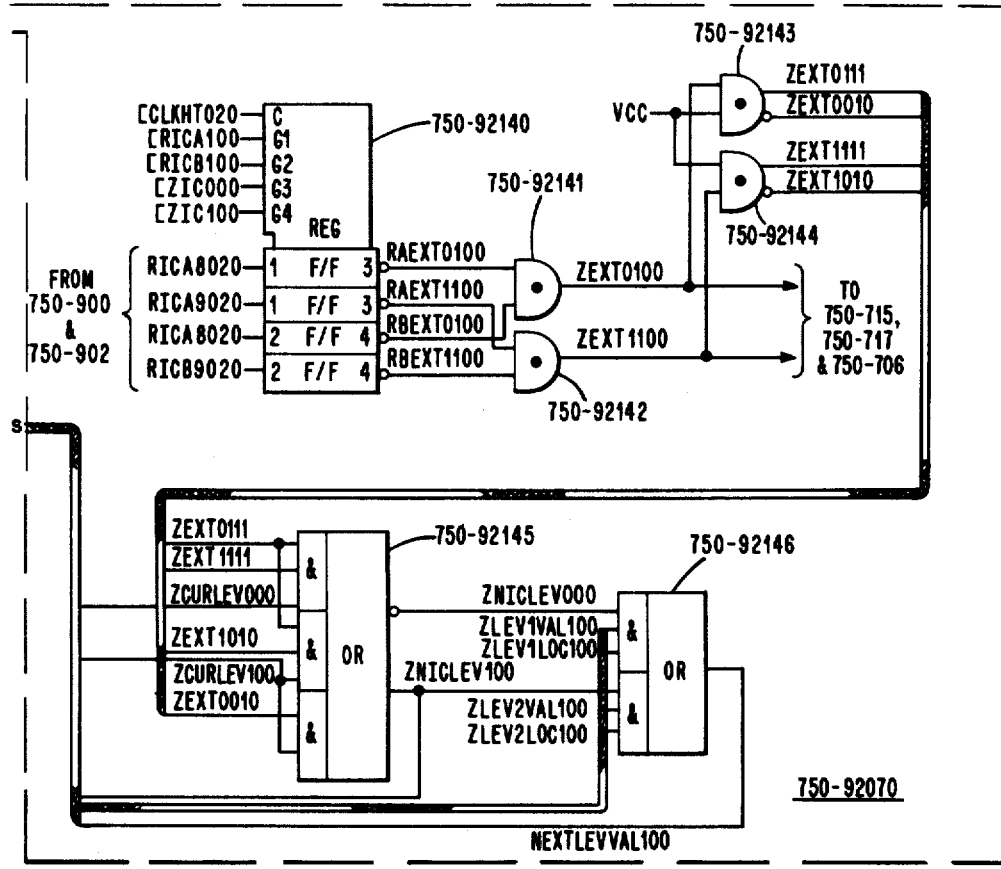
Fig. 7a. (sheet 8 of 8)

INSTRUCTION BUFFER APPARATUS OF A CACHE UNIT

REFERENCED APPLICATIONS

1. "Cache Unit Information Replacement Apparatus" invented by Marion G. Porter, Robert W. Norman, Jr. and Charles P. Ryan, Ser. No. 968,048, filed on Dec. 11, 1978 and assigned to the same assignee as named herein.
2. "A Cache Arrangement Utilizing A Split Cycle Mode Of Operation" invented by Marion G. Porter, Robert W. Norman, Jr. and William A. Shelly, Ser. No. 968,312, filed on Dec. 11, 1978, now U.S. Pat. No. 4,245,304 and assigned to the same assignee as named herein.
3. "A Cache Arrangement for Performing Simultaneous Read/Write Operations" invented by Marion G. Porter, William A. Shelly and Robert W. Norman, Jr., Ser. No. 968,521, filed on Dec. 11, 1978, now U.S. Pat. No. 4,208,716 and assigned to the same assignee as named herein.
4. "A Cache Unit With Transit Block Buffer Apparatus" invented by Marion G. Porter, Charles P. Ryan and William A. Shelly, Ser. No. 968,522, filed on Dec. 11, 1978, now U.S. Pat. No. 4,217,640 and assigned to the same assignee as named herein.
5. "Cache Apparatus for Enabling Overlap of Instruction Fetch Operations" invented by Marion G. Porter and Charles P. Ryan, Ser. No. 968,049, filed on Dec. 11, 1978 and assigned to the same assignee as named herein.
6. "Command Queue Apparatus Included Within A Cache Unit for Facilitating Command Sequencing" invented by Marion G. Porter, Ser. No. 968,311, filed on Dec. 11, 1978, now U.S. Pat. No. 4,225,922 and assigned to the same assignee as named herein.
7. "Buffer Store Including Control Apparatus which Facilitates the Concurrent Processing of a Plurality of Commands" invented by Charles P. Ryan, Ser. No. 853,982, filed on Nov. 22, 1977, now U.S. Pat. No. 4,156,906 and assigned to the same assignee as named herein.
8. "An Instruction Buffer Associated with a Cache Memory Unit" invented by John E. Wilhite, et al, Ser. No. 866,083, filed on Dec. 30, 1977 and assigned to the same assignee as named herein.

BACKGROUND OF THE INVENTION

1. Field of Use

This invention relates to data processing systems and more particularly to a data processing system which includes a cache unit for facilitating the processing of requests for instructions and operands.

2. Prior Art

As is well known in the art, many data processing systems each include a main store and a cache unit positioned between the system's data processing unit and main store for the purpose of increasing the performance of such data processing unit. Additionally, such high performance data processing units have included instruction buffers for providing fast access to instructions.

It has been recognized that even with a cache unit and instruction buffer, data processing unit's performance can be compromised by the transfer from one instruction sequence to a second instruction sequence. To overcome this, one prior art system includes an instruction buffer capable of storing two instruction sequences which can be available for use by the data processing unit. For further information regarding this system, reference may be made to the copending patent application "An Instruction Buffer Associated with a Cache Memory Unit", invented by John E. Wilhite, et al, bearing Ser. No. 866,083, filed on Dec. 30, 1977 and assigned to the same assignee as named herein.

While the above arrangement facilitates the transfer from one instruction sequence to another, it requires that execution of the command specifying the fetching of the instructions of one sequence be completed before the command for fetching instructions of a second sequence is issued to main store. During that time, the processing unit is required to halt its operation. The cache unit, upon loading all of the instructions of a block into the instruction buffer started the processing unit up in parallel with issuing the next command to fetch a second block of instructions.

Accordingly, it was found that this delay resulted in a corresponding loss of valuable processing time.

Accordingly, it is a primary object of the present invention to provide an improved cache system.

It is a further object of the present invention to provide a cache arrangement which includes improved instruction buffer apparatus.

It is still a further object of the present invention to provide an instruction buffer arrangement which permits instruction fetches to proceed with a minimum interruption of the operation of the data processing unit.

SUMMARY OF THE INVENTION

The above and other objects of the present invention are achieved in a preferred embodiment which includes a cache unit which couples between a main store and a data processing unit.

The cache unit includes a cache store organized into a plurality of levels, each for storing a number of blocks of information in the form of data and instructions. The cache unit further includes an instruction buffer having first and second sections for storing first and second blocks of instructions, respectively, received from main store.

Each instruction buffer section includes a plurality of word storage locations, each word location having a number of bit positions. A predetermined bit position of each word location is used to indicate when an instruction word is written into the location. Control apparatus coupled to each of the buffer sections is operative to reset all of the word locations including the predetermined bit positions to binary ZEROS when a command requesting an instruction block to be fetched from main store is ready to be transferred to main store.

As soon as an instruction word is written into a word location of a buffer section, the predetermined bit position is connected to be switched to a binary ONE. Instruction buffer ready circuits included within the control apparatus are conditioned by the states of the predetermined bit positions of the locations to generate an output signal to the processing unit enabling the transfer of requested instruction words to the processing unit as soon as they are received from main store. That is, in greater detail, the preferred embodiment of the cache unit includes at least one instruction address register including a number of bit positions for storing address signals which specify the address of the next instruction to be fetched from the cache unit.

A comparator circuit included within the control apparatus is connected to receive address signals from the instruction address register indicating which instruction word within the block is to be transferred and signals corresponding to the states of the predetermined bit positions of the instruction buffer sections. In accordance with the states of the predetermined bit positions within the instruction buffer section, these circuits generate an output signal for conditioning the instruction ready circuits to enable the transfer of such next instruction word to the processing unit as it is written into one of the instruction buffer section locations. Accordingly, no matter what order the instruction words are sent, the processing unit is able to commence its execution of the instruction as soon as it is received. This results in increased performance.

The novel features which are believed to be characteristic of the invention, both as to its organization and method of operation, together with further objects and advantages will be better understood from the following description when considered in connection with the accompanying drawings. It is to be expressly understood, however, that each of the drawings is given for the purpose of illustration and description only and is not intended as a definition of the limits of the present invention.

BRIEF DESCRIPTION OF THE DRAWINGS

FIG. 2 shows in block diagram form the host processor 700 and the cache unit 750 of FIG. 1.

FIGS. 3a through 3e show in greater detail, certain ones of blocks of FIG. 2.

FIG. 4 shows in block diagram form the cache unit 750 of FIG. 2.

FIGS. 7a through 7e show in greater detail, different ones of the sections of cache unit 750.

DESCRIPTION OF THE PREFERRED EMBODIMENT

General Description

Figure 1:
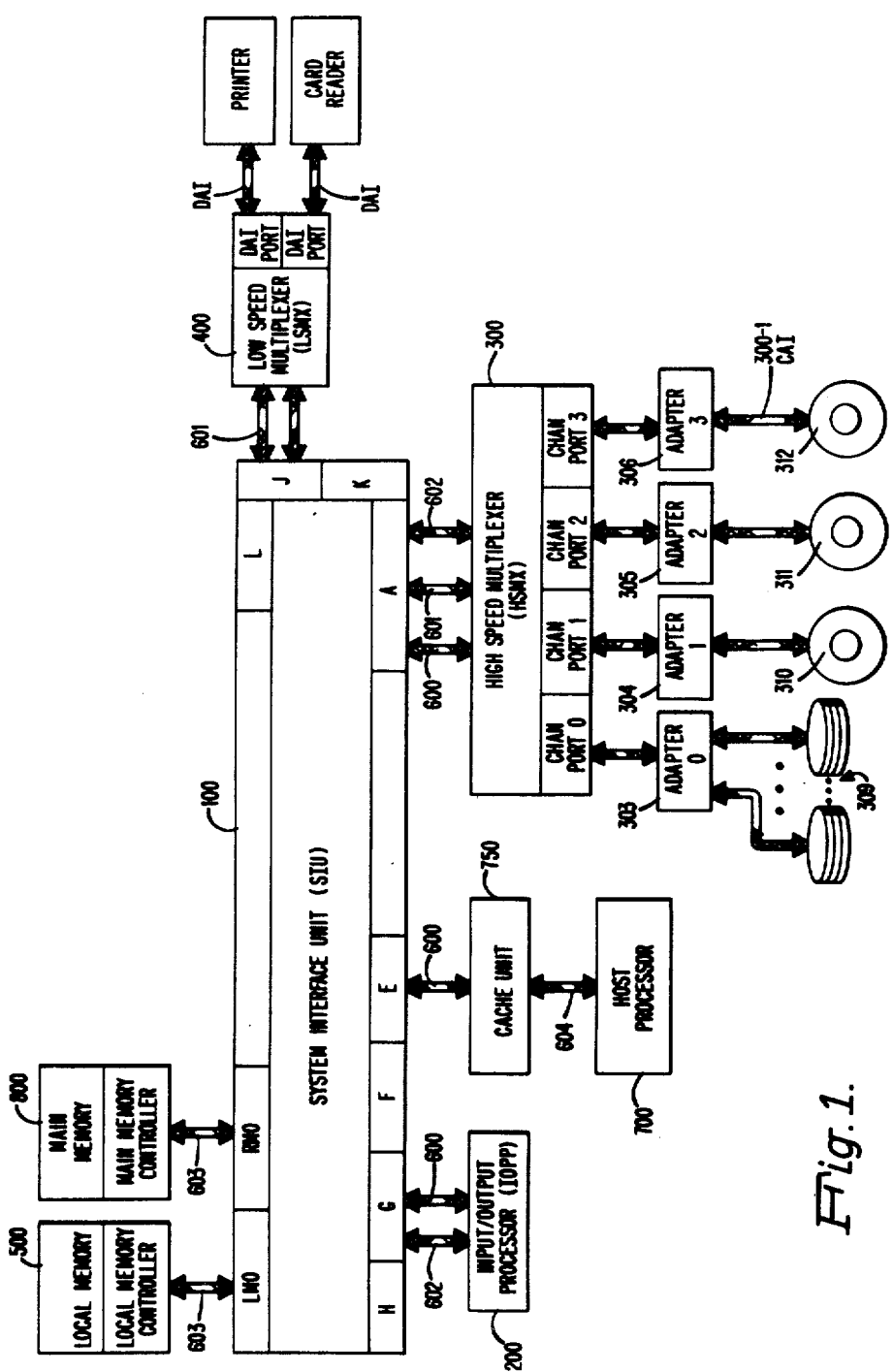
FIG. 1 illustrates in block form a system employing the principles of the present invention.

As seen from FIG. 1, the system which incorporates the principles of the present invention includes at least one input/output processor (IOPP) 200, a system interface unit (SIU) 100, a high-speed multiplexer (HSMX) 300, a low-speed multiplexer (LXMX) 400, a host processor 700, a cache memory 750, at least one memory module corresponding to a local memory module 500, and at least one memory module corresponding to a memory module 800. Different ones of these modules connect to one of a number of ports of the system interface unit 100 through a plurality of lines of different types of interfaces 600 through 604. More specifically, the input/output processor 200, the cache memory 750, and the high-speed multiplexer 300 connect to ports G, E and A, respectively, while the low-speed multiplexer 400, local memory module 500, and main memory module 800 connect to ports J, LM0 and RM0, respectively. The host processor 700 connects to the cache memory 750.

System Interfaces

Before describing in detail the processor 700 and cache unit 750, constructed in accordance with principles of the present invention, each of the interfaces 600 through 604 discussed previously will now be described.

The data interface 600 is one of the interfaces which provides for exchange of information between an active module and system interface unit 100. Exchange is accomplished by controlling the logical states of various signal lines in accordance with pre-established rules implemented through a sequence of signals termed a "dialog".

The interface 601 is a programmable interface which provides for transfer of command information from an active module and a designated module. The transfer is accomplished by controlling the logic of states of the various signal lines in accordance with pre-established rules implemented through a sequence of signals termed a "dialog".

A further interface is the interrupt interface 602 which provides for interrupt processing by the input/output processor 200. That is, the interface enables the transfer of interrupt information by an active module to the SIU 100 to the input/output processor 200 for processing. Similar to the other interfaces, the transfer of interrupt requests is accomplished by controlling the logical states of the various signal lines in accordance with pre-established rules implemented through a sequence of signals termed a "dialog".

A next set of interface lines utilized by certain ones of the modules of FIG. 1 corresponds to the local memory interface 603. This interface provides for exchanging information between local memory 500 and the modules of the system. The exchange is accomplished by controlling logical states of the various signal interface lines in accordance with pre-established rules implemented through a dialog sequence of signals.

Memory and programmable interface commands are transferred out of the same physical data lines of the interface. The interface does not include a set of lines for processing interrupt requests and therefore the modules connected to the local memory by the SIU 100 cannot directly cause a memory interrupt.

For a more detailed description of the elements of FIG. 1 and each of the interfaces 600 through 603, reference may be made to U.S. Pat. No. 4,006,466.

Figure 5:
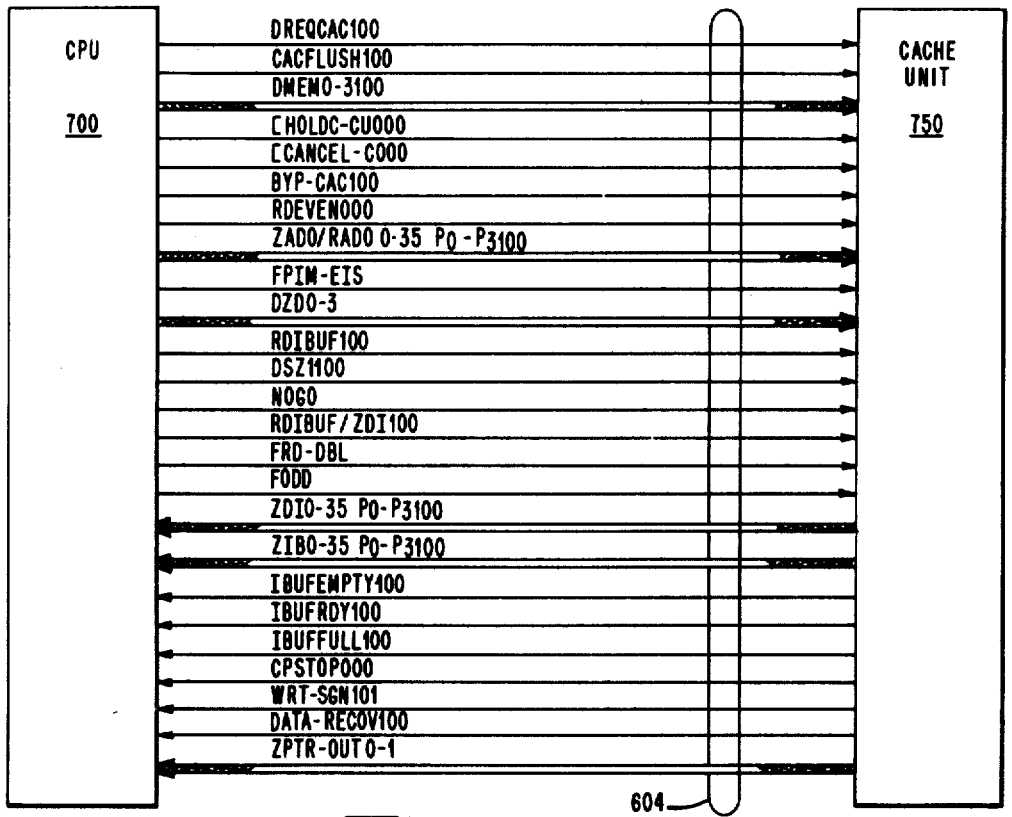
FIG. 5 shows in greater detail, the cache processor interface 604.

The last interface 604 is an internal interface between the cache unit 750 and central processor 700 which corresponds to the cache/CPU interface lines of FIG. 5. This interface provides for exchanging information and control signals between the processor 700 and the cache unit 750. The exchange is accomplished by controlling the logical states of the various signal interface lines. The cache/CPU interface includes a plurality of data to processor lines (ZDI 0-35, P0-P3), a plurality of ZAC and write data lines (ZAD0 0-23, RAD0 24-35, P0-P3), a processor request signal line (DREQ-CAC), a plurality of cache command lines (DMEM 0-3), a hold cache line (HOLD-C-CU), a cancel line (CANCEL-C), a flush line (CAC-FLUSH), a read word line (RD-EVEN), a read instruction buffer line (RD-IBUF), a read double (FRD-DBLE), an odd line (FODD), a plurality of instruction lines (ZIB0-35, P0-P3), a control line (DSZ), a read I-buffer data line (RD-IBUF/ZDI), a plurality of zone bit lines (DZD 0-3), a bypass cache line (BYP-CAC), a write signal line (WRT-SGN), an instruction buffer empty line (IBUF-EMPTY), an instruction buffer ready line (IBUF-RDY), an instruction buffer full line (IBUF-FULL), a CP stop line (CP-STOP), a CP control line (DATA-RECOV), a descriptor control line (FPIM-EIS), a transfer no-go line (NO-GO) and a plurality of word address lines (ZPTROUT0-1).

Instructions, cache commands and data are forwarded to the cache unit 750 via different ones of these lines. Additionally, the operation of the processor 700 is enabled or disabled by certain ones of these lines as explained herein. The description of the CPU/cache interface lines are given in greater detail herein.

| CPU/CACHE INTERFACE LINES | |
|---|---|
| Designation | Description |
| DREQ-CAC | This line extends from processor 700 to cache unit 750. When the DREQ-CAC line is set to a binary ONE, a ZAC command is transferred to cache 750. In the case of a write ZAC command, write data words are transferred in the one or two cycles following the ZAC command and data words are sent from the processor 700 through the cache 750 without modification, to the SIU 100. |
| DMEM 0,1,2,3 | These lines extend from the processor 700 to cache 750. These lines are coded to designate the command that the cache 750 is to execute. The coding is as follows: |

DMEM=0000 no op No action is taken and no cache request is generated.
DMEM=0001 Direct The direct command enables the processor 700 to perform a direct transfer of an operand value without action on the part of the cache 750. Hence, no cache request is generated by this type of command.
DMEM=0010—Address Wraparound Command (ADD-WRAP) The address wraparound command is executed to return the command given to cache 750 by processor 700. On the same cycle, the command is given to processor 700 via the ZDI lines 0-35.
DMEM=0100—Load Instruction Buffer Instruction Fetch 1 (LD-IBUF-IF1) The load instruction buffer command is used to load the address of the next block of instructions into the alternate instruction register RICA/RICB.

There are three posssible sequences of operation for this command.
1. In the case of a cache hit when the cache 750 is not being bypassed, the block address and level stored in the cache 750 are loaded into the alternate instruction register. A cache access is made to fetch the desired instruction which is transferred to processor 700 via the ZDI lines 0-35 on the subsequent T clock pulse. The alternate instruction register now becomes the current instruction register.
2. In the case of a cache miss when the cache 750 is not being bypassed, the block address and the level designated by the round robin circuits are loaded into the alternate instruction register. The processor is turned off or held on the subsequent T clock pulse to determine whether the generation of the IF1

| CPU/CACHE INTERFACE LINES | |
|---|---|
| Designation | Description |
| | command is in response to a transfer instruction. If it is and the transfer is a NO-GO, the current instruction register is used to access the next instruction and the processor 700 is turned on. If the IF1 command is caused by a transfer instruction which is a GO, then cache 750 sends a memory request to SIU 100 for the desired block of instructions and a directory assignment is made for the missing block. The instructions received from memory are first written into the instruction buffer and then into cache. The requested instruction is transferred to processor 700 via the ZDI lines and the processor 700 is turned on or released on the subsequent T clock pulse. The remaining instructions of the block are transferred to processor 700 from the instruction buffer via the ZIB lines. |

3. When the cache is to be bypassed and there is a hit, the full-empty bit for that block is reset. All other operations are the same as in the cache miss case, except that no directory assignment is made and the block is not written into cache.

DMEM=0101—Load Instruction Buffer Instruction Fetch 2 (LD-IBUF-IF2) The load instruction buffer command is used to load the level of the second block of instructions into the current instruction register. The processor 700 is not turned off in the case of a miss condition. There are also three possible sequences of operation for this command.
1. In the case of a cache hit condition and no bypass, the level of the second block of instructions is loaded into the current instruction register.
2. In the case of a cache miss condition and no bypass, when the IF1 command was found to be the result of a transfer instruction NO-GO condition, the IF1 operation is cancelled. In the case of other than a NO-GO condition, a directory assignment is made for the second block of instructions and the level obtained from the round robin circuits are written into the current instruction register. Cache 750 sends a memory request to memory for the block and when the instructions are received they are first written into the instruction buffer and later into cache 750. When the instructions are needed, they are read out from the instruction buffer and transferred to processor 700 via the ZIB lines 0-35.
3. In the case of a bypass, when there is a hit condition, the full-empty bit for that block is reset. All other operations are the same as in the case of cache miss except that there is no directory assignment and the block is not written into cache 750.

DMEM=0110—Load Quad The load

CPU/CACHE INTERFACE LINES -continued

| Designation | Description |
|---|---|
| | quad command is used to load the block address for date (not instructions) into the alternate instruction register. It is similar to the IF2 except that the address and level (round robin circuits provide level when a cache miss condition) are written into the alternate instruction register. When the data is not in cache 750 and processor 700 requests it before it is received from memory, the processor 700 is held or stopped until the data is received. |
| DMEM = 0111—Pre-read (PR-RD) | The pre-read command is used to load cache 750 with data which the processor 700 expects to use in the near future. The three possible sequences of operation are as follows: |
| 1. | For a cache hit and no bypass, the pre-read command is executed as a no-op. |
| 2. | For a cache miss and no bypass, the cache 750 generates a memory request for the block and a directory assignment is made for the missing block. When the data is received from memory, it is written into cache. The processor 700 is not held for this condition. |
| 3. | For a cache bypass, the pre-read command is treated as a no-op. |
| DMEM = 1000—Read Single (RD-SNG) | The read single command is used to transfer a single data word to processor 700. There are four possible sequences of operation for this command. |
| 1. | In the case of a cache hit and no bypass, the addressed word is read from cache 750 and transferred to processor 700 on the next T clock pulse via the ZDI lines 0–35. |
| 2. | In the case of a cache miss and no bypass, the processor 700 is stopped and missing block is assigned in the directory. Cache 750 transfers the memory request to main memory. The data words are written into cache as they are received. When the requested data word is received, processor 700 is turned on upon the occurrence of the subsequent T clock pulse. |
| 3. | In the case of a cache hit and bypass, the full-empty bit of the addressed block is reset and the processor 700 is turned off or held. The cache 750 transfers the request for one word to memory and the processor 700 is turned on upon the subsequent T clock pulse following receipt of the requested data word. The data word is not written into cache 750. |
| 4 | For a cache miss and bypass, the same operations take place as in the cache hit and bypass case with the exception that the full-empty bit of the addressed block is not changed. |
| DMEM = 1001—Read Clear (RD-CLR) | The read clear command is used to transfer a data word from memory into processor 700 and also clear it out. There are two possible sequences of operation for this command. |

CPU/CACHE INTERFACE LINES -continued

| Designation | Description |
|---|---|
| 1. | For a cache hit, the full-empty bit for that block is reset and processor 700 is turned off. The cache 750 makes a memory request for one data word. The memory clears the location. When the word is received, the cache 750 transfers the word to processor 700 and turns on the processor 700 on the next T clock pulse. The word is not written into cache 750. |
| 2. | For a cache miss, the same operations take place as in the cache hit with the exception of no change in full-empty bits of the addressed block. |
| DMEM = 1010—Read Double (RD-DBL) | The read double command is used to transfer two data words to processor 700. There are two types of read double commands which differ in the order in which the data words are given to processor 700. When line DSZ1 is a binary ZERO, the order is odd word and even word. When line DSZ1 is a binary ONE, the order is even word and then odd word. There are four possible sequences of operation for this command. |
| 1. | For a cache hit and no bypass, the first word is transferred to processor 700 on the subsequent T clock pulse via the ZDI line 0–35. On the next T clock pulse, the second data word is transferred to processor 700 via the ZDI lines 0–35. |
| 2. | For a cache miss and no bypass, the processor 700 is turned off and a directory assignment is made for the block containing the addressed word pair. The cache 750 transfers the memory request to SIU 100 for the block. As the data words are received they are written into cache. When the requested word pair is available, the first word is transferred to processor 700 and it is turned on or released on the subsequent T clock pulse. The cache 750 transfers the second word to processor 700 on the next T clock pulse. |
| 3. | For a cache hit and bypass, the full-empty bit of the addressed block is reset and processor 700 is turned off. The cache 750 transfers the requst to memory for the two data words. As soon as the two words are available, the processor 700 is turned on and the first data word is transferred to it on the subsequent T clock pulse. The processor 700 receives the second data word on the next T clock pulse. The data words are not written into cache. |
| 4. | For a cache miss and bypass, the same operations take place as in the case of the cache hit and bypass, except that there is no change in full-empty bits. |
| DMEM = 1011—Read Remote (RD-RMT) | The read remote command is used to circumvent normal cache read actions. When the command is received, processor 700 is turned off and the request is transferred to the main memory. When the requested word |

-continued
CPU/CACHE INTERFACE LINES

| Designation | Description |
|---|---|
| | pair has been fetched from memory, the first word is given to processor 700 and it is turned on the subsequent T clock pulse. The second data word is transferred to processor 700 on the next T clock pulse. The order in which the data words are transferred is even word and then odd word. No changes are made within cache 750. |
| | DMEM=1100—Write Single (WRT-SNG) The write single command is used to write data into memory. There are two possible sequences of operation for this command. |
| | 1. For a cache hit, the cache 750 transfers the request to memory. When it is accepted the data word is transferred to memory. The data word is also written into cache 750. |
| | 2. For a cache miss, the same operations take place as the cache hit axcept that no change is made to the cache 750. |
| | DMEM=1110—Write Double (WRT-DBL) The write double command is used to write two data words into memory. This command is carried out in a manner similar to the write single command except that two words are transferred/written rather than one word. |
| | DMEM=1111—Write Remote (WRT-RMT) The write remote command is used to circumvent normal cache write actions in that when the addressed words are in cache 750, they are not updated. The cache 750 transfers the request to memory and when accepted, the two data words are transferred to memory. |
| HOLD-C-CU | This line extends from processor 700 to cache 750. When set to a binary ONE, this control signal specifies that the cache 750 is to assume a HOLD state for requests or data transfers. |
| CANCEL-C | This line extends from processor 700 to cache 750. When set to a binary ONE, this control signal indicates that the cache 750 should abort any processor command which is currently being executed. |
| CAC-FLUSH | This line extends from processor 700 to cache 750. When set to a binary ONE, it starts a flush of the cache 750 (i.e., the cache 750 is forced to look empty by resetting all of the full-empty bits). |
| RD-EVEN | This line extends from processor 700 to cache 750. When the cache makes a double word request to the SIU, the even word is saved in a special register (REVN). When RD-EVEN line is set to a binary ONE, the contents of the REVN register are gated onto the ZDI lines via the ZDIN switch. |
| ZAD0 0–23, RAD0 24–35, P0–P3 | These 40 undirectional lines extend from processor 700 to cache 750. The lines are used to transfer ZAC commands and write data words to cache 750. When the DREQ CAC line is forced to a binary ONE, ZAC command and in the case of a write type of command, the write data words are transferred during the one or two cycles following the ZAC command. The commands encoded onto the DMEM lines may or may |
| RD-IBUF | not be the same as the ZAC command. This line extends from the processor 700 to cache 750. When set to a binary ONE, the line indicates that processor 700 is taking the instruction from the instruction register RIRA. In most cases, it is used to start the fetching of the next instruction to be loaded into RIRA. |
| DZD 0–3 | These four lines extend from processor 700 to cache 750. These lines transfer odd word zone bit signals for write double commands. |
| BYP-CAC | This line extends from processor 700 to cache 750. When set to a binary ONE, this line causes the cache 750 to request data words from main memory for read type instructions. When a cache hit occurs, the block containing the requested data is removed from cache 750 by resetting the full-empty bit associated therewith. For write single or double commands, the data is written into cache 750 when a cache hit occurs. |
| WRT-SGN | This line extends from the cache 750 to processor 700. It is used to signal the processor 700 during write commands that the cache 750 has completed the transfer of ZAC commands and data words to the SIU 100. |
| FPIM-EIS | This line extends from processor 700 to cache 750. When forced to a binary ONE, it signals cache 750 that processor 700 is issuing an IF1 command for additional EIS descriptors. |
| DSZ1 | This line extends from the processor 750 to cache 750. The state of this line specifies to cache 750 the order in which words are to be sent to the processor 700 when a read double command is preformed. |
| NO-GO | This line extends from processor 700 to cache 750. When forced to a binary ONE, it indicates that processor 700 executed a transfer instruction which is a NO-GO. This signals cache 750 that it should cancel the IF1 command it received when it was a miss and ignore the IF2 command which is currently applied to the DMEM lines. |
| RD-IBUF/ZDI | This line extends from processor 700 to cache 750. It causes the cache 750 to access the data word at the address contained in the alternate instruction register and put this data on the ZDI lines. For an outstanding LDQUAD command, the cache 750 holds processor 700 when line RD-IBUF/ZDI is forced to a binary ONE. |
| FRD-DBL | This line extends from processor 700 to cache 750. This signals cache 750 in advance that the processor 700 is requesting that a read double operation be performed. |
| FODD | This line extends from processor 700 to cache 750. This line is used in conjunction with the FRD-DBLE line to signal the order of the words being requested. When this line is a binary ONE, this indicates that the order is odd followed by even. |
| ZDI 0–35 P0, P1, P2, P3 | These 40 unidirectional lines extend from cache 750 to processor 700. They apply data from the cache 750 to the processor 700. |
| ZIB 0–35 P0, P1, P2, P3 | These 40 unidirectional lines extend from cache 750 to processor 700. |

| -continued | |
|---|---|
| CPU/CACHE INTERFACE LINES | |
| Designation | Description |
| | They apply instructions to the processor 700. |
| I BUF-EMPTY | This line extends from cache 750 to processor 700. When set to a binary ONE, this line indicates that cache 750 has transferred the last instruction from the current instruction block. |
| I BUF-RDY | This line extends from cache 750 to processor 700. When set to a binary ONE, the line indicates that there is at least one instruction in the current instruction block in cache 750. The line is set to a binary ZERO to indicate a non-ready condition as follows:<br>1. Whenever the instruction address switches from the last instruction of an IF1 block in cache to the first instruction of an IF2 block not in cache and not in the IBUF2 buffer.<br>2. Whenever instructions are being fetched from the IBUF1 or IBUF2 buffer and the next instruction to be fetched is in a two word pair which has not been received from memory. |
| I BUF-FULL | This line extends from cache 750 to processor 700. This line indicates that there are at least four instructions in the current instruction block or it has at least one instruction and an outstanding IF2 request. |
| CP STOP | This line extends from cache 750 to processor 700. When forced to a binary ONE state, the line signals that the processor 700 is held or required to wait or halt its operation. In the case of a read miss condition due to a processor command, processor 700 is held on the subsequent T clock cycle pulse. When released, the DATA RECOV line is forced to a binary ONE to restrobe the affected processor registers(s). When the RDIBUF/ZDI line is forced to a binary ONE before the data is received from memory, processor 700 is held prior to the subsequent T clock pulse. When released, the requested data is made available to processor 700 on the ZDI lines and is used on the subsequent T clock pulse. |
| DATA-RECOV | This line extends from the cache 750 to processor 750. It is used to restrobe processor registers following the stopping of the processor 700 in response to the detection of a cache miss condition or read bypass condition. At the end of the cycle in which the DREQ CAC line is forced to a binary ONE, the miss condition is detected but processor 700 cannot be stopped until after the subsequent T clock pulse. Therefore, bad data/instructions are strobed into the processor registers from the ZDI/ZIB lines. When the requested data/instructions become available, the DATA RECOV line is forced to a binary ONE to restrobe the registers which were strobed during the last cache request. |
| ZPTR-OUT 0-1 | These two lines extend from cache 750 to processor 700. These lines are coded to specify the two least significant bits of the address of the instruction contained in the |

| -continued | |
|---|---|
| CPU/CACHE INTERFACE LINES | |
| Designation | Description |
| | RIRA instruction register or the I buffer |

General Description of Processor 700—FIG. 2

Referring to FIG. 2, it is seen that the host processor 700 includes an execution control unit 701, a control unit 704, an execution unit 714, a character unit 720, an auxiliary arithmetic and control unit (AACU) 722, and multiply-divide unit 728, which are interconnected as shown. Additionally, the control unit 704 has a number of interconnections to the cache unit 750 as shown.

The execution control unit 701 includes an execution control store address preparation and branch unit 701-1, and an execution control store 701-2. The store 701-2 and unit 701-1 are interconnected via buses 701-3 and 701-6 as shown.

The control unit 704 includes a control logic unit 704-1, a control store 704-2, an address preparation unit 704-3, data and address output circuits 704-4, and an XAQ register section 704-5 which interconnect as shown.

As seen from FIG. 2, the SIU interface 600 provides a number of input lines to the cache unit 750. The lines of this interface have been described in detail previously. However, in connection with the operation of cache unit 750, certain ones of these lines are specially coded as follows.

1. MITS 0-3 for Reads are coded as follows:
   bits 0-1=00;
   bits 2-3=Transit block buffer address containing the ZAC command for current read operation.
   For Write Operation bit 0-3=Odd word zone
2. MIFS lines are coded as follows:
   bit 0=0;
   bit 1=0 even word pairs (words 0,1);
   bit 1=1 odd word pairs (words 2,3);
   bits 2-3=Transit block buffer address containing the ZAC command for the data being received.

As concerns the interface lines DFS 00-35, P0-P3, these lines convey read data to cache unit 750. The lines DTS 00-35, P0-P3 are used to transfer data and commands from cache 750 to the SIU 100.

The control unit 704 provides the necessary control for performing address preparation operations, instruction fetching/execution operations and the sequential control for various cycles of operation and/or machine states. The control is generated by logic circuits of block 704-1 and by the execution control unit 701 for the various portions of the control unit 704.

The XAQ register section 704-5 includes a number of program visible registers such as index registers, an accumulator register, and quotient register. Other program visible registers, such as the instruction counter and address registers, are included within the address preparation unit 704-3.

As seen from FIG. 2, the section 704-5 receives signals from unit 704-3 representative of the contents of the instruction counter via lines RIC 00-17. Also, lines ZRESA 00-35 apply output signals from the execution unit 714 corresponding to the results of operations performed upon various operands. The section 704-5 also receives an output signal from the auxiliary arithmetic and control unit via lines RAAU0-8.

The section 704-5 provides signals representative of the contents of one of the registers included within the section as an input to the address preparation unit 704-3. The address preparation unit 704-3 forwards the information through a switch to the execution unit 714 via the lines ZDO 0-35. Similarly, the contents of certain ones of the registers contained within section 704-5 can be transferred to the execution unit 714 via the lines ZEB 00-35. Lastly, the contents of selected ones of these registers can be transferred from section 704-5 to the multiply/divide unit 728 via the lines ZAQ 00-35.

The address preparation unit 704-3 generates addresses from the contents of various registers contained therein and applies the resultant logical, effective and-/or absolute addresses for distribution to other units along the lines ASFA 00-35. The address preparation unit 704-3 receives the results of operations performed on a pair of operands by the execution unit 714 via the lines ZRESB 00-35. The unit 704-3 receives signals representative of the contents of a pair of base pointer registers from the control logic unit 701 via the lines RBASA and RBASB0-1. Outputs from the mutiply/divide unit 728 are applied to the address preparation unit 704-3. Lastly, the contents of a secondary instruction register (RSIR) are applied as input to the unit 704-13 via the lines RSIR 00-35.

The data and address output circuits 704-4 generate the cache memory address signals which it applies to the cache unit 750 via the lines RAD0/ZAD0 00-35. These address signals correspond to the signals applied to one of the sets of input lines ZDI 00-35, ASFA 00-35 and ZRESB 00-35 selected by switches included within the circuits of block 704-4. These circuits will be further discussed herein in greater detail.

The control logic unit 704-1 provides data paths which have an interface with various units included within the cache unit 750. As described in greater detail herein, the lines ZIB 00-35 provide an interface with an instruction buffer included within the cache 750. The lines ZDI 00-35 are used to transfer data signals from the cache 750 to the control logic unit 704-1. The ZPTROUT lines are used to transfer address information from cache 750 to unit 704-1. Other signals are applied via the other data and control lines of the cache-CPU interface 604. These lines include the CP-STOP line shown separately in FIG. 2.

As seen from FIG. 2, the control logic unit 704-1 provides a number of groups of output signals. These output signals include the contents of certain registers, as for example, a basic instruction register (RBIR) whose contents are applied as an input to control store 704-2 via the lines RBIR 18-27. The control logic unit 704-1 receives certain control signals read out from control store 704-2 via the lines CCSD0 13-31.

The control logic unit 704-1 also includes a secondary instruction register (RSIR) which is loaded in parallel with the basic instruction register at the start of processing an instruction. The contents of the secondary instruction register RSIR 00-35, as previously mentioned, are applied as inputs to the address preparation unit 704-3. Additionally, a portion of the contents of the secondary instruction register is applied as an input to the auxiliary arithmetic control unit 722 via the lines RSIR 1-9 and 24-35.

The control store 704-2 as explained herein provides for an initial decoding of program instruction op-codes and therefore is arranged to include a number of storage locations (1024), one for each possible instruction opcode.

As mentioned, signals applied to lines RBIR 18-27 are applied as inputs to control store 704-2. These signals select one of the possible 1024 storage locations. The contents of the selected storage location are applied to the lines CCSD0 13-31 and to CCSD0 00-12 as shown in FIG. 2. The signals supplied to lines CCSD0 00-12 correspond to address signals which are used to address the execution control unit 701 as explained herein.

The remaining sections of processor 700 will now be briefly described. The execution unit 714 provides for instruction execution wherein unit 714 performs arithmetic and/or shift operations upon operands selected from the various inputs. The results of such operations are applied to selected outputs. The execution unit 714 receives data from a data input bus which corresponds to lines RDI 00-35 which have as their source the control logic unit 704-1. The contents of the accumulator and quotient registers included within section 704-5 are applied to the execution unit 714 via the lines ZEB 00-35 as mentioned previously. The signals applied to the input bus lines ZDO 00-35 from the address preparation unit 704-3 are applied via switches included within the execution unit 714 as output signals to the lines ZRESA 00-35 and ZRESB 00-35, as shown in FIG. 2. Additionally, execution unit 714 receives a set of scratch pad address signals from the auxiliary arithmetic and control unit 722 applied via the lines ZRSPA 00-06. Additionally, the unit 722 also provides shift information to the unit 714 via the lines ZRSC 00-35.

The character unit 720 is used to execute character type instructions which require such operations as translation and editing of data fields. As explained herein, these types of instructions are referred to as extended instruction set (EIS) instructions. Such instructions which the character unit 720 executes include the move, scan, and compare type instructions. Signals representative of operands are applied via lines ZRESA 00-35. Information as to the type of character position within a word and the number of bits is applied to the character unit 720 via the input lines ZDB 00-07.

Information representative of the results of certain data operations is applied to the unit 722 via the lines ZOC 00-08. Such information includes exponent data and data is hexadecimal form. The character unit 720 applies output operand data and control information to the unit 722 and the unit 728 via the lines RCHU 00-35.

The auxiliary arithmetic and control unit 722 performs arithmetic operations upon control information such as exponents used in floating point operations, calculates operand lengths and pointers and generates count information. The results of these operations are applied to execution unit 714 via the lines ZRSPA 00-06 and lines ZRSC 00-06 as mentioned previously. Information signals corresponding to characters such as 9-bit characters, 6-bit characters, decimal data converted from input hexadecimal data, quotient information and sign information are applied to section 704-5 via the lines RAAU 00-08.

As seen from FIG. 2, the unit 722 receives a number of inputs. Character pointer information is applied via the lines ASFA 33-36. EIS numeric scale factor information and alphanumeric field length information are applied to the unit 722 via the lines RSIR 24-35. Other signals relating to fetching of specific instructions are applied via the lines RSIR 01-09. Exponent signals for floating point data are applied to the unit 722 via the lines ZOC 00-08 while floating point exponent data signals from unit 704-1 are applied via the lines RDI 00-08. Shift count information signals for certain instructions (e.g. binary shift instructions) are applied to the unit via the lines RDI 11-17. As concerns the input signals applied to the lines RCHU 00-35, lines 24-35 apply signals corresponding to the length of EIS instruction fields while 18-23 apply address modification signals to the unit 722.

The last unit is the multiply/divide unit 728 which provides for high-speed execution of multiply and divide instructions. This unit may be considered conventional in design and may take the form of the multiply unit described in U.S. Pat. No. 4,041,292 which is assigned to the same assignee as named herein. The unit 728 as seen from FIG. 2 receives multiplier dividend and divisor input signals via the lines RCHU 00-35. The multiplicand input signals from register section 704-5 are applied via the lines ZAQ 00-35. The results of the calculations performed by the unit 728 are applied as output signals to the lines ZMD 00-35.

As mentioned previously, the cache unit 750 transfers and receives data and control signals to and from the SIU 100 via the data interface line 600. The cache unit 750 transfers and receives data and control signals to and from the processor 700 via the lines of interface 604. Lastly, the cache unit 750 receives address and data signals from the circuits 704-4 via the lines RAD0-/ZAD0 00-35.

Detailed Description of the Processor 700

Certain ones of the sections which comprise the processor 700 illustrated in FIG. 2 will now be discussed in greater detail with respect to FIGS. 3a through 3e.

Figure 3A:
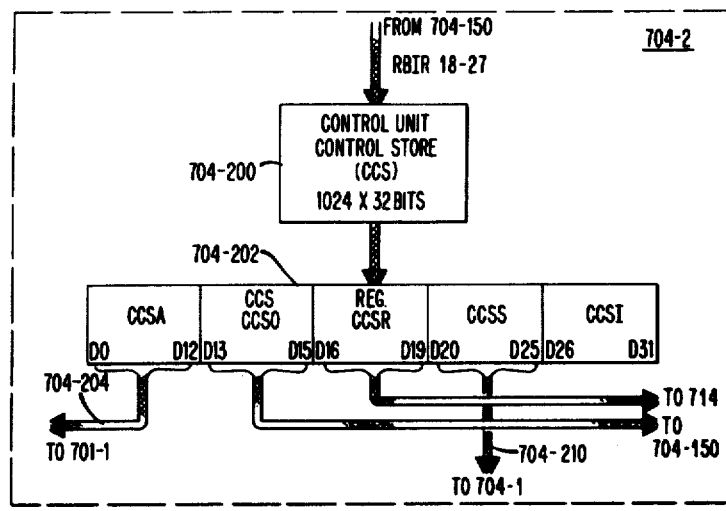
Figure 3E:
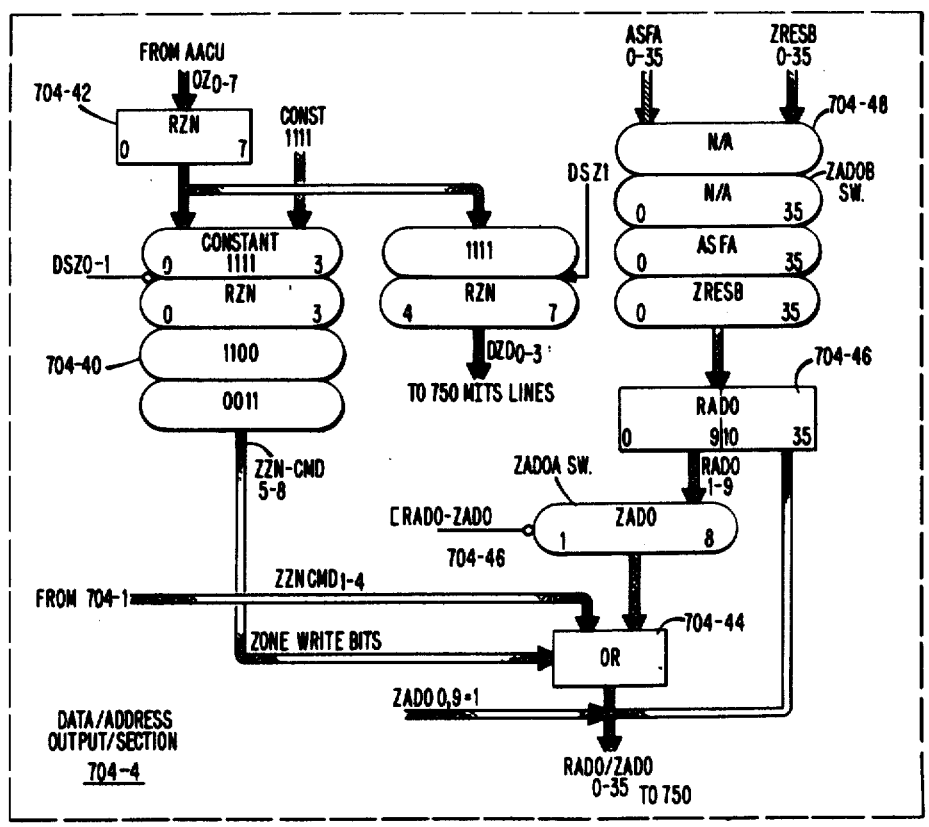
Figure 3B:
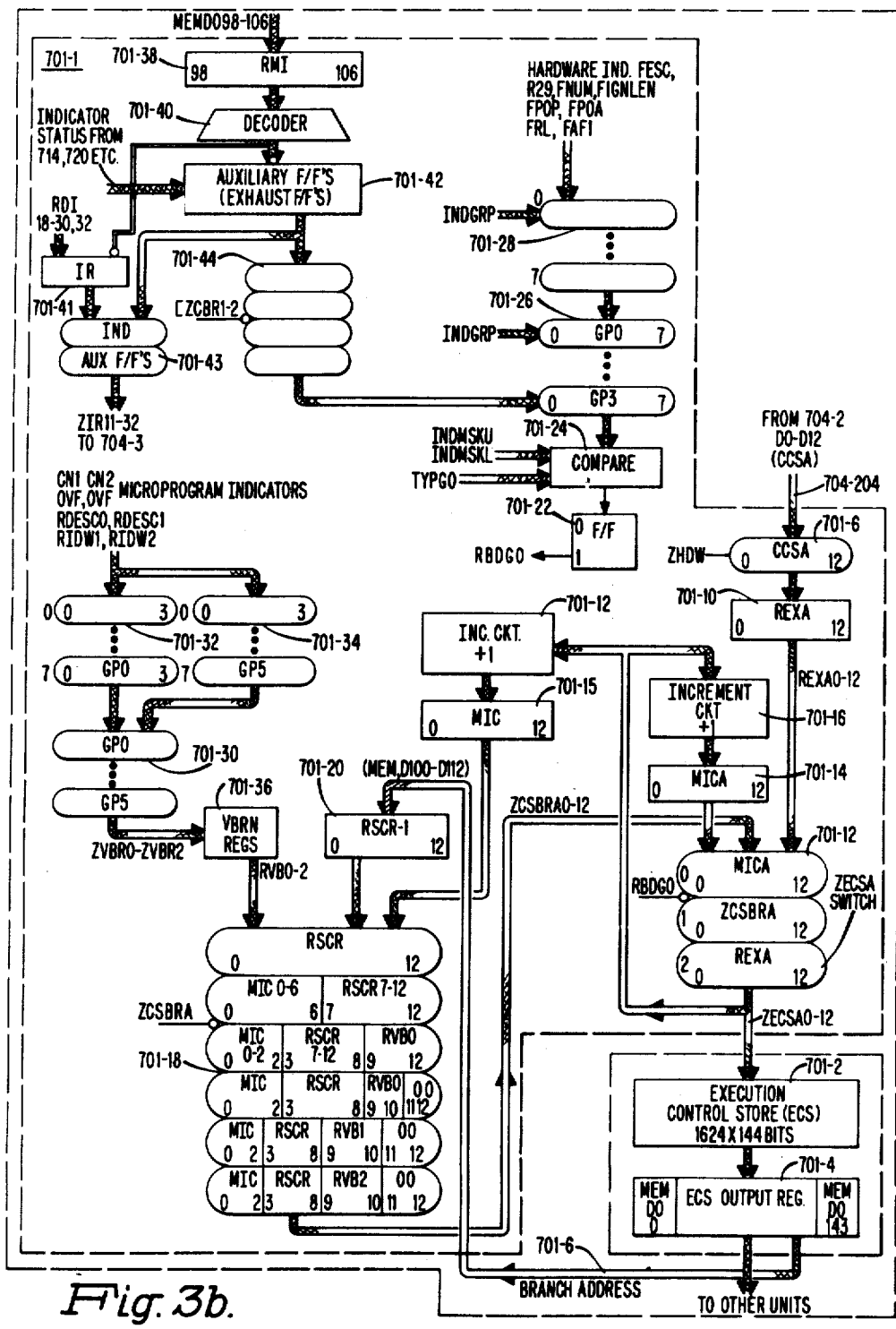

Referring to FIGS. 3a and 3b, it is seen that the processor includes two control stores: (1) the control unit control store (CCS) 704-200 which forms part of the control unit 704; and (2) the execution control store (ECS) 701-3 which is included within the execution control unit 701.

The cache oriented processor 700 of the preferred embodiment of the present invention includes a three stage pipeline. This means that the processor 700 requires at least three processor cycles to complete the processing of a given program instruction and can issue a new instruction at the beginning of each cycle. Hence, a number of program instructions may be in some stage of processing at any given instant of time.

In the preferred embodiment, the processor 700 includes the following stages: an instruction cycle (I) wherein instruction interpretation, op-code decoding and address preparation take place; a cache cycle (C) wherein access to the cache unit 750 is made ensuring high performance operation; and, an execution cycle (E) wherein instruction execution takes place under microprogram control.

As concerns control, during the I cycle, the op-code of the instruction applied via lines RBIR 18-27 is used to access a location within control store 704-2. During a C cycle, the accessed contents from control store 704-2 are applied to lines CCS D0 00-12 and in turn used to access one of the storage locations of the execution control store 701-2. During the C cycle, the microinstructions of the microprogram used to execute the instruction are read out from the execution control store 701-2 into a 144-bit output register 701-4. The signals designated MEMD0 00-143 are distributed to the various functional units of processor 700. During an E cycle, the processor executes the operation specified by the microinstruction.

Figure 6A:
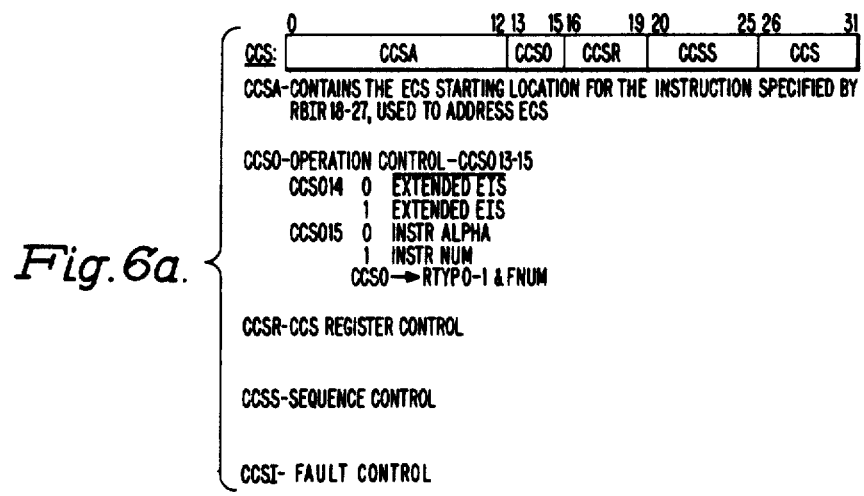
FIG. 6a illustrates the format of the control store control unit of FIG. 1.

Referring specifically to FIG. 2, it is seen that the control store 704-2 includes a control unit control store (CCS) 704-200 which is addressed by the op-code signals applied to the lines RBIR 18-27. The CCS 704-200, as mentioned previously, includes 1024 storage locations, the contents of which are read out into an output register 704-202 during an I cycle of operation. FIG. 6a shows schematically the format of the words stored within the control store 704-200.

Referring to FIG. 6a, it is seen that each control unit control store word includes five fields. The first field is a 13-bit field which contains an ECS starting address location for the instruction having an op-code applied to lines RBIR 18-27. The next field is a three bit field (CCSφ) which provides for the control of certain operations. The bit interpretations of this field depend upon its destination and whether it is decoded by specific logic circuits or decoded under microprogram control. The next field is a 4-bit field which provides for certain register control operations.

The next field is a 6-bit sequence control field which is coded to specify a sequence of operations to be performed under hardwired logic circuit control as well as the type of cache operation. In the present example, this field is coded as $75_8$. The last field is a 6-bit indicator field which is not pertinent to an understanding of the present invention.

As seen from FIG. 3a, signals corresponding to the CCSA field of a control unit control store word are applied via a path 704-204 as an input to the execution generation circuits 701-7. Signals corresponding to the CCSR field are applied as an input to the execution unit 714 via path 704-206. Additionally, the same signals are applied as an input to the address preparation unit 704-3 via another path 704-208.

Signals representative of the sequence control field apply as an input to the sequence control logic circuits 704-100 via path 704-210. As explained herein, these circuits decode the sequence control field and generate signals for conditioning the cache unit 750 to perform the operation designated.

As mentioned previously, the execution address generation circuit 701-1 receives an input address which corresponds to field CCSA from the control store 704-2. As seen from FIG. 3b, these circuits include an input address register 701-10 whose output is connected to one position of a four position switch 701-12 designated ZECSA. The output of the switch serves as an address source for the control store 701-2. The first position of the switch 701-12 is connected to receive an address from the MICA register 701-14. The contents of register 701-14 are updated at the end of each cycle to point to the location within the ECS control store following the location whose contents were read out during that cycle.

The second position selects the address produced from the ZCSBRA branch address selector switch 701-18. The third position selects the address of the first microinstruction in each microprogram provided by the CCS control store which is loaded into the REXA register 701-10. When the CCS output is not available at the termination of a microprogram, a predetermined address (octal address 14) is automatically selected.

The first position of branch switch 701-18 receives signals corresponding to a branch address read out from store 701-2 into register 701-4 which is in turn forwarded to a return control register 701-20. The second, third and fourth positions of switch 701-18 receive signals from RSCR register 701-20, an MIC register 701-15 and the contents of a number of vector branch registers 701-36. The MIC register 701-15 stores an address which points to the microinstruction word following the microinstruction word being executed. This address corresponds to the address from switch 701-12 incremented by one by an increment circuit 701-12.

The vector branch registers include a 4-bit vector branch register 0 (RVB0), a 2-bit vector branch register 1 (RVB1) and a 2-bit vector branch register 2 (RVB2). These registers are loaded during a cycle of operation with address values derived from signals stored in a number of different indicator flip-flops and registers applied as inputs to the number of groups of input multiplexer selector circuits 701-32 and 701-34. The outputs of the circuits 701-32 and 701-34 are applied as inputs to two position selector circuits 701-30. These circuits in turn generate the output signals ZVBR0, ZVBR1 and ZVBR2 which are stored in the register 701-36.

The switch 701-36 provides an address based upon the testing of various hardware indicator signals, state flip-flop signals selected via an INDGRP field. The branch decision is determined by masking (ANDING) the selected indicator set with the INDMSKU and INDMSKL fields of a microinstruction word. If a vector branch is selected, INDMSKU is treated as 4 ZERO bits. The "OR" of the 8 bits is compared to the state defined by the TYPG and GO microinstruction fields. The hardware signals are applied via a number of data selector circuits 701-28 only one of which is shown whose outputs are in turn applied as inputs to a further five position multiplexer selector circuit 701-26. The output of the multiplexer circuit 701-26 feeds a comparison circuit which "ands" the indicator signals with the mask signals to produce the resulting signals MSKCBR0-7.

The signals MSKCBR0-7 are applied to another comparison circuit which "ands" the signals with the condition branch test signals TYPGGO to set or reset a branch decision flip-flop 701-22 which produces a signal RBDGO whose state indicates whether branching is to take place. The output signal RBDGO is applied as a control input to the first two positions of switch 701-12. When the branch test condition is not met (i.e., signal RBDGO=0), then the incremented address from the MICA register 701-14 is selected.

In some instances, as seen herein, it is not possible to test the state of an indicator on the cycle following its formation. For this reason, history registers HR0-HR7, not shown, are provided for register storage of the Group 2 indicators. The states of such stored indicators are selected and tested in a manner similar to that of the other indicators (i.e., mask fields).

Additionally, the unit 701-1 includes a number of indicator circuits, certain ones of these are used to control the operation of certain portions of the processor 700 when the strings being processed by certain types of instructions have been exhausted. These indicator circuits are included in block 701-42 and are set and reset under the control of a field within the microinstruction word of FIG. 6a (i.e., IND6 field). The bits of this field read out from the ECS output register 701-4 are applied to an RMI register 701-38 for decoding by a decoder 701-40. Based upon the state of status indicator signals received from the various processor units (e.g. 714, 720, 722, etc.), the appropriate ones of the auxiliary flip-flops are switched to binary ONE states. The outputs of these flip-flops are applied via the different positions of a 4 position switch 701-44 to the GP3 position of switch 701-26 for testing. The same outputs are applied to a second position of a ZIR switch 701-43 for storage via the ZDO switch 704-304. The ZIR switch 701-43 also receives indicator signals from an indicator register (IR) 701-41. This register is loaded via the RDI lines 18-30 and 32 in response to certain instructions.

The indicator status signals for example include the outputs of different adder circuits (AL,AXP) of the unit 720. These signals will set different ones of a number of exhaust flag flip-flops designated FE11, FE12, FE13, FE1E, FE2E, FE2 and FE3. The FE1E and FE2E flip-flops are set during any FPOA cycle of any instruction. These flip-flops in turn cause the FE11, FE12 and FE13 flip-flops to be set when the outputs from the AL or AXP adder circuits of unit 720 are generated. The setting and resetting of these indicators will be described herein in further detail in connection with the description of operation. However, the exhaust flag flip-flops pertinent to the example given herein are set and reset in accordance with the following Boolean expressions.

SET: FE1E=FPOA+IND6FLD field.
RESET: FE1E=IND6FLD field.
SET: FE2E=FPOA+IND6FLD field.
RESET: FE2E=IND6FLD field.
SET: FE11=IND6FLD field.FE1E (ALES+AXPES+DESC1·AP0−4=0)+IND6FLD field·FE1E.DESC1·(AP0−5=0+APZN+ALZN-)+IND6FLD field.
RESET: FE11=FPOA+IND6FLD field.
SET: FE12=IND6FLD field·FE1E.(ALES+AXPES+FE13).
RESET: FE12=FPOA+IND6FLD field.
SET: FE13=IND6FLD field·FE1E·ALES-+IND6FLD field.
RESET: FE13=FPOA+IND6FLD field.
SET: FE2=IND6FLD field·FE2E·ALES-+IND6FLD field. FE2E·DESC2·(AP0−4=-0+AP0−5=+APZN+ALZN)+(IND6FLD field) FE2E·DESC2+IND6FLD.
RESET: FE2=FPOA+IND6FLD field.
SET: FE3=IND6FLD field·DESC3·(AP0−4=-0+AP0−5+APZN+ALZN)+IND6FLD field·DESC3+IND6FLD.
RESET: FE3=FPOA+IND6FLD field.
Wherein IND6FLD indicates a particular code;
ALES=AL=0 or $\overline{AL-C}$;
AXPES=AXP=0 or $\overline{AXP-C}$;
APZN=AP0−7≦0; and,
ALZN=AL0−11≦0.

The ZCSBRA switch 701-18 is normally enabled when the branch decision flip-flop RBD was set to a binary ONE in the previous cycle. The first position selects a 13-bit branch address from the current microinstruction applied via the RCSR register 701-20. The branch address enables any one of the locations of the ECS control store to be addressed directly. The second position selects the concatenation of the 6 low order address bits from the current microinstruction applied via MIC register 701-15 and the 7 upper bits of the branch address from the current microinstruction applied via the RSCR register 701-20. This permits branches within a 64-word page defined by the contents of the MIC register 701-15 (current location+1).

The third position selects the concatenation of 4 low order bits from the RVB0 vector branch register, 6 bits from the branch field of the current microinstruction stored in RCSR register and the 3 upper bits of the address stored in the MIC register. This permits 16-way branches. The fourth position selects the concatenation of the 2 low order ZEROS with 4 bits from the vector branch register RVB0 with the 4 most significant bits of the branch address field of the current microinstruction and the 3 upper bits of the current address stored in the MIC register. This permits 16-way branches with 3 control store locations between each adjacent pair of destination addresses.

The fifth position selects the concatenation of 2 low order ZEROS with 2 bits from vector branch register RVB1, with the 6 bits of the branch address of the current microinstruction and the upper 3 bits from the MIC register. This permits branches with 4 possible destinations with 3 control store locations between each adjacent pair of destination addresses.

The sixth position selects the concatenation of 2 low order ZEROS with 2 bits from vector branch register RVB2 with the 6 bits of the branch address of the current microinstruction and the upper 3 bits from the MIC register. This permits 4-way branches with 3 control store locations between each adjacent pair of destination addresses.

Figure 6B:
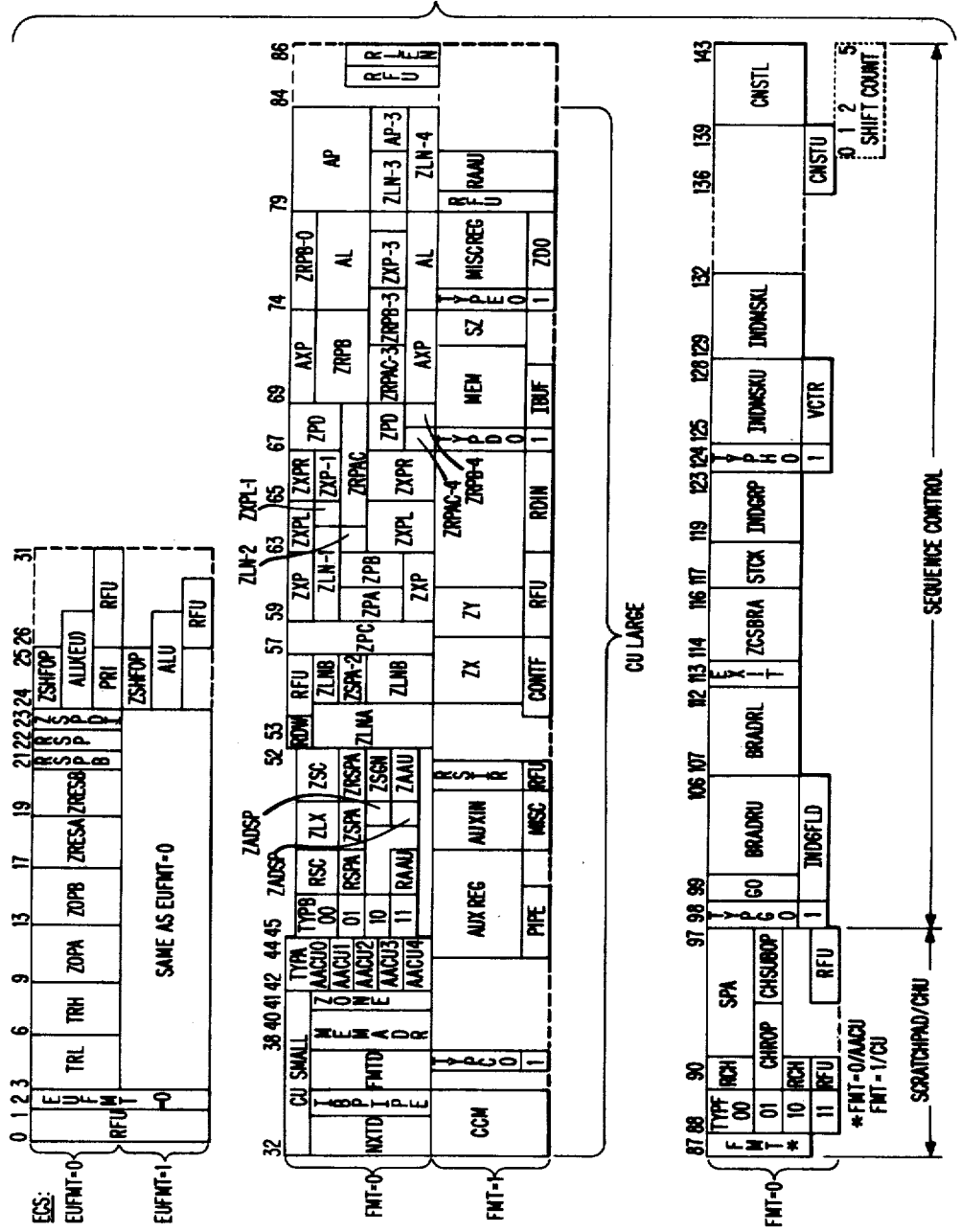
FIG. 6b illustrates the format of the micro-instruction words of the execution control store of FIGS. 2 and 3.

The output of switch 701-12 addresses a specific location within control store 701-2 which causes the read out of a microinstruction word having a format illustrated in FIG. 6b. Referring to that Figure, it is seen that this microinstruction word is coded to include a number of different fields which are used to control the various functional units within processor 700. Only those fields which are related to the present example will be described herein.

| Bits | Field | Description |
|---|---|---|
| Bits 0–1 | | Reserved for Future Use. |
| Bit 2 | EUFMT | Defines which format the EU is to operate with. EUFMT-0 specifies a first microinstruction format while EUFMT=1 specifies an alternate microinstruction format. |
| Bits 3–5 | TRL | TR Low Write Control. Write control of EU temporary registers TR0-TR3. |
| | OXX | No change |
| | 100 | Write TR0 |
| | 101 | Write TR1 |
| | 110 | Write TR2 |
| | 111 | Write TR3 |
| Bits 6–8 | TRH | TR High Write Control. Write control of EU temporary registers TR4-TR7. |
| | OXX | No change |
| | 100 | Write TR4 |
| | 101 | Write TR5 |
| | 110 | Write TR6 |
| | 111 | Write TR7 |
| Bits 9–12 | ZOPA | ZOPA Switch Control. Selects the output of ZOPA switch. |
| | (0) 0000 | TR0 |
| | (1) 0001 | TR1 |
| | (2) 0010 | TR2 |
| | (3) 0011 | TR3 |
| | (4) 0100 | TR4 |
| | (5) 0101 | TR5 |
| | (6) 0110 | TR6 |
| | (7) 0111 | TR7 |
| | (8-11) 10XX | RDI |
| | (12) 1100 | ZEB |
| | (13) 1101 | ZEB |
| | (14) 1110 | ZEB |
| | (15) 1111 | 0 (disable) |
| Bits 13–16 | ZOPB | ZOPB Switch Control. Selects the output of ZOPB switch. |
| Bits 17–18 | ZRESA | ZRESA Switch Control. Selects the output of ZRESA switch. |
| | 00 | ALU |
| | 01 | Shifter |
| | 10 | Scratchpad/RDI switch |
| | 11 | ZDO |
| Bits 19–20 | ZRESB | ZRESB Switch Control. Selects the output of ZRESB switch. |
| | 00 | ALU |
| | 01 | Shifter |
| | 10 | Scratchpad/RDI switch |
| | 11 | ZDO |
| Bit 21 | RSPB | Scratchpad Buffer Strobe Control. Strobes RSPB with ZRESB data. |
| | 0 | No strobe |
| | 1 | Strobe RSPB |
| Bit 22 | RSP | Scratchpad Write Control. |
| | 0· | Read scratchpad |
| | 1 | Write scratchpad |
| Bit 23 | ZSPDI | Scratchpad/RDI Switch Control. Selects the output of the Scratchpad/RDI switch. |
| | 0 | Scratchpad output |
| | 1 | RDI |
| Bits 24–25 | ZSHFOP | Shifter Operand Switch Control. Selects the left operand to the Shifter. |
| | 00 | ZOPA output |
| | 01 | EIS output |
| | 10 | 0 |
| | 11 | Select 0 or −1 depending on bit 0 of right operand to Shifter. |
| Bits 24–27 | ALU | ALU Function Control. Selects the operation applied to the two inputs (A and B) to the ALU. |
| Bits 24–29 | N/a | |
| Bits 26–31 | RFU | Reserved for Future Use. |
| Bits 30–31 | ZALU | ALU Switch Control. Selects the output of ZALU switch. |
| Bits 32–33 | NXTD | Next Descriptor Control. Strobes RBASB and RDESC registers. |
| | 00 | RBASB 00 / RDESC 00 |
| | 01 | RBASB 01 / RDESC 01 |
| | 10 | RBASB Alt / RDESC 10 |
| | 11 | No strobes (default) |
| Bits 32–35 | CCM | Control constant field referenced by the CONTF field. |
| Bits 34–35 | IBPIPIE | IBUF/Pipeline Control. Selects the reading of IBUF or the pipeline operation. |
| | 00 | No operation |
| | 01 | Read IBUF/ZDI (Alt) |
| | 10 | Type 1 Restart Release or |
| | 11 | Type 4 Restart Wait |
| Bits 36–37 | FMTD | Selects the loading of various CU registers and indicated the interpretation to be given to the MEMADR field for small CU control. |
| | 00 | No operation |
| | 01 | RADO ASFA |
| | 10 | RADO ZRESB |
| | 11 | RADO ASFA |
| Bits 38–40 | MEMADR | Cache Control. Selects cache operations. The complete interpretation for this control is a function of the FMTD control. |
| | 000 | No operation |
| | 001 | Read Sgl |
| | 010 | Load Quad |
| | 011 | Preread |
| | 100 | Write Sgl |

|  |  | -continued |  |  |  |
|---|---|---|---|---|---|
|  | 101 | Write Dbl |  |  | Strobes the R1DW or R2DW register a a function of the RDESC register. |
|  | 110 | Read Sgl Trans (for FMTD = 11 only) | Bits 53-54 | ZLNA | ZLNA Switch Control. Selects output of ZLNA switch. |
|  | 111 | Write Sgl Word (for FMTD = 11 only) | Bits 54-57 | CONTF | Miscellaneous Flip-Flop Control. |
| Bit 41 | ZONE | Zone Control. Indicates zone or no zone for small CU control. |  |  | Selects one of four groups of control flip-flops to be set or reset by the control constant field (CCM). The |
|  | 0 | No zone |  |  | flip-flops include those of blocks |
|  | 1 | Zone |  |  | 704-104 and 704-110. |
| Bits 42-44 | TYPA | Type A Flag. Indicates the type A overlayed fields being used. | Bits 55-56 | ZLNB | ZLNB Switch Control. Selects the output of ZLNB switch. |
|  | 000 | Type A=0 fields | Bits 55-56 | ZSPA(2) Type A=2 | ZSPA Switch, RSPA Register Control. |
|  | . |  |  |  | Selects ZSPA switch output and strobes RSPA register. |
|  | . |  | Bits 57-58 | ZPC | ZPC Switch Control. |
|  | . |  |  |  | Selects the output of ZPC switch. |
|  | 100 | Type A=4 fields | Bits 59-62 | ZXP | ZXP Switch, RXP Register Bank Control. |
| Bits 44-46 | PIPE | Pipeline Control Selects the type of restart to be initiated |  |  | Selects ZXP switch output and the RXP register into which it will be written. |
|  | 000 | No operation |  |  |  |
|  | 001 | Type 1 Restart and Release |  |  |  |
|  | 010 | Type 2 Restart | Bits 59-63 | ZLN(1) (Type A = 1) | ZLN Switch, RLN Register Bank Control. |
|  | 011 | Type 3 Restart |  |  |  |
|  | 100 | Type 4 Restart |  |  |  |
|  | 101 | Type 5 Release |  |  | Selects ZLN switch output and the RLN register into which it will be written. |
|  | 110 | Type 6 Restart |  |  |  |
| Bits 44-47 | AUXREG | Auxiliary Register Write Control | Bits 59-60 | ZPA | ZPA Switch Control. Selects the output of ZPA switch. |
|  |  | Selects an auxiliary register or combinations to be strobed with data selected by the AUXIN control field. |  |  | 00 = RP0 . |
|  | (0) 0000 | No strobe |  |  | . |
|  | (1) 0001 | RRDXA |  |  | . |
|  | (2) 0010 | R29 |  |  | 11 = RP3 |
|  | (3) 0011 | R29, RRDXA, FRL, RID | Bits 61-62 | ZPB | ZPB Switch Control. |
|  | (4) 0100 | RRDXB |  |  | Selects the output of ZPB switch. |
|  | (5) 0101 | RTYP |  |  | 00 = RP0 |
|  | (6) 0110 | RBASA |  |  | . |
|  | (7) 0111 | RBASA, RTYP |  |  | . |
|  | (8) 1000 | RBASB |  |  | . |
|  | (9) 1001 | RDESC |  |  | . |
|  | (10) | RBASA, R29, RRDXA |  |  | 11 = RP3 |
| Bits 45-46 | TYPB | Type B flag. Indicates the Type B overlayed fields being used. | Bits 63-64 | ZXPL (Type A = 0) | ZXPL Switch Control. |
|  | 00 | Type B = 0 fields |  |  | Selects the output of ZXPL switch. 00 = RXPA . |
|  | . |  |  |  | . |
|  | . |  |  |  | . |
|  | . |  |  |  | . |
|  | 11 | Type B = 3 fields |  |  | 11 = RXPD |
| Bit 47 | RSC | RSC Strobe Control. Strobes the RSC register. (Shift Count) | Bit 63 | ZLN(2) Type A = 2) | ZLN Switch, RLN Register Bank Control. |
| Bit 47 | RSPA | RSPA Strobe Control. Strobes the RSPA register. |  |  | Selects ZLN switch output and the RLN register into which it will be written. |
| Bits 47-48 | N/A |  |  |  |  |
| Bit 47 | RAAU | RAAU Strobe Control. Strobes RAAU register. | Bits 63-66 | RDIN | RDI In Control. Selects the data to be strobed into |
| Bits 48-49 | ZLX | ZLX Switch Control. Selects the output of the ALX switch. |  |  | the RDI register and selects one of the modification control fields (MF1-MF3,m TAG) of an instruction word. RDI |
| Bits 48-49 | ZSPA | ZSPA Switch Control. Selects the output of the ZSPA switch. |  |  | strobe may also be controlled by the MISCREG field. |
| Bits 48-50 | AUXIN | Auxiliary Register Input Control. Selects data to be strobed into auxiliary register(s). | Bit 64 | ZXPL(1) (Type A=1) | ZXPL Switch Control. |
|  |  |  |  |  | Selects the output of ZXPL switch. |
| Bit 49 | ZADSP | ZADSP Switch Control. Selects the output of ZADSP switch. | Bits 64-68 | ARPAC (Type A=2) | ZRPA Switch, ZRPC Switch, RP0-3 Register Band Control. |
| Bits 50-52 | ZSC | ZSC Switch Control. Selects the output of ZSC switch. |  |  | Selects ZRPC and ZRPA switch outputs and the RP0-3 register into which the ZRPA outut will be written. |
| Bits 50-52 | ZRSPA | ZRSPA Switch Control. Selects the output of ZRSPA switch. |  |  |  |
| Bits 50-52 | ZAAU | ZAAU Switch Control. | Bits 65-66 | ZXPR (Type A=0) | ZXPR Switch Control. |
| Bit 51 | RSIR | RSIR Register Strobe. Strobes the RSIR register as a function of the AUXIN field. |  |  | Selects the output of ZXPR switch. |
| Bit 53 | RDW | R1DW, R2DW, Register Strobe. | Bits 65-66 | ZXP(1) | ZXP Switch, RXP Register |

-continued

| | | |
|---|---|---|
| | (Type A=1) | Bank Control. Selects ZXP switch output and the RXP register into which it will be written. |
| Bits 67-68 | ZPD (Type A=0) | ZPD Switch Control. Selects the output of ZPD switch. |
| Bit 67 | ZRPAC(4) (Type A=4) | ZRPA Switch, ZRPC Switch, RP0-3 Register Bank Control. Selects CP4 from ZRPA switch and strobes the RP1 register. |
| Bit 67 | TYPD | Type D Flag. Type D Flag Which indicates D overlayed fields. |
| Bit 68 | ZRPB(4) (Type A=4) | ZRPB Switch, RP4-7 Register Bank Control. Selects 0 from ZRPB switch and strobes the RP4 register. |
| Bits 68-71 | MEM | Cache Memory Control. Selects the cache operation in conjunction with the SZ control. (0) 0000 No operation . . . (15) 1111 Write Remote |
| Bits 68-70 | IBUF | IBUF Read Control. Selects the destination of IBUF data when reading IBUF. |
| Bits 69-73 (Type A=0) | AXP | ZXPA Switch, ZXPB Switch, AXP Adder, ZAXP Switch, RE Register Control. Selects ZXPA and ZXPB switch outputs, the AXP adder function applied to them, and the ZAXP switch output. Also strobes the RE register. |
| Bits 69-73 | ZRPB (type A=1) | ZRPB Switch, RP4-7 Register Bank Control. Selects ZRPB switch output and the RP4-7 register into which it will be written. |
| Bits 69-71 | ZRPAC-3 (Type A=3) | ZRPA Switch, ZRPC Switch, RP0-3 Register Bank Control. Selects ZRPC and ZRPA switch outputs and the RPO-3 register into which the ZRPA output will be written. |
| Bits 72-74 | ZRPB(3) (Type A=3) | ZRPB Switch, RP4-7 Register Bank Control. Selects ZRPB switch output and the RP4-7 register into which it will be written. |
| Bits 72-73 | SZ | Size/Zone Cache Control. Controls cache operations in conjunction with the MEM control field. |
| Bits 74-78 | ZRPB( ) (Type A=0) | ZRPB Switch, RP4-7 Register Bank Control. Selects ZRP switch output and the RP4-7 register into which it will be written. |
| Bits 74-78 | AL (Type A=1) | ZALA Switch, ZALB Switch, AL Adder Control. Selects ZALA and ZALB switch outputs and the AL adder function applied to them. |
| Bit 74 | TYPE | Type E Flag. Type E flag which indicates the type E overlayed fields. |
| Bits 75-77 | ZXP(3) (Type A=3) | ZXP Switch, RXP Register Bank Control. |

-continued

| | | |
|---|---|---|
| | | Selects ZXP switch output and the RXP register into which it will be written. |
| Bits 75-78 | MISCREG | Miscellaneous Register Control. Selects various operations on miscellaneous registers (e.g. RBIR, RDI, RLEN, RSPP). |
| Bits 75-78 | ZDO | ZDO Switch Control. Selects the output of the ZDO switch. |
| Bit 78 | ZIZN | ZIZN Switch Control. Selects the output of ZIZN switch. |
| Bits 79-83 | AP | ZAPA Switch, ZAPB Switch, AP Adder Control. Selects ZAPA and ZAPB switch output and the AP adder function applied to them. |
| Bits 79-81 | ZLN(3) (Type A=3) | ZLN Switch, RLN Register Bank Control. Selects ZLN switch output and the RLN register into which it will be written. |
| Bits 79-83 | ZLN(4) (Type A=4) | ZLN Switch, RLN Register Bank Control. Selects ZLN output and the RLN register into which it will be written. |
| Bits 80-81 | RAAU | RAAU/RE Register Strobe. Selects the data to be strobed into the RAAU and RE registers by controlling several switches and adders in the unit 722. |
| Bits 82-83 | AP(3) (Type A=3) | ZAPA Switch, ZAPB Switch, AP Adder Control. Selects ZAPA and ZAPB switch outputs and the AP adder function applied to them. |
| Bit 84 | ZRSC (Type a=0) | ZRSC Switch Control. Selects the output of ZRSC Switch. |
| Bits 85-86 | N/A | |
| Bit 86 | RLEN (Type A=3) | RLEN Strobe Control. RLEN strobes are also controlled by hardware or by the MISCREG field. |
| Bit 87 | FMT | Format Flag. Indicates the type of format. |
| Bits 88-89 | TYPE | Indicates the type of overlayed fields. 00 = Scratchpad Address 01 = Character Unit Control 10 = Multiply/Divide Control 11 = N/A |
| Bit 90 | RFU | Reserved for Future Use. |
| Bits 90-93 | CHROP | Character Unit Op Code. Selects main operation to be performed by Character Unit and the interpretation to be given to the CHSUBOP field. (0) 0000 No operation (1) 0001 Load Data (2) 0010 MOP Execute (3) 0011 Compare Single (4) 0100 Compare Double (5) 0101 Load Register (6) 0110 Update CN (7) 0111 Undefined (8) 1000 Set RCH Operation A (9) 1001 Set RTF1 (10) 1010 Set RTF2 (11) 1011 Set RTF3 (12) 1100 Set RCN1 (13) 1101 Set RCN2 (14) 1110 Set Edit Flags (15) 1111 CH Unit Clear |
| Bit 90 | ECH | RCH Register Strobe. Strobes the OP1 RCH register. |
| Bit 90 | RFU | Reserved for Future Use. |
| Bits 91-97 | SPA | Scratchpad Address. Contains the address that may be used |

|  |  |  |
|---|---|---|
| Bits 91-93 | N/A | to address the EU scratchpad. |
| Bits 94-97 | CHSUBOP | Character Unit Sub-Op Code. Selects the detailed function of the Character Unit or it may contain a constant. The interpretation of this field is a function of the CHROP control as shown below. |
|  | CHROP = 0000 | No Operation |
|  | $CHSUBOP_{0-3}$ |  |
|  | XXXX | No interpretation |
|  | CHROP = 0001 | Load Data Operation |
|  | $CHSUBOP_{0-1}$ | (suboperation) |
|  | 00 | OP1 Load by CN1 and TF1 |
|  | 01 | OP1 Load in Reverse by CN1 and TF1 |
|  | 10 | OP2 Load by CN2 and TF2 and Test Character |
|  | 11 | Load Sign |
|  | $CHSUBOP_{2-3}$ | (Fill Control) |
|  | 1X | Fill character loaded to ZCU |
|  | X1 | Fill character loaded to ZCV |
|  | CHROP = 0010 | MOP Execute Operation |
|  | $CHSUBOP_{0-1}$ | (Suboperation) |
|  | 00 | MOP set by CN2 |
|  | 01 | MOP Execute |
|  | 10 | Undefined |
|  | 11 | Undefined |
|  | $CHUBOP_{2-3}$ |  |
|  | XX | No interpretation |
|  | CHROP = 0101 | Load Register Operation |
|  | $CHSUBOP_{0-1}$ | (Selects output of RCH) |
|  | $CHSUBOP_{2-3}$ | (Selects output of ZOC switch) |
|  | CHROP = 1011 | Set RTF3 Operation |
|  | $CHSUBOP_{0-1}$ | (Selects data to be inspected for 00, indicating a 9-bit character.) |
|  | $CHSUBOP_{2-3}$ | (Constant Field) |
|  | CHROP = 1110 | Set Edit Flags Operation |
|  | $CHSUBOP_{0-3}$ | (Constant selection flags to be set) |
|  | 1XXX | Set ES (End suppression) |
|  | X1XX | Set SN (sign) |
|  | XX1X | Set Z (zero) |
|  | XXX1 | Set BZ (Blank When Zero). |
| Bits 99-97 | RFU | Reserved for Future Use. |
| Bits 97-97 | N/A |  |
| Bit 98 | TYPG | TYPE G FLAG. Indicates the type of overlayed fields. 0 = BRADRU field 1 = IND6 field |
| Bit 99 | GO | State of Conditional Branch Test. |
| Bits 99-106 | BRADRU | Branch Address Upper. |
| Bits 99-106 | IND6FLD | Indicator Control. Selects an indicator. |
| Bits 99-106 |  | Bit 99 = 0 specifies a change indicators instruction. Bit 99 = 1 specifies a set/reset indicators instruction (set or reset indicated by X bit 0 or 1 respectively). |

| Bits 100-104 | 105=1 | 106=1 |
|---|---|---|
| 0000 |  |  |
| . |  |  |
| . |  |  |
| . |  |  |
| 1100X | Exhaust 1 | Exhaust 2 |
| 1101X | Exhaust 3 | N/A |
| 1110X | Exhaust 1 Eff. | Exhaust 2 Eff. |

|  |  |  |
|---|---|---|
| Bits 107-112 | BRADRL | BRANCH ADDRESS LOWER. Contains lower portion of an ECS address used for branching. |
| Bit 113 | EXIT | Selection of Exit Switch Control. Selection of Exit indicates end of microprogram. |
| Bits 114-116 | ZCSBRA | ZCSBRA Switch Control. Defines the position to be selected in a Control Store Branch Address Switch. |
| Bits 117-118 | N/A |  |
| Bits 119-123 | INDGRP | Conditional Branch Indicator Group Control. The first two bits (119-120) select the "group" of microprogram indicators. The last three bits (121-123) select the "set" of indicators with in each "group". |
| Bit 124 | TYPH | Type H field. Indicates the type H overlayed fields. 0 = INDMSKU 1 = VCTR field |
| Bits 125-128 | INDMSKU | Conditional Branch Indicator Mask Upper. Contains the upper 4 bits of the indicator mask in type H = 0 field. |
| Bits 125-129 | VCTR | Vector Select. Selects the branching vectors to be strobed into the RVB0, RVB1 and RVB2 registers. The most significant bit (125) determines which of two groups 0 or 1, 2 or 3 and 4 or 5 will be strobed into the RVB0, RVB1 and RVB2 registers respectively. The remaining 3 bits select the vector within each group. |
| Bits 129-132 | INDMSKL | Conditional Branch Indicator Mask Lower. Contains the lower 4 bits of the indicator mask. |
| Bits 133-135 | N/A |  |
| Bits 136-139 | CNSTU | Constant Upper. Contains the upper 4 bits of the constant field. |
| Bits 140-143 | CNSTL | Constant Lower. Contains the lower 4 bits of the constand field. |

Control Logic Unit 704-1

This unit includes the sequence decode logic circuits 704-100 as mentioned whose outputs feed a plurality of I cycle control state flip-flops of block 704-102. These flip-flops in response to signals from the circuits 704-100 as well as microinstruction signals from register 701-4 (DMEMRO 38-40 which corresponds to the mem address field MEMADR of FIG. 6b) generate the various required I cycle control states required for the execution of program instructions. It is assumed that block 704-102 also includes gate circuits which generate register hold signals (HOLDE00) which are distributed throughout the processor 700.

As seen from FIG. 3c, the I cycle control state flip-flops receive control input signals via control lines including a line CPSTOP00 from cache unit 750. As explained herein, the state of the CPSTOP00 line determines whether processor operation continues in that when the line is forced to a binary ZERO, the hold or enabling signals for the I cycle control state flip-flops and other storage registers are also forced to ZEROS. The hold signals corresponding to signals [HOLDI00 and [HOLDE00 operate to hold or freeze the state of the processor 700. Since no incrementing of the control store address can take, the ECS control store reads out the same microinstruction word. The signals [HOLDI and [HOLDE are set in accordance with the following Boolean expressions: [HOLDI=CACHE HOLD-+TERMB (DREQ-IF-DIR)+HOLD REL wherein the state of signal CACHE HOLD corresponds to the state of signal CPSTOP, the states of signals TERMB (DREQ-IF-DIR) are binary ONES during control state FPOA when the cache command specifies an I fetch or direct operation and the signal HOLD REL is a binary ONE until switched to a binary ZERO by the generation of a microprogram release signal; and [HOLD E=[HOLD I.

As seen from FIG. 3c, signals corresponding to the I cycle control states are applied as inputs to a plurality of control flip-flops of block 704-104, decoder circuits of block 704-106, a number of control logic circuits of block 704-108 and to a plurality of control flag indicator flip-flops of block 704-110. It is also seen that the various indicator flip-flops of block 704-110 also receive microinstruction input signals via lines MEMD054-57 from execution control unit 701-4.

As seen from FIG. 3c, signals generated by the hardware control logic circuits 704-108 fall into one of three groups as a function of the units whose operations are being controlled. That is, the groups are instruction buffer control, hardware control and hardware memory control.

In each case, each group of signals is ored together with equivalent signals generated by other sources and then decoded. The other sources correspond to fields within the two different formats of the microinstruction word of FIG. 6a which are loaded into RCSR register 704-112 from the ECS output register 701-4.

One field corresponds to bits 32-83 of one format (large CU) and another field (short CU) corresponds to bits 32-41 of another format. These fields are decoded by a decoder 704-114 into the sets of bits indicated and combined within the decoders 704-116, 704-124, 704-126 and 704-128 as shown. Further decoding is done by the circuits of blocks 704-118, 704-135 and 704-120. The results of decoding such fields are either distributed throughout processor 700 or are stored in an RMEM register 704-130, an RSZ flip-flop 704-132, an FREQDIR flip-flop 704-136 and an FREQCAC flip-flop 704-134.

Additional decoding of the large and short CU fields and signals from the I cycle state circuits of block 704-112 is done via decoders 704-106 and 704-107. The decoder 704-106 generates control signals for loading different ones of the registers and for enabling various multiplexer/selector switches within the processor 700. The decoder 704-107 operates to generate signals for setting and resetting a pair (RBASB) of base pointer B flip-flops 704-144. Other combinations of these signals are used to set and reset the descriptor number flip-flops of blocks 704-140 and 704-142.

As seen from FIG. 3c, the decoder 704-116 receives a control signal [EXH00 generated by the decoder circuits of block 704-117. These circuits receive signals from the RDESC register 704-140 and signals from the exhaust flip-flops of block 701-1. In accordance with the states of these signals, the circuits force signal [EXH000 to a binary ZERO to inhibit the generation of a cache memory command upon the occurrence of an exhaust condition. The signal [EXH000 is generated in accordance with the following Boolean expression:

[EXH000=DESCO.FE11+DESC1.FE2+-DESC2.FE3.

The flip-flop FNUM is normally set in response to the CCS-OP field of the microinstruction word. When set to a binary ONE, this indicates that the descriptor being processed is a numeric type.

The different flip-flops of block 704-104 will now be discussed in greater detail. In greater detail, the flip-flop FCHAR provides certain changes in the control of address generation. When the FCHAR flip-flop is set to a binary ONE during the processing of a load type instruction specifying character modification, then the contents of the RDI register are not changed under hardware contro. This allows the RDI register to be loaded with data under microprogram control prior to starting the pipeline. Also, if the FCHAR flip-flop is set to a binary ONE during a store type instruction specifying character modification, then the execution address for this instruction is modified under hardware control to point to a unique address of the microinstruction sequence in the ECS control store that is to process this type of instruction.

The flip-flop FDT-FOUR provides additional control on the readout of the address register ($ZAR_{0-19}$) of block 704-304. Flip-flop FADR-WD provides additional control for the ZDO switch 704-340. When this fli-flop is set to a binary ONE, then the ZAR position of the ZDO switch is forced to select a word address. The flip-flop FADR-B provides additional control for the ZDO multiplexer switch. When set to a ONE, then the ZAR position of the ZDO switch is forced to select a byte address. The flip-flop FNUM is normally set in response to the CCS-OP field of the microinstruction word. When set to a binary ONE, this indicates that the descriptor being processed is a numeric type. The flp-flop FIG-LEN provides additional control over the loading of registers within the unit 722 (length registers) and over memory operations. When set to a binary ONE, the RXP and RLN registers within unit 722 are not loaded from the RSIR register 704-154 during certain processor control states FPOP.

The FINH-ADR flip-flop inhibits the operation of the address preparation unit 704-3. When set to a binary ONE, an address cycle (FPOA/FPOP) consists of adding the contents of a temporary effective address register REA-T+ZERO. The register REA-T will have been loaded with the address prior to doing a FPOA/FPOP cycle. The FABS flip-flop enables the generation of absolute addresses. When set to a binary ONE, a 24-bit absolute address is used. As concerns the flag or indicator flip-flops of block 704-110, flip-flop FID when set to a binary ONE provides an indication that indirect address modification during an instruction is required on the descriptor loaded into the RSIR register.

The FRL flip-flop when set to a binary ONE indicates that the length is specified in a register associated with the instruction loaded into various instruction registers. The three flip-flops FINDA, FINDB and FINDC provide indications used in processing memory type instructions. Flip-flop FINDA is set to a binary ONE when length is specified in a register or when flip-flop FAFI is set to a ONE. Flip-flop FINDB is set to a binary ONE when the descriptor does not include nine bit characters. The flip-flop FINDC is set to a binary ONE when the descriptor does include six bit characters.

The FAFI flip-flop is set to a binary ONE when the processor circuits detect that indicator bit 30 of IR register 701-41 was set to a binary ONE during the execution of an EIS instruction indicative of a mid instruction interrupt (required to adjust pointer and length values because of interrupt). The FTRGP, TTNGO and FTRF-TST flip-flops are set to binary ONES in conjunction with transfer type instructions.

More specifically, the FTRGP flip-flip provides a microprogram indication of being set to a binary ONE when the processor circuits detect the read out of a transfer type of instruction during the execution of an execute double (XED) or repeat (RPTS) instruction. The FTNGO flip-flop provides a microprogram indication of being set to a binary ONE when the condition of transfer signalled by the execution control unit 701 was transfer NO GO (i.e., transfer did not take place). The output of this flip-flop is applied to the NO GO line of interface 604. The FTRF-TST flip-flop of this group indicates when set to a binary ONE that the previous instruction executed by processor 700 was a transfer type instruction and that the curret I cycle is to be executed conditioned upon the presence of a transfer GO (TRGO) signal from control unit 701.

Additionally, the circuits of block 704-110 include a number of flip-flops used in performing indirect addressing operations under hardwired control for other than EIS instructions. These include FIR, FIRT, FIRL and FRI flip-flops which are switched to binary ONES as functions of the different types of indirect address modifications required to be performed. For example, the FRI flip-flop signals a register then indirect address modification and is switched to a binary ONE when a register indirect (RI) indicator is a binary ONE. The FIR flip-flop is switched to a binary ONE when an indirect then register (IR) indicator is a binary ONE. This flip-flop signals the beginning of an indirect then register address modification. The FIRL flip-flop is switched to a binary ONE when an indirect then tally indirect (IT-I) indicator is a binary ONE. This flip-flop signals a last indirect operation. Another flip-flop TSX2 provides an indication used in processing transfer and set index instructions while a STR-CPR flip-flop is used during the processing of store instructions.

As seen from FIG. 3c, the outputs from the control flag flip-flops of block 704-110 are applied as inputs to the branch indicator circuits of block 701-1. Also, output signals from the control flag flip-flops are also applied as inputs to the I cycle flip-flops of block 704-102.

Register Section 704-150

As seen from FIG. 3c, the control logic unit 704-1 further includes a register section 704-150. This section contains the basic instruction register (RBIR) 704-152, the secondary instruction register (RSIR) 704-154, a base pointer A register (RBASA) 704-156 used for selecting one of the address registers RAR0 through RAR7 of block 704-304, a read index register A (RRDXA) 704-158 used for selection of index registers included within section 704-5 (not shown) and for selection of outputs from the ZDO multiplexer switch 704-340, a read index A save (RRDXAS) register 704-159, and a descriptor type register (RTYP) 704-160 indicating the type of data characters being pointed to by the descriptor value (e.g. 9-bit, 6-bit, 4-bit). The section 704-150 further includes a 1-bit instruction/EIS descriptor register designated R29 of block 704-162. The state of this bit in conjunction with the contents of the RBAS-A register 704-158 are used to select the particular address register used for address preparation. When register R29 of block 704-162 is set to a binary ZERO, this indicates that none of the address registers of block 704-304 are used during address preparation. The last registers of section 704-150 include the data in register (RDI) of block 704-164 and a read index register B (RRDXB) pointing to registers used by execution unit 714.

As seen from FIG. 3c, the RBIR register 704-152 is loaded via a two position switch 740-170 connected to receive signals from the sources indicated (i.e., a switch ZIB-B 704-172 and lines ZDI 0-35). The RSIR register 704-154 similarly receives signals from the ZDI lines and switch 704-172. The RBASA register 704-156 receives signals from the ZDI line 0-2 in addition to a further switch ZBASA of block 704-174. The RRDXA register and RTYP register receive signals from the ZDI lines as well as switches 704-176 and 704-178 as shown. Also, the RRDXA register receives signals from the RRDXAS register 704-159.

The switch 704-172 is a two position switch which receives inputs from the switches ZIB and ZRESB from the cache unit 750 and execution unit 714 respectively. The switch 704-174 is a three input switch which receives two inputs from the execution unit 714 and the output of the ZIB switch of cache unit 750.

Switch 704-176 is a four input switch which receives two of its inputs from the execution unit 714 and a single input from cache unit 750. The first position of the ZRDXA switch 704-176 selects the output of a ZRDXM switch 704-185. One position of this switch provides a tag field value from bit positions 5-8, 14-17, and 32-35 of the RBIR register 704-152 and bit positions 32-35 of the RSIR register 704-154 selected from ZIDD switch 704-180 and a two position ZMF switch 740-176.

The second position of switch 704-185 provides a constant value from the output of the ECS output register 704-1 (CCM field 32-34). The signals from the lines ZIDD 27-35 are applied as inputs to control flag flip-flops of block 704-110. The switch 704-178 receives an input from the control store 704-2, an input from cache unit 750 and an input from execution unit 714.

The data input register 704-164 receives a series of input signals from a ZIDD switch 704-180 which connects in series to a ZDIA switch 704-181 whose output provides one input of a further switch 704-182 which directly loads into the RDI register 704-164. The ZDIA switch 704-181 provides a further input to a three input switch 704-183 which receives the other inputs indicated from cache unit 750 and execution unit 714.

The ZIDD switch 704-180 receives an effective address via switch 704-186 from the address preparation unit 704-3 as well as inputs from the RBIR register 704-152, the RSIR register 704-154 and a two position ZMF switch 704-187. The positions 18 through 35 of the REA position of switch 704-180 are derived from the ZDIA switch 704-181 as shown. The ZDIA switch 704-181 receives signals from the ZDI lines 0-35, a constant value generated from the inputs to a first switch position in addition to signals from the outputs of the ZIDD switch 704-80 and the ZRESB switch in execution unit 714. The switch 704-182 receives the output of the ZDIA switch and signals from the ZDI lines 0-35. The RRDXB register 704-189 is loaded by a three position switch 704-188. The switch receives via a first position signals from a RREG register included in the execution unit, a constant value from control store 701-2 via a second position and signals from the ZIDD switch via a third position.

The section 704-150 further includes a two position switch 704-185 and a scratchpad pointer register 704-186 whose output is used by the AACU 722 to form addresses for access to the scratchpad memory of the EU 714. The first switch position provides a constant value and is selected under hardware control (FPOA.R29). The second switch position applies as an output the contents of the RBASA register 704-156. This position is selected under both hardware and microprogram control (i.e., FPOA·R29 or MISCREG field).

It will be appreciated that the required timing signals for operating section 704 as well as other sections of processor 700 and cache unit 750 are provided by centrally located clock circuits. For example, in the preferred embodiment of FIG. 1, the clock circuits are located within the input/output processor system. Such clock circuits can be considered as conventional in design and can comprise a crystal controlled oscillator and counter circuits. The timing or clocking signals from such clock circuits are distributed in a conventional manner to the various portions of the system of FIG. 1 for synchronized operation. From such timing signals, circuits within processor 700 derive additional clocking signals as required. This will be described in greater detail with respect to the cache unit 750 of FIG. 4.

Address Preparation Unit 704-1

The address preparation unit 704-3 includes a number of registers and adders. The registers include a number of base registers (i.e., TBASEO through TBASEB) of block 704-300 used for storing descriptor values of an instruction, a pair of temporary effective address registers (TEA0, TEA1) and a pair of instruction counters (ICBA, ICBB) included within block 704-302 use for addressing the instruction buffer and eight address registers (RAR0 through RAR7) of 704-304 used during address preparation operations. The unit 704-3 also includes an instruction counter 704-310.

The adders include adder 704-312 used to update instruction counter 304-310 via switches 704-311 and 704-314 and a pair of adders 704-320 and 704-322. The adder 704-322 is used to generate an effective address value which is stored in a register 704-342 applied as an input of the control unit 704-1. The effective address is generated from a number of sources which include ZY switch 704-326 whose output is applied via a number of AND gates of block 704-327, selected address registers of block 704-304 or selected temporary address registers TEA0 and TEA1 of block 704-302 applied via another switch 704-328 or the index address signals ZX0-20 from unit 704-5. Additionally, adder 704-322 is used to update the contents of the instruction counter of the cache instruction buffer.

Figure 3D:
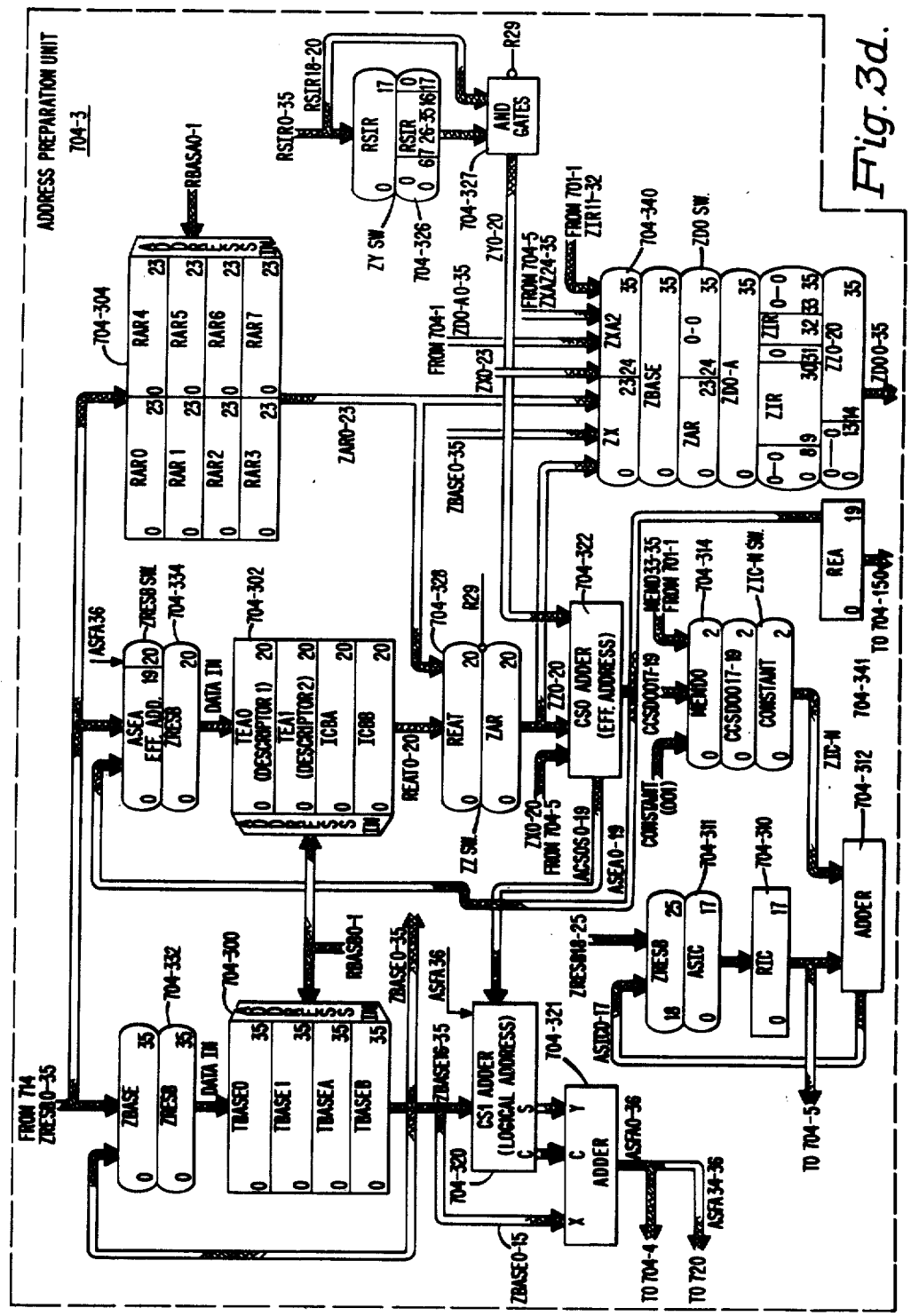

As seen from FIG. 3d, the outputs from adder 704-322 are also applied as an input the adder 704-320. The adder 704-320 is used to combine base value stored in any one of the temporary base registers TBASEO through TBASEB with the address signals ACSOSO-19 from adder 704-322. The resulting bits are applied as an input to a further adder network 704-320 which generates a logical address which is applied to the lines ASFAO-36 via an adder 704-321. This adder sums the operand inputs together with the carry inputs from blocks 704-300 and 704-320. The effective address is used to obtain an absolute address when the system is operated in a paged mode. Since this operation is not pertinent to the present invention, it will not be discussed further herein. For further information regarding such address development, reference may be made to U.S. Pat. No. 3,976,978.

The temporary base registers of block 704-300 are loaded via a switch 704-332. The switch receives an input from the execution unit 714 and the output from block 704-300. The execution unit 714 applies further inputs to the registers of block 704-302 via a switch 704-334 as well as to the address registers of block 704-304. An output multiplexer (ZDO) switch 704-340 enables the selection of the various registers within the address preparation unit 704-3 and unit 704-5 for transfer of their contents to the execution unit 714 via lines ZD0 0-35. Also the ZD0 switch 704-340 enables the contents of various ones of the registers and control flip-flops of unit 704-1 to be read out via a fourth position (ZD0-A). The fifth position enables the states of various indicators within the control store circuits of block 701-1 to be selected for examination.

Data/Address Output Section 704-4 FIG. 3e

The section 704-4 includes the registers and switches used for transferring commands and data to the cache 750. Such transfer operations normally require at least two cycles, one for sending an address and another for sending the data. Bits 5-8 of a command word are derived from the output of a four position switch 704-40. This switch receives a first constant value via a first position, the contents of a RZN register 704-42 via a second position, a second constant value via a third position and a third constant value via a fourth position.

Bits 1-4 of a command are applied by the circuits of block 704-1 to an OR gate circuit 704-44 together with bits 5-8. The OR gate 704-44 also receives via a ZADO switch 704-46 bits 1-8 of an RADO register 704-48. The RADO register 704-48 is an address and data out register which receives a first position of a ZADOB switch 704-48 a logical (virtual) address from address preparation unit 704-3 via the lines ASFAO-35 and data output signals from the EU 714 via lines ZRESBO-35. The positions of the ZADOB switch 704-48 are under the control of the FMTD field for small CU format and the RADO field in the case of large CU format.

As seen from the FIGURE, either the ZZN1-8 bits or the ZADO bits 1-8 are applied as output to the RADOZADO lines as a function of the state of control signal [RADO-ZADO. Bits O and I are always binary ONES while bits 10-35 are furnished by the RADO register 704-46.

For additional information regarding the remaining sections of processor 700 as well as the sections of FIGS. 3a through 3e, reference may be made to the copending applications referenced in the introductory portion of this application.

CACHE UNIT 750-FIG. 4

General Description

The cache unit 750 is divided into five primary sections: a transit buffer and command queue section 750-1, a cache section 750-3, a directory and hit control section 750-5, an instruction buffer section 750-7 and an instruction counter section 750-9.

Transit Buffer and Command Queue Section 750-1

The transit buffer and command queue section 750-1 includes as major elements a four word write command buffer 750-100 and a four word transit block buffer read command buffer 750-102 which are addressed via a pair of counter circuits 750-104 and 750-106 in addition to a command queue 750-107 with associated in and out address pointer and compare circuits of block 750-108 through 750-110. The write buffer 750-100 provides storage for two write single or one write double command while the transit block 750-102 provides storage for up to four read type commands. The transit block buffer 750-102 also stores information associated with such read commands used in controlling the writing of memory data words into assigned areas (i.e., levels) of cache section 750-3. The four registers allow up to four memory reads to be in progress at any given time.

Section 750-1 also includes a control section 750-112. This section includes sets of different control circuits such as the command decoder and control circuits of blocks 750-113 and 750-114, the interface control circuits of blocks 750-115 and 750-116 and hold control circuits of block 750-117. The circuits of blocks 750-113 and 750-114 decode the signals applied to the DMEM lines representative of commands transferred by processor 700 via the RADO/ZADO lines of interface 604 and generate the control signals for making entries in the command queue 750-107, incrementing and setting values into the in pointer and out pointer circuits of blocks 750-108 and 750-109. Also, the circuits generate control signals for storing commands into either write buffer 750-100 or transit block buffer 750-102.

The interface control circuits of blocks 750-115 and 750-116 generate signals for controlling the transfer of data signals received from SIU 100 into section 750-7 and for commands including the transfer of such commands to the SIU respectively. The hold circuits of block 750-117 which receive signals from decoder circuit 750-113 generate control signals for holding the execution of commands in appropriate situations (e.g. directory section busy) and controlling the loading of data into section 750-7.

As seen from FIG. 2, the transfer write command control words proceed from buffer 750-100 via the third position of four position (ZDTS) switch 750-118, a data register 750-119 and the first position of two position switch 750-120. The write data words are transferred from buffer 750-100 to SIU 100 via a write data register 750-121 and the second position of switch 750-120. The RWRT position of switch 750-120 is selected for one (write single command) or two (write duble command) clock intervals following receipt of a signal from SIU 100 via the ARA line made in response to a signal placed on line AOPR by cache 750 for transfer of the write command. Read commands are transferred from the read command portion of transit block buffer 750-102 to SIU 100 via the fourth position (ZTBC) of the ZDTS switch 750-118, register 750-119 and the first position of switch 750-120.

The multiport identifier lines MITS receive zone bit signals via a RMITS register 750-124 and a two position switch 750-125 for the second data word in the case of a write double command. As seen from the FIGURE, this switch receives signals from command queue 750-107 and processor 700. That is, when cache 750 issues a read command, transit block number signals from queue 750-107 are loaded into bit positions 2 and 3 of RMITS register 750-124.

The transit block number signals are returned by SIU 100 on the MIFS lines with the read data word. These signals are loaded into an RMIFS register 750-127 via a multiposition switch 750-126. Thereafter, the contents of bit positions 2 and 3 are applied via the first position of a two position switch 750-128 to a pair of address input terminals of transit block buffer 750-102. A second RMIFSB register 750-129 primarily provides temporary storage of the transit block number signals for multiword transfers (i.e., quad read commands).

The output signals from switch 750-128 are also applied to the control input terminals of a four position ZTBA switch 750-130 for selecting the appropriate address signals to be applied to cache section 750-3 for storage of the data words. The address contents of the transit block buffer 750-102 are also applied to one set of input terminals of a predetermined one of a group of compare circuits 750-132 through 750-135 for comparison with the address portion of a next command applied to a second set of input terminals of the comparator circuits via the RADO/ZADO lines. The result of the comparisons generated by a NAND gate 750-136 is applied to the hold control circuits of block 750-117.

As seen from FIG. 4, the zone bit signals of the ZAC command applied to the ZADOB lines 5-8, in the case of a write single command or for the even word of a write double command, are loaded into a RZONE register 750-140 when the write command is loaded into write command data buffer 750-100. the output of RZONE register 750-140 is applied to the first position of a two position ZONE switch 750-144. The zone bit signals, applied to the lines DZDO-3 by processor 700 for the odd word of a write double command are loaded into a RDZD register 750-142. The output of RDZD register 750-142 is applied to the second position of ZONE switch 750-144. The output signals ZONEO-3 are applied to the circuits of section 750-9 for controlling the writing of processor data into cache 750-300 as explained herein.

Cache Section 750-3

The section 750-3 includes a cache store 750-300 having 8192 (8K) 36-bit word locations organized into 128 sets of eight, eight word blocks. The unit 750-300 is constructed from bipolar random access memory chips, conventional in design.

The cache storage unit 750-300 is addressed by a 10-bit address RADR 24-33 applied via any one of a number of 4×4 crossbar switches (e.g. 750-302a), conventional in design and the address registers associated therewith. As seen from the FIGURE, the crossbar switch receives address signals from several sources which include section 750-5, ZTBA switch 750-130 and section 750-7. The address signals appearing at the output of the crossbar switch are temporarily stored in the associated address register and applied to the address input terminals of cache storage unit 750-300.

During a write cycle of operation, the four sets of write control signals (WRT00100-WRT70100 through WRT03100-73100) generated by section 750-9, are applied to the cache storage unit 750-300 and are ued to apply or gate clocking signals to the write strobe input terminals of the memory chips. This enables from one to four bytes of either a processor 700 data word from the ZADO/RADO lines or a memory data word from section 750-7 to be written into the addressed one of eight levels of cache storage unit 750-300. For processor data, the write signals are generated by decoding signals ZONEO-3 from switch 750-144. For memory data words, all of the zone signals are forced to binary ONES.

The appropriate level is established by the states of signals RTBLEV0100-2100 from transit block buffer 750-102 when writing memory data and by the hit level detected by directory circuits of block 750-512 when writing processor data. These signals are decoded by a decoder circuit 750-303 when enabled by a signal ENB-MEMLEV100 from section 750-9.

During a read cycle of operation, the 36-bit word of each of the eight blocks (levels) is applied as an input to a 1 of 8 ZCD switch 750-306. The selection of the appropriate word is established by the states of a set of hit level signals ZCD010-210 generated by section 750-5. These signals are applied to the control input terminals of ZCD switch 750-306.

As seen from the FIGURE, the selected word is applied to a pair of registers 750-308 and 750-310, a 1 of 8 ZDI switch 750-312 and a 1 of 4 ZIB switch 750-314. The RIRA and RIRB registers 750-308 and 750-310 apply their contents to different positions of the ZIB and ZDI switches 750-312 and 750-314. The ZIB switch 750-314 selects instructions which are applied to the instruction bus (ZIB) of processor 700 while the ZDI switch 750-312 selects data or instructions which are applied to the data in bus (ZDI) of processor 700.

In addition to applying instruction word signals read out from cache 750-300, the ZIB switch 750-314 also applies instruction word signals received from section 750-7 to processor 700. The ZDI switch 750-312 also applies data signals received from the ZCDIN switch 750-304 and section 750-7 to processor 700. The states of the control signals [ZIB010-110 and [ZDI010-210 applied to the control input terminals of switches 750-314 and 750-312 select the sources of instructions and data words to be transferred to processor 700 by such switches. The control signals are generated by the circuits of section 750-9.

In greater detail, the [ZIB010-110 signals are coded to select position #2 of switch 750-314 for a first instruction transfer in response to the detection of a directory hit for an I fetch 1 command or a directory hit for an I fetch 2 command following an I fetch 1 command to the last word in a block. The control signals are coded to select the RIRA position #1 for subsequent instruction transfers following a directory hit generated in response to an I fetch 1 or I fetch 2 command.

Where the I fetch 1 or I fetch 2 command results in a directory miss, the [ZIB010-110 signals are coded to select position #3 of ZIB switch 750-314 for transfer of instruction words received from section 750-7.

As concerns the ZDI switch 750-312, the ZCD position #1 is selected in response to the detection of directory hits and signals applied to the RDIBUF/ZDI line in response to a directory hit generated for a LDQUAD command. Memory data words are transferred to processor 700 via the ZDIN position #3 of the switch 750-312 following a directory miss. Following holding processor 700 for an instruction fetch from main memory, the signals [ZDI010-210 are coded to select the ZDIN position of switch 750-312 for transfer of the first instruction upon its receipt by section 750-7. The remaining instructions are transferred via ZIB switch 750-314.

The ZCDIN position #2 of switch 750-312 is used for diagnostic purposes to transfer signals from the ZADO-B/RADO lines. The remaining positions of ZDI switch 750-312 are used for display purposes (i.e., positions RIRB, ZRIB and RIRA). Also, position RIRB is selected to transfer data words to processor 700 in the case of a LDQUAD command when there is a directory hit.

Directory and Hit Control Section 750-5

This section includes an eight level control directory 750-500 and eight level set associative address directory 750-502. The directory 750-502 contains 128 locations, each location containing a 14-bit associative address for each level. A four position ZDAD switch 750-530 provides the random access memory (RAM) addresses for addressing directories 750-500 and 750-502 in addition to cache storage unit 750-300.

During a directory search cycle of operation, switch 750-530 under the control of signals SELZDADC0100-1100 generated by circuits within a block 750-526 selects RADO position 0. This applies the 14-bit signals of a ZAC command from lines RADO 24-33 from processor 700 to the output terminals of the ZDAD switch 750-530. These signals are applied to the address input terminals of directories 750-500 and 750-502. During the search cycle, the contents of eight block/level addresses are read out and applied as one input of each of a group of eight comparator circuits 750-536 through 750-543. Each comparator circuit compares its block-/level address with bits 10-23 of the ZAC command to determine a hit or miss condition. The results generated by the circuits 750-536 through 750-543 are applied to corresponding inputs of a group of AND gates 750-545 through 750-552. Each comparator circuit is made up of four sections, the results of which are combined in one of the AND gates 750-545 through 750-552. The final result hit signals ZHT0100 through ZHT7100 are applied as inputs to hit/miss network circuits of block 750-512 as explained herein.

The ZAC address signals are also saved in an RDAD register 750-532 when no hold condition is detected (i.e., signal [HOLD-DMEM from 750-112 is a binary ZERO). During the directory assignment cycle following the search cycle which detected a miss condition, signals SELZDADC0100-100 select RDAD position 1 of ZDAD switch 750-530. Also, a RDRIN register 750-534 is loaded with the 14-bit associative address signals from the ZADO-B lines 10–23 when the directory search cycle is completed for writing into the directory 750-502.

The control directory 750-500 also includes 128 locations, each having a predetermined number of bit positions for storing control information. Such information includes the full-empty (F/E) bits for the eight levels and round robin (RR) count bits in addition to parity check bits (not shown).

The full-empty bits indicate whether the particular directory addresses have any significance (i.e., are valid). For a cache hit to occur, the F/E bit must be set to a binary ONE. A binary ZERO indicates the presence of an empty block or portion thereof. The round robin bits provide a count which indicates which block was replaced last. This count when read out via one of the two sets of AND gates of block 750-504 into a register 750-506 is normally incremented by one by an increment adder circuit 750-508. The resulting signals NXTRRO-RR2 are written into directory 750-500 to identify the next block to be replaced.

As seen from the FIGURE, the F/E bit contents of the location are read out via the positions of a two position ZFER selector switch 750-506 and applied as inputs to the directory hit/miss and hit control circuits of block 750-512. The ZFER switch 750-506 selects which half of a group of F/E bits are to be used by the circuits of block 750-512 for a hit/miss indication and which half of the group of F/E bits are to be used by such circuits for an alternate hit determination. An address bit signal ZDAD31 controls the selection of switch positions.

The circuits of block 750-510 include a multisection multiplexer circuits which generates the output signals FEDAT0100 and FEDAT1100 as a function of the hit and miss data pattern. Accordingly, these signals are set in response to the ALTHIT signal from the circuits of block 750-512. A pair of decoder circuits 750-520 and 750-521 operate to decode the level information signals ZLEV0100-2100 for generating appropriate sets of write enable strobe signals R/WFE010-210 and R/WLV010-710 for control directory 750-500 and address directory 750-502. Thus, level (ZLEV) switch 750-522 operates to control the level at which F/E bits are set or reset and the level in the address directory 750-502 at which new addresses are written during a directory assignment cycle of operation.

As seen from the FIGURE, the first position of ZLEV switch 750-522 when selected, applies to its output terminals signals OLDRR010-210 from directory 750-500. The second position of switch 750-522 when selected applies to its output terminals signals RLEVR0-R2 from a level register 750-524. The level register 750-524 is used to save the last set of hit level signals generated by the hit/miss level network circuits of block 750-512. This permits the hit level value of distribute to other sections of cache 750 for subsequent use (i.e. signals RHITLEV0-2).

The third position of switch 750-522 when selected applies to its output terminals, signals LEVR0-R2 generated by the circuits of block 750-512. The switch 750-522 is controlled by signals from control flip-flops included within block 750-526 (i.e., signals FBYPCAC and DIRBUSY). As seen from the Figure, the complements of the level signals stored in register 750-524 corresponding to signals RHITLEV010-210 are applied via a group of AND gates to control circuits within section 750-9.

During the search cycle of operation, the hit/miss level network circuits detect which level, if any, contains an address which matches the ZAC address. In the case of a match, it forces signal RAWHIT100 to a binary ONE and generates therefrom the sets of hit level signals ZCD010-210 and HITLEVC7010-7210 through an encoding circuit. The signals are generated in accordance with the states of the F/E bit signals ZFE010-710. That is, for a cache hit to occur at a given level, the F/E bit must be a binary ONE. As mentioned above, a binary ZERO indicates the presence of an empty block level. Each encoder circuit includes AND/OR gating circuits, conventional in design which generate the level signals in accordance with the Boolean expression $$Li = \sum_{e=0}^{2} \left| \underset{j=0}{E} ZHTj \cdot ZFEj \right.$$

Additionally, the signals ZCD010-210 also may be generated from the level signals ZNICLEV000-2100 provided by section 750-9 during instruction fetches.

The block 750-512 also includes an alternate hit network which can also be used in the assignment of an eight word block by generating an alternate hit signal ALTHIT100 and a set of signals ALTHITLEV0100-2100 for loading into register 750-504 in place of the round robin assignment signals C7RR0100-2100. For the purpose of the present invention, such arrangements can be considered conventional in design. Reference may be made to U.S. Pat. No. 3,820,078 listed in the introductory portion of this application.

As seen from the Figure, the circuits of block 750-512 generate other hit signals HITTOTB100, HITTOC7100 and HITTOIC100. These signals are derived from signal RAWHIT100 in accordance with the following Boolean expressions:

1. HITTOC7100 = RAWHIT100·BYPCAC000.
2. HITTOIC100 = HITTOC7100.
3. HITTOTB100 = RAWHIT100·BYPCAC000 + PRERD100·BYPCAC100.

The circuits of block 750-512 receive the cache bypass signals BYPCAC000 and BYPCAC100 from block 750-526. As mentioned, this block includes a number of control state flip-flops which generate signals for sequencing the section 750-5 through various required operations for the processing of the various types of commands. Additionally, block 750-512 includes logic circuits for generating required control signals during such operations. For the purpose of the present invention, these circuits may be implemented in a conventional manner. Therefore, in order to simplify the description herein, only a brief description and the Boolean expressions will be given for certain control state flip-flops and control logic circuits as required for an understanding of the operation of the present invention.

CONTROL STATE FLIP-FLOPS

The FJAM1 flip-flop is set in response to a hit condition at the end of a directory search cycle for a read double command. The flip-flop holds the lower address bits in register(s) 750-32 enabling the accessing of the second word from cache storage unit 750-300 in the case of a read double command. Also, the flip-flop is set in response to a write single command to cause the selection of the RDAD position of the ZDAD switch 750-530 for providing or causing the same address to be applied to cache storage unit 750-500 for one more clock interval or cycle. In the absence of a hold condition (signal [HOLDDMEM=1]), the FJAM1 flip-flop remains set for one cycle in accordance with the following Boolean expression:

SET = FJAM1 = REQCOMB·RAWHIT·BYP-
CAC·(RDDBL + WRTSNG) + HOLDDMEM·F-
JAM2 + HOLDDMEM·FJAM1.

The FJAM2 flip-flop is set in response to a hit condition at the end of a directory search cycle for a write double command. The setting of the FJAM2 flip-flop causes the setting of the FJAM1 flip-flop at the end of the next clock interval. The control state of the FJAM2 flip-flop together with the FJAM1 flip-flop causes the selection of the RDAD position of ZDAD switch 750-530 for providing the proper address for writing data into cache storage unit 750-300.

The FJAM2 flip-flop also remains set for one cycle in accordance with the following Boolean expression:

SET = FJAM2 = REQCOMBO·RAWHIT·BYP-
CAC·WRTDBL + HOLDDMEM·FJAM2.

A flip-flop NRMPTC1 directly controls the ZDAD switch 750-530 and is set in accordance with the states of signals generated by the other control state flip-flops.

The NRMPTC1 flip-flop normally remains set for one cycle in accordance with the following Boolean expression:

SET = NRMPTC1 = (WRTDBL·REQCOMBO· ·RAWHIT·$\overline{\text{BYPCAC}}$)+FJAM2+SETFJAM1· +REQCOMBO·(RDTYPE·BYPCAC+R· DTYP·RAWHIT)·($\overline{\text{FJAM1·FJAM2+HOLD}}$).

The FDIRASN flip-flop specifies a directory assignment cycle of operation wherein an associative address entry is written into address directory 750-500 in the case of miss conditions or cache bypass operations for read type commands.

The FDIRASN flip-flop is set for one cycle in accordance with the following Boolean expression:

SET = FDIRASN = REQCOMBO·RDTYP·(BYP· CAC+$\overline{\text{RAWHIT}}$).

The FICENAB flip-flop enables the loading of the instruction register and is set for one cycle in response to a ½ T clock pulse in accordance with the following Boolean expression.

SET = $\overline{\text{FHT100}}$.

The FRCIC flip-flop is set for one cycle in response to a ½ T clock pulse in accordance with the following Boolean expression.

SET = FJAMZNICLEV.

CONTROL LOGIC SIGNALS

1. The ALTHIT signal indicates the presence of a pseudo hit condition.

ALTHIT = ALTLEV0+ALTLEV1+ ... ALTLEV7.

2. The signals ALTHITLEV0, ALTHITLEV1 and ALTHITLEV2 provide a three bit code which specifies the level at which a pseudo hit condition occurred. The signals are coded as follows:
    a.   ALTHITLEV0 = ALTLEV4+ALTLEV5· +ALTLEV6+ALTLEV7.
    b.   ALTHITLEV1 = ALTLEV2+ALTLEV3· +ALTLEV6+ALTLEV7.
    c.   ALTHITLEV2 = ALTLEV1+ALTLEV3· +ALTLEV5+ALTLEV7.

3. The signals ALTLEV0 through ALTLEV7 indicate which one of the eight levels, if any, has detected a pseudo hit condition.
    a. ALTLEV0 = ZHT0·$\overline{\text{ZFE0}}$.
    .
    .
    .
    b. ALTLEV7 = ZHT7·$\overline{\text{ZFE7}}$.

4. The DIRADDE signal is an enabling signal for decoder 750-521 which allows the generation of write strobe signals applied to address directory 750-500.

DIRADDE = $\overline{\text{NOGO}}$·FDIRASN.

5. The DIRBUSY signal indicates when the directories 750-500 and 750-502 are busy.

DIRBUSY = FLSH+FJAM2+JFAM1+· FDIRASN.

6. The FEDCODE signal is an enabling signal for decoder 750-520 which allows the generation of write strobe signals applied to control directory 750-500.

FEDCODE = FDIRASN·$\overline{\text{NOGO}}$.

7. The FORCEBYP signal enables a cache bypass operation to take place.

FORCEBYP = FSKIPRR+FBYPCAC.

8. The GSRCH signal indicates when a search cycle of operation is to take place.

GSRCH = $\overline{\text{RDDBLZCDE}}$·FICENAB·FRCIC.

9. The signals HITLEVC70, HITLEVC71 and HITLEVC72 provide a 3-bit code which specifies the level at which a hit condition has occurred.
    a.   HITLEVC70 = HITLEV4+HITLEV5+HIT· LEV6+HITLEV7.
    b.   HITLEVC71 = HITLEV2+HITLEV3+HIT· LEV6+HITLEV7.
    c.   HITLEVC72 = HITLEV1+HITLEV3+HIT· LEV5+HITLEV7.

10. The signals HITLEV0 through HITLEV7 indicate which one of the eight levels, if any, has detected a hit condition.
    a HITLEV0 = ZFE0·ZHT0.
    .
    .
    .
    b. HITLEV7 = ZFE7·ZHT7.

11. The RAWHIT signal indicates the detection of a hit condition.

RAWHIT = HITLEV0+ ... +HITLEV7.

12. The HITTOC7 and HITTOIC signals each indicates the detection of a hit condition to certain circuits within section 750-9.

HITTOC7 = HITTOIC = RAWHIT·$\overline{\text{BYPCAC}}$.

13. The HITTOTB signal indicates the detection of a hit condition or a pre-read command when in the bypass mode to the transit block buffer circuits.

HITTOTB = RAWHIT·$\overline{\text{BYPCAC}}$+PRERD·BYP· CAC.

14. The LDRAD signal enables the loading of the RDAD register 750-532.

LDRDAD = $\overline{\text{HOLDDMEM}}$.

15. The LDRDRIN signal enables the loading of RDRIN register 750-534.

LDRDRIN = $\overline{\text{FDIRASN}}$.

16. The signal RDDBLZCDE is used to enable the ZCD switch 750-306 in the case of a read double command.

RDDBLZCDE = $\overline{\text{FICENAB·(FDIRASN+·FJAM1+FJAM2)}}$.

17. The REQCOMBO signal indicates the presence of a cache request.

REQCOMBO = $\overline{\text{NOGO}}\cdot\text{HOLDDMEM}\cdot\overline{\text{CAN-CELC}}\cdot\text{DREQCAC}$.

18. The ZCD0, ZCD1 and ZCD2 signals are used to control the operation of the ZCD switch 750-306.

a.
  ZCD0 = ZCDL4 + ZCDL5 + ZCDL6 + ZCDL7 + ZNICLEV0·ZCDICENAB + RDDBLL0.

b.
  ZCD1 = ZCDL2 + ZCDL3 + ZCDL6 + ZCDL7 + ZNICLEV1·ZCDICENAB + RDDBLL1.

c.
  ZCD2 = ZCDL1 + ZCDL3 + ZCDL5 + ZCDL7 + ZNICLEV2·ZCDICENAB + RDDBLL2 wherein the term(s) ZCDLi is ZCDLEVi.

19. The ZFEDATWT1 signal is a data write strobe signal used for writing F/E bit signals FEDAT0100 and FEDAT1100 into directory 750-500.

ZFEDATWT1 = FDIRASN·ZDAD31.

20. The FEDAT0100 signal corresponds to the first full/empty bit.

FEDAT0100 = FBYPCAC000 + FALTHIT100.

21. The FEDAT1100 signal corresponds to the second full/empty bit.

FEDAT1100 = FALTHIT100 + FBYPCAC000.

22. The SELZDADC1 signal controls the operation of the ZDAD switch 750-530.

SELZDADC1 = NRMPTC1.

23. The RWRR signal is a round robin write signal used for writing the RR bit signal back into directory 750-500.

RWRR = FDIRASN·$\overline{\text{NOGO}}$·$\overline{\text{SCLOCK}}$.

It will be seen from the Figure that the different decoded command signals are generated by a decoder circuit 750-528 in response to the signals applied to the DMEM lines 0-3 by processor 700. The decoder 750-528 is enabled by a signal from the DREQCAC line. The decoded command signals (e.g. WRTDBL, WRTSNG, PRERD, RDTYPE) together with other control signals such as [HOLDDMEM, FSKIPRR00 and those from the lines [CANCELC and BYPCAC are applied as inputs to the circuits of block 750-526.

Instruction Buffer Section 750-7

This section receives memory data and instructions from the DFS lines which are transferred to processor 700 via the ZDI switch 750-312 and ZIB switch 750-314 respectively. The memory signals are loaded into an RDFS register 750-702 via one position of a two position switch 750-700.

Memory data fetched as a result of a miss condition upon receipt is applied to the ZDI switch 750-312 via the RDFS position #0 of a 1 of 4 position (ZDIN) switch 750-708. In the case of a load quad command, memory data is loaded into the 4 location (LQBUF) buffer 750-706 when the [LQBUF signal is forced to a binary logical ONE. The write/read address signals [WRTBUF010-110/[RDBUF010-110 from section 750-112 control the writing and reading of data into and from the locations of buffer 750-706.

The memory data stored in the LQBUF buffer 750-706 is then transferred to the ZDI via the RLQBUF position #2 of the ZDIN switch 750-708.

In the case of a read double command, the even word of the pair is transferred into a REVN register 750-710. Thereafter, the even word is transferred to the ZDI switch 750-312 via position #1 of ZDIN switch 750-708 for execution of a read double odd command request or upon receipt of a RD-EVEN signal from processor 700.

As seen from the Figure, each memory data word is also loaded into the RDFSB register 750-712 and thereafter written into cache storage unit 750-300 via the ZCDIN switch 750-304 at the level specified by the contents of the RADR register 750-32.

In the case of instruction transfers, each instruction received from memory is loaded into one of the 4 storage locations of a specified one (IBUF1/IBUF2) of a pair of instruction buffers 750-715 and 750-717. The IBUF1 and IBUF2 buffers 750-715 and 750-717 are used to buffer up to two four word blocks that ca be accessed from memory in response to I fetch 1 or I fetch 2 commands for which a miss condition has been detected.

The instructions are written into the location of one of the IBUF1 and IBUF2 buffers 750-715 and 750-717 specified by signals [WRTBUF0100-1100 under the control of write strobe signals [IBUF1/[IBUF2. Read control signals [RDBUF0100-1100 enable the read out of such instructions for transfer to processor 700 whenever the IBUF1 or IBUF2 location specified by the signals [ZEXT0100-1100 contains an instruction. The instruction is transferred to processor 700 via positions 1 or 2 of a two position switch 750-720 and the ZRIB switch position of the ZIB switch 750-314.

The IBUF1 and IBUF2 buffers 750-715 and 750-717 apply output valid signals IBUF1V100 and IBUF2V100 to IBUFREADY circuits of block 750-722. These circuits force IBUFRDY line to a binary ONE indicating that there is at least one instruction in the I buffer being addressed (current instruction block). As seen from the Figure, the IBUFREADY circuits receive input signals (e.g. USETBRDY, IFETCHRDY) from control circuits within section 750-9.

Instruction Counter Section 750-9

This section stores cache address signals (24–33) for indicating the next instruction to be accessed, in one of two instruction address registers (RICA/RICB) 750-900 and 750-902. The cache address signals 24–33 are loaded into the instruction register RICA/RICB not being used when an IFETCH1 command is received from processor 700. The cache address is transferred via the RADO position of ZDAD switch 750-530 and a ZDAD position #0 of a 4 position ZICIN switch 750-904.

Each time processor 700 accesses an instruction, the contents of the instruction register RICA/RICB read out via one position of a two position ZIC switch 750-906 are incremented by one via an increment circuit 750-908. The incremented contents are returned to the instruction register RICA/RICB via the RNIC position #1 of ZICIN switch 750-904.

As seen from the Figure, each instruction register stores two level fields for fetching first and second blocks of instructions in reponse to IFETCH1 and IFETCH2 commands. The two pairs of level field signals are applied to the different switch positions of a 4 position crossbar switch 750-910. The selected level signals ZNICLEV0100-2100 applied as inputs to block 750-512 are used to control the operation of ZCD switch 750-306 for accessing the instructions specified by the instruction register RICA/RICB. The level field signals correspond to signals HITLEVC70100-2100 which are generated by the circuit of block 750-512. These signals are loaded into one of the instruction registers following a directory assignment cycle of operation.

In addition to the level field signals, the RICA and RICB instruction address registers store other signals used for various control purposes which will be discussed herein to the extent necessary.

The incoming cache address signals from the ZDAD switch 750-530 are incremented by one via another increment circuit 750-913. The incremented address signals are loaded into the RICA/RICB instruction register via the INC position #3 of ZICIN switch 750-904. The least significant two bits 32-33 of the cache address provide the IBUF1 or IBUF2 address (i.e., signals ZEXT0100-1100) to read out instruction blocks accessed from memory.

It will be noted that the pair of level field signals LEV1 and LEV2 from other outputs of switch 750-910 are applied as inputs to a pair of comparator circuits 750-912 and 750-914. The circuits 750-912 and 750-914 compare the level signals LEV1 and LEV2 of the current instruction block from switch 750-910 with the input level signals C7RR0100-2100 corresponding to the round robin count for the next available block. Also, the comparator circuit 750-912 receives as inputs memory level signals RTBLEV0100-2100 and instruction level signals ZNICLEV0100-2100 from switch 750-910 for comparison in addition to level signals ZIC0100-2100 for comparison with signals C7RR0100-2100. The cache address signals are incremented by 4 by an increment circuit 750-918 and applied as an input to the round robin skip control circuits of block 750-916. These circuits receive as another pair of inputs the input cache address signals 24-30 from ZDAD switch 750-530 and the cache address signals of the current instruction block from ZIC switch 750-906 for comparison by circuits included therein.

The results of the pairs of cache address signals and level signal comparison are combined within other circuits within the round robin skip control circuits of block 750-916. The circuits of block 750-916, in response to decoded signals from a decoder circuit 750-922, generate output control signals which avoid addressing conflicts. For a further discussion of the operation of such circuits, reference may be made to the copending application of Marion G. Porter, et al titled "Cache Unit Information Replacement Apparatus" referenced in the introduction of this application.

The output control signals from block 750-916 are applied as inputs to the circuits IC control block 750-920. Additionally, the control circuits of block 750-920 receive the results of the decoding of command signals applied to the DMEM lines by the decoder circuit 750-922 when it is enabled by a signal from the DREQCAC line. These decoded signals together with the other signals from sections 750-1 and 750-5 are applied to block 750-920. The control circuits of block 750-920 generate address and control signals for sequencing section 750-9 through the required cycles of operation for processing certain types of commands (e.g. IFETCH1, IFETCH2 and LDQUAD commands).

The block 750-920 includes a number of control state flip-flops and logic circuits for generating the required control signals. For the same reasons mentioned in connection with section 750-5, only a brief description and the Boolean expressions will be given for certain state flip-flops and control circuits.

CONTROL STATE FLIP-FLOPS

FABCURLEV1 flip-flop defines the current level for the RICA/RICB instruction register. This flip-flop is set and reset in response to a T clock timing signal in accordance with the following Boolean expressions. The set condition overrides the reset condition. When FA/FBCURLEV is a binary ZERO, it selects level 1 and when a binary ONE, it selects level 2.

SET = DECODEIF1·F-$\overline{\text{PPIMEIS}}$·[HOLD-DMEM·[CANCELC·ZDADO8·Z-DADO9·HIT·FACTVRIC100/000+ZEXTO-·ZEXT1·RDIBUF·HOLDEXECR-DIBUF·FA/FBCURLEV000·$\overline{\text{DECODELD-QUAD}}$·$\overline{\text{FLDQUAD}}$·$\overline{\text{DECODEEIS}}$·FACT-VRIC100/000·$\overline{\text{NOGO}}$+ZEXTO·ZEXT1·FL-DQUAD·RDIBUF·HOLDEXECRDIBUF·FACTVRIC100/000·$\overline{\text{NOGO}}$.

RESET = DECODEIF1·$\overline{\text{FFPIMEIS}}$·[$\overline{\text{HOLDD-MEM}}$·[CANCELC·FACT-VRIC100/000+DECODELDQUAD [HOLDDMEN·[CANCELC·FACTORIC 100/000+ZEXTO·ZEX DECODELDQUAD·FLDQUAD·DECODEIF-$\overline{1}$·FA/PBCMPLEV100·FACTVRIC000/100·R-DIBUF·$\overline{\text{HOLDEXECRDIBUF}}$·$\overline{\text{NOGO}}$.

The FACTVRIC flip-flop specifies the currently active instruction register RICA/RICB. When the flip-flop is set to a binary ONE, it specifies the RICA register and when a binary ZERO, it specifies the RICB register. It is set and reset in response to a T clock timing pulse signal in accordance with the following Boolean expressions.

$\overline{\text{FACTVRIC}}$ = FACTVRIC·TGLACTVRIC wherein

TGLACTVRIC = DECODEIF1·[$\overline{\text{HOLDDMEM}}$·[-$\overline{\text{CANCELC}}$·FFPIMEIS + FNEWIF1·NOGO.

FACTVRIC = $\overline{\text{FACTVRIC·TGLACTVRIC}}$
wherein

TGLACTVRIC = ($\overline{\text{DECODEIF1}}$+[HOLDD-MEM+[CANCELC+FFPIMEIS)·($\overline{\text{FNEWIF1}}$+$\overline{\text{NOGO}}$).

The FCPUWRTREQ flip-flop defines the time during which processor data is to be written into cache. It is set and reset in response to a T clock timing pulse in accordance with the following Boolean expressions.

SET = (DECODEWRTSNGL-+DECODEWRTDBL)·HIT·[$\overline{\text{HOLDDMEM}}$·[CANCELC.

RESET = FWRTDBL·$\overline{\text{HOLDCACHECPUWRT-SEQ}}$.

The FDBLMISS flip-flop defines a read double type miss condition and is used to select the ZDIN position of ZDI switch 750-312 during the cycle following data recovery. It is set and reset in response to a T clock timing pulse in accordance with the following Boolean expressions.

SET = (DECODERDDBL + DECODERDRM-T)·[HOLDDMEM·[CANCELC·MISS.

RESET = FRDMISS.

The FEVENODD flip-flop specifies which word of the two word pairs processor 700 is waiting for when a read single type miss condition occurs. The flip-flop also defines the order that the data words are to be returned to processor 700 in the case of a read double type miss condition.

Further, the flip-flop is used during a read double hit condition to access the second data word. It is set and reset in response to a T clock timing pulse in accordance with the following Boolean expressions.

SET = (DECODERDSNGL + DECODEIF1·FFPIMEIS)·[HOLDDMEM·[CANCELC·Z-DAD09 + DECODERDDBL·[HOLDDMEM·[-CANCELC·DSZ1.

RESET = (DECODERDSNGL + DECODEIF1)·[-HOLDDMEM·[CANCELC·ZDAD09-+ DECODERDDBL·[HOLDDMEM·[CAN-CELC·DSZ1 + DECODERDRMT·[HOLDD-MEM·[CANCELC.

The FFPIMEIS flip-flop specifies that the last processor state was an FPIMEIS state which means that the IF1 command on the DMEM lines is a request for additional EIS descriptors. This flip-flop is set and reset in response to a T clock pulse in accordance with the following Boolean expressions.

SET = FPIMEIS.

RESET = DECODEIF1·[CANCELC·[HOLDD-MEM.

The FHOLDFIF1 flip-flop defines when processor 700 is being held because of a IF1 miss condition so that when the instruction is received from memory, the current instruction register RICA/RICB can be updated by the FDATARECOV flip-flop. The flip-flop is set and reset in response to a T clock pulse in accordance with the following Boolean expressions.
SET = DECODEIF1·IFPIMEIS·[HOLDDMEM·[-CANCELC·MISS.

RESET = FNEWIF1·NOGO + FDATARECOV.

The FINHRDY flip-flop is used to inhibit the signaling of an IBUFRDY condition to processor 700 when a conflict occurs between the instruction (IC) level and memory data level at the time processor 700 took the instruction loaded into the instruction register RIRA/-RIRB from cache. It is set in response to a T clock pulse and is reset unconditionally on the next T clock pulse when no set condition is present. It is set in accordance with the following Boolean expression.

SET = SETIRTERM·READIBUF·[HOLDD-MEM·NOGO.

wherein

SETIRTERM = CMPDATA1CLEV + MEMWR-TREQ·(ZEXT0·ZEXT1·IF2·[CANCELCMD-+ DECODEIF1·FFPIMEIS + FINHRDY).

RESET = SET.

The FJAMZNICLEV flip-flop is used to force the level signals ZNICLEV000-2100 of the next instruction to be applied to the control input terminals of ZCD switch 750-306 (i.e., signals ZCD010-210) following an IF1 command which did not specify the last word in the block. The flip-flop is set in response to a T clock pulse in accordance with the following Boolean expression. It is reset on the occurrence of the next T clock pulse.

SET = DECODEIF1·FFPIMEIS·HIT·[HOLDD-MEM·[CANCELC·[CANCELC·(ZDAD08·Z-DAD09).

The FNEWIF1 flip-flop defines the cycle after an IF1 command is received from processor 700. It is set for one cycle in response to a T clock pulse in accordance with the following Boolean expression.

SET = DECODEIF1·FFPIMEIS·[HOLDDMEM·[-CANCELC.

The FRDIBUF flip-flop is used to specify that a signal on the RDIBUF line was received from processor 700 during the last cycle of operation. It is set in accordance with the following Boolean expression. It is reset during the next cycle in the absence of a set condition.

SET = RDIBUF·HOLDEXECRDIBUF·NOGO.

The FRDMISS flip-flop is used to cause the holding of processor 700 upon detecting a miss condition for any read type command. It is set and reset in response to a T clock pulse in accordance with the following Boolean expressions.

SET = (DECODERDSNGL + (DECODEIF1·FF-PIMEIS) + DECODERDRMT + DECODERDCLR + DECODERDDBL)·[-HOLDDMEM·[CANCELC·MISS.

RESET = FDATARECOV + FNEWIF1·NOGO.

The FRDERQ flip-flop defines when the second word fetched in response to a RDDBL command for a hit condition is to be read out from cache. It is set and reset in response to a T clock pulse in accordance with the following Boolean expressions.

SET = DECODERDDBL·HIT·[HOLDDMEM·[-CANCELC.

RESET = [HOLDDMEM.

The FDATARECOV flip-flop inhibits the incrementing of the instruction register RICA/RICB when the IF1 command is to the last word in the block and the IF2 command is cancelled. It is set and reset in response to a T clock pulse in accordance with the following Boolean expressions:

SET = DATARECOV·FLASTINST·[HOLDD-MEM·[CANCELC + DATARECOV·FLASTINST·[CANCELC·[HOLDDMEM + -DATARECOV·FLASTINST.

RESET = [HOLDDMEM·FDATARECOV.

CONTROL LOGIC SIGNALS

1. The FA/FBLEV1VAL signal is used to define the state of a first valid bit position of the RICA/RICB instruction register. It is set and reset on a T clock pulse in accordance with the following Boolean expressions. The reset condition overrides the set condition.
   a. FA/FBLEV1VALSET = DECODEIF1·$\overline{FF}$·PIMEIS·[HOLDDMEM·[CANCELC·FACTVRIC100/000 + DECODEIF1 ·FFPIMEIS·[$\overline{HOLDDMEM}$·[CANCELC·EISIF2·FACTVRIC000/100 + DECODELDQUAD ·[$\overline{HOLDDMEM}$ [CANCELC FACTVRIC100/000.

b. FA/FBLEV1VAIRESET = DECODEIF1·$\overline{FF}$·PIMEIS·[HOLDDMEM·[CANCELC·HIT·-ZDAD08·ZDAD09·FACTVRIC100/000 + ZEXTO·ZEXT1·$\overline{DECODEIF1}$·$\overline{DECODELDQUAD}$·$\overline{FLDQUAD}$·RDIBUF·$\overline{HOLDEXECRDIBUF}$·FACTVRIC000/100·FA/FBCMPLEV0-00·$\overline{NOGO}$ + ZEXTO·ZEXT1·FLDQUAD·RDINBUF·$\overline{HOLDEXECRDIBUF}$ ·FACTVRIC100/000 $\overline{NOGO}$.

wherein
RICA = $\overline{FACTVRIC}$ = 1 and RICB = FACTVRIC = 1.

2. The FA/FBLEV2VAL signal is used to define the state of a second valid bit position of the RICA/RICB instruction register. It is set and reset on a T clock pulse in accordance with the following Boolean expressions.
   a. FA/FBLEV2VALSET = DECODEIF2·[-HOLDDMEM·[CANCELC·FACTVRIC000/1-00·$\overline{NOGO}$ + DECODEIF1·FFPIMEIS·[-HOLDDMEM·[CANCELC·FACTVRIC000/1-00·EISIF2.

b. FA/FBLEV2VALRESET = DECODEIFI·$\overline{FF}$·PIMEIS·[HOLDDMEM·[CANCELC·FACTVRIC100/000 + DECODELDQUAD·[$\overline{HOLDDMEM}$·[CANCELC·FACTVRIC100/000-+ ZEXT0·ZEXT1·$\overline{DECODEIFI}$·$\overline{DECODELDQUAD}$·$\overline{FLDQUAD}$·FA/FBCURLEV·FACTVRIC000/100·RDIBUF·$\overline{HOLDEXECRDIBUF}$·$\overline{NOGO}$.

wherein RICA = $\overline{FACTVRIC}$ = 1 and RICB = FACTVRIC = 1.

3. The [ZIB0 and [ZIB1 signals control the ZIB switch for transfers of instructions from cache 750 to processor 700 via the ZIB lines.
   a. [ZIB0 = IFETCHRDY·FNEWIF1.
   b. [ZIB1 = $\overline{IFETCHRDY}$.

4. The [ZDI0, [ZDI1 and [ZDI2 signals control the ZDI switch for transfers of instructions and data from cache 750 to processor 700 via the ZDI lines. Control signal [ZDI0, which corresponds to the most significant bit of the three bit code, can be assigned to be a binary ZERO unless positions 4 through 7 are being used for display purposes.
   a. [ZDI1 = DATARECOV + FDBLMISS + RDEVEN.
   b. [ZDI2 = RDIBUF/ZDI·(HITTOIC + FRDREQ).

5. The [ZICIN0 and [ZICIN1 signals control the ZICIN switch for loading address signals into the RICA and RICB instruction address registers 750-900 and 750-902.
   a. [ZICIN0 = ALTCMD100·FDFN2HT·[$\overline{HOLDDMEM}$.
   b. [ZICIN1 = FDFN1HT·FNEWIF1 + FDFN2HT.

6. The signals ENABRIC1 and ENABRIC2 are used to enable the loading RICA and RICB registers.
   a. ENABRIC1 = $\overline{FHOLDIF1}$·FNEWIF1·FJAMZ-NICLEV·[HOLDDMEM·FDATARECOV + $\overline{FHOLDIF1}$·DATARECOV.
   b. ENABRIC2 = FINHRDY·$\overline{SETINHRDY}$·DFN2HT wherein $\overline{SETINHRDY}$ = DFN-2T·[MEMWRTREQ (ZEXT0·ZEXT1·EXECIF-2·[$\overline{CANCLCMD}$ + $\overline{FINHRDY}$ + $\overline{PSUEDOIF1}$ + $\overline{PSUEDOIF2}$) + $\overline{CMPDATA/ICLEV}$].

7. The signal DATARECOV defines the time that new data has been loaded into the processor's registers (e.g. RDI or RBIR) and when the processor is released. This signal is generated by a flip-flop of section 750-1 which is set to a binary ONE in response to a T clock pulse upon detecting an identical comparison between the address signals specifying the word requested to be accessed by processor 700 and signals indicating the word being transferred to cache unit 750. The comparison indicates that signals DATA, MIFS2, MIFS3, MIFS1 and DATAODD are identical to signals FHT, FHOLDTB0, FHOLDTB1, RADR32 and DOUBLEODD respectively wherein signal FHOLDTB0 = FRDMISS·LDTBVALID·$\overline{FIF2ASSIGN}$·FTBPTR0; signal FHOLDTB1 = FRDMISS·LDTBVALID·$\overline{FIF2ASSIGN}$·FTBPTR1; signal DOUBLEODD = FEVENODD·FDPFS; and signal DATA = FARDA + FDPFS.

DETAILED DESCRIPTION OF SECTION 750-1

FIG. 7a shows in greater detail different ones of the blocks of section 750-1. It will be noted that for the purpose of facilitating understanding of the present invention, the same reference numbers have been used to the extent possible for corresponding elements in FIG. 4. In many cases, a single block depicted in FIG. 4 includes several groupings of circuits for controlling the operation thereof and/or for generating associated control signals. Therefore, some blocks with appropriate reference numbers are included as part of the different blocks of section 750-1.

Referring to the Figure, it is seen that certain portions of block 750-102 are shown in greater detail. The transit block buffer 750-102 is shown as including a first group of circuits for keeping track of data words received from memory in response to a read quad type command. These circuits include a plurality of clocked pair count flip-flops which comprise a four-bit position register 750-10200, a multiplexer circuit 750-10202, a plurality of NAND gates 750-10204 through 750-10210 and a decoder circuit 750-10212. It will be noted that there is a pair count flip-flop for each transit buffer location.

Additionally, the first group of circuits includes a plurality of clocked transit block valid flip-flops which comprise a four-bit position register 750-10214. The binary ONE outputs of each of the flip-flops are connected to a corresponding one of the four pair count flip-flops as shown.

In response to a read quad command, a first pair of words is sent to cache 750. This is followed by a gap and then the second pair is sent to cache 750. The pair count flip-flop associated with the transit block buffer location being referenced as specified by the states of signals MIFS2110 and MIFS3110 is switched to a binary ONE via a first AND gate in response to T clock signal [CLKT022 when signal DATAODD100 is forced to a binary ONE by the circuits of block 750-114. Signal RESETTBV100 is initially a binary ZERO and decoder circuit 750-10212 operates to force one of the first four output signals SETPC0100 through SETPC3100 in accordance with the states of the MIFS2110 and MIFS3110 from switch 750-128.

The pair count flip-flop is held in a binary ONE state via the other input AND gate by a transit block valid signal associated therewith being forced to a binary ONE. The appropriate one of the transit block valid bit flip-flops designated by decoder circuit 750-10601 (i.e., signals IN0100 through IN3100) is set to a binary ONE via a first AND gate. When switching takes place, increment signal INCTBIN100 is forced to a binary ONE state in response to T clock signal [CLKT022.

The multiplexer circuit 750-10202 in accordance with the states of the signals DMIFS2100 and DMIFS3100 from switch 750-128 selects the appropriate binary ONE out of the four pair count flip-flops to be applied to NAND gate 750-10204. This causes NAND gate 750-10204 to force signal LASTODD100 to a binary ZERO. This results in NAND gate 750-10206 forcing signal LASTDTAODD000 to a binary ONE.

When the next pair of data words are received, this causes NAND gate 750-10206 to force signal LAST-DTAODD000 to a binary ZERO. This, in turn, causes NAND gate 750-10210 to force reset signal RESETTBV1100 to a binary ONE. The decoder circuit 750-10212 is conditioned by signal RESETTBV1100 to force one of the four output terminals 4 through 7 to a binary ONE. This, in turn, resets the appropriate one of the transit block valid bit flip-flops via the other AND gate. As soon as the TB valid flip-flop resets, it resets the pair count flip-flop associated therewith via its other AND gate. It will be appreciated that such switching occurs in response to T clock signal [CLKT022.

As seen from FIG. 7a, the first group of circuits of block 750-102 further includes a plurality of NAND gates 750-10216 through 750-10222, each of which is connected to receive a different one of the binary ONE outputs from register 750-10214. The binary ONE outputs FTBV0100 through FTBV3100 are also connected to the control input terminals of the transit block address comparator circuits 750-132 through 750-136.

Each of the NAND gates 750-10216 through 750-10222 also is connected to receive a different one of the signals IN0100 through IN3100 from decoder circuit 750-10601. The outputs from these gates are applied to an AND gate 750-10224. The signals VALID000 through VALID3000 are used to indicate when a transit block register location is available for writing. That is, when a selected transit block valid bit flip-flop is in a reset state, AND gate 750-10224 maintains signal VALIDIN000 in a binary ONE state.

The VALIDIN000 signal conditions a further AND/NAND gate 750-10226 to force a control signal [RTB100 to a binary ONE during the second half of a cycle of operation (i.e., signal FHT020 is a binary ONE) in the case of a read command (i.e., signal DREQ-READ100 is a binary ONE) at the time a directory assignment is not being made (i.e., signal FLDTBVALID000 is a binary ONE).

As seen from FIG. 7a, control signal [RTB100 is applied via a driver circuit 750-10228 to a decoder circuit 750-10230. The control signal [RTB110 causes the decoder circuit 750-10230 to force an appropriate one of the output signals [RTB0100 through [RTB3100 designated by the states of signals FTBPTR0100 and FTBPTR1100 applied via a pair of driver circuits 750-10232 and 750-10234 to a binary ONE state. This in turn causes bit positions 24–31 of one of the transit block register locations to be loaded with address signals applied via the RADO lines 24–31. The complement signal [RTB000 is applied as an input to block 750-107 for controlling the loading of command queue 750-107.

A second group of circuits of block 750-102 shown in greater detail includes the transit block buffer flag storage section 750-10238 of buffer 750-102. This section as well as the section of buffer 750-102, not shown, is constructed from a 4×4 simultaneous dual read/write memory. The memory is a 16-bit memory organized as 4 words of 4 bits each, only three bits of which are shown. Words may be independently read from any two locations at the same time as information is being written into any location. The signals FTBPTR0100 and FTBPTR1100 are applied to the write address terminals while the read addresses are enabled by the VCC signal applied to the G1 and G2 teminals. The Y bit locations are selected in accordance with the states of read address signals MIFS3100 and MIFS2100 from switch 750-128. The Z bit locations are selected in accordance with the states of signals DMIF3100 and DMIF2100 from switch 750-128. Since these locations are not pertinent they will not be discussed further herein.

The memory may be considered conventional in design, for example, it may take the form of the circuits disclosed in U.S. Pat. No. 4,070,657 which is assigned to the same assignee as named herein. Upon the receipt of memory data, the flag bit contents of the transit block location specified by signals MIFS2100 and MIFS3100 are applied to the Y output terminals. These signals are in turn applied to blocks 750-102, 750-115 and 750-117, as shown. During the directory assignment cycle for a cache read miss, the flag bit positions of the transit block location specified by signals FTBPTR0100 and FTBPTR1100 are loaded with the signals FORCEBYP000, FRDQUAD100 and FLDQUAD100 generated by the circuits of blocks 750-5 and 750-114.

It is also seen from FIG. 7a that block 750-102 further includes a group of instruction fetch flag circuits which are associated with the operation of transit block buffer 750-102. These circuits include two sets of input AND gates 750-10240 through 750-10243 and 750-10250 through 750-10253, a pair of multiplexer selector circuits 750-10255 and 750-10256, an IF1 and IF2 flag storage register 750-10258 and an output multiplexer circuit 750-10260 arranged as shown.

The binary ONE outputs of the individual IF1 and IF2 flip-flops are connected to corresponding ones of the sets of AND gates 750-10240 through 750-10243 and 750-10250 through 750-10253. These AND gates also receive input signals from the circuits of block 750-106 generated in response to the in pointer signals FTBPTR0000 and FTBPTR1000 used for addressing the different register locations within the buffer 750-102 as mentioned previously.

The multiplexer circuit 750-10255 is connected to receive as a control input, signal FIFIASSIGN100 from FIFIASSIGN flip-flop 750-11418. The multiplexer circuit 750-10256 is connected to receive as a control input signal FIF2ASSIGN100 from FIF2ASSIGN flip-flop 750-1410. This enables the setting and/or resetting of the IF1 and IF2 flip-flops of register 750-10258 in response to the signals FIF1ASSIGN100 and FIF2ASSIGN100. The switching occurs in response to T clock signal [CLKT022 during the loading of a transit block register location when a control signal LDTBVALID100 is switched to a binary ONE via an AND gate 750-11428.

It will be noted that register 750-10258 contains an IF1 and IF2 flag bit position for each transit block register location. That is, the register includes flip-flops FIF10, FIF20 through FIF13, FIF23 for transit block register locations 0 through 3 respectively. Each of the binary ONE outputs from the IF1 and IF2 flag flip-flops are also applied to the different input terminals of the output multiplexer circuit 750-10260. The circuit 750-11450 contains two sections. This permits DMIFS2100 and DMIFS3100 signals applied to the control terminals of the multiplexer circuit 750-10260 from block 750-128 to select as outputs, input signals from both an IF1 and If2 flag flip-flop. The selected pair of signals, in turn, provide flag signals ZIF1FLG100 and ZIF2FLG100 which are applied to block 750-115. These signals are used to lcontrol the writing of memory information into the IBUF1 and IBUF2 buffers 750-715 and 750-717. Additionally, the complements of the outputs from multiplexer circuit 750-10260 which correspond to signals ZIF1FLG000 and ZIF2FLG000 are applied to a pair of input terminals of a multisection comparator circuit 750-110/750-11435.

it will be noted that the last section of each of multiplexer circuits 750-10255 and 750-10256 are connected in series for generating the enable transit block buffer ready signal ENABTBRDY100 applied to block 750-114. As shown, the "0" input terminal of the last section of multiplexer circuit 750-10255 connects to a voltage VCC (representative of a binary ONE) while the "1" input terminal connects to ground (representative of a binary ZERO). The output terminal of the last section of multiplexer circuit 750-10255 connects to the "0" input terminal of the last section of multiplexer circuit 750-10256 while the "1" input terminal connects to ground. The multiplexer circuits 750-10255 and 750-10256 operate to force signal ENABTBRDY100 to a binary ONE only after the completion of an instruction fetch assignment cycle when both signals FIF1ASSIGN100 and FIF2ASSIGN100 are binary ZEROS. Therefore, the "0" input terminals are selected as outputs by the multiplexer circuits 750-10255 and 750-10256 which results in signal ENABTBRDY100 being forced to a binary ONE. This presents the inadvertent generation of the IBUFRDY100 signal as explained herein.

As seen from FIG. 7a, the circuits of the transit buffer in pointer block 750-106 inludes a clocked two-bit position register 750-10600 and a decoder circuit 750-10601. The register 750-10600 has associated therewith a NAND/AND gate 750-10602 and a two input AND/OR ate 750-10604 connected in a counter arrangement. That is, the NAND gate 750-10602 in response to load signal FLDTBVALID111 from block 750-114 and signal NOGO020 forces an increment signal INCTBIN100 to a binary ONE. This causes the address value stored in register 750-10600 to be incremented by one. The increment signal INCTBIN100 is applied to the circuits of block 750-102.

The most significant high order bit position of register 750-10600 is set to a binary ONE via the gate 750-10604 in response to either signals FTBPTR0100 and FTBPTR1000 or signals FTBPTR1100 and FTBPTR000 being forced to binary ONES. The complemented binary ONE output signals of the register bit positions corresponding to signals FTBPTR0000 and FTBPTR1000 are decoded by decoder circuit 750-10601. The circuit 750-10601 in response to the FTBPTR0000 and FTBPTR1000 signals forces one of the four pairs of output terminals to a binary ONE.

The command control circuit block 750-114 includes an instruction fetch 2 search (FIF2SEARCH) synchronous D type flip-flop 750-11400. The flip-flop 750-11400 is set to a binary ONE state in response to T clock signal [CLKT020 when a two input AND/OR gate 750-11402 and an AND gate 750-11404 force a set signal SETIF2SEARCH-100 to a binary ONE. This occurs when either an IF1 command which is a hit or an IF2 command is received from processor 700 during an IF1 assignment cycle.

In the case of an IF1 command, this presumes that there is no hold condition (i.e., signal [HOLDDMEM000 from block 750-117 is a binary ONE) and that a directory search generated a hit (i.e., signal HITTOTB100 is a binary ONE) indicating that the requested instruction block resides in cache store 750-300. For an IF2 command, it is assumed that there has been a directory assignment cycle following a directory search in which there was a miss made in response to the IF1 command (i.e., signal FIF1ASSIGN100 is a binary ONE).

In either of the situations mentioned, the gate 750-11402 forces the signal SETIF2TIME100 to a binary ONE. When the instruction fetch command was caused by a transfer or branch instruction, which is not a NOGO (i.e., signal NOGO030 is a binary ONE) indicating that it should process the IF2 command currently being applied to the command lines (i.e., indicated by signal DREQCAC112 being forced to a binary ONE), AND gate 750-11404 forces signal SETIF2SEARCH100 to a binary ONE. This switches flip-flop 750-11400 to a binary ONE when signal [CANCEL012 is a binary ONE.

As seen from FIG. 7a, the binary ZERO output from flip-flop 750-11400 is applied as an input to the hold circuits of block 750-117. The signal FIF2SEARCH000 is delayed by a buffer circuit 750-11406 and applied to one input of an input NAND gate 750-11408 of an instruction fetch 2 assignment (IFIF2ASSIGN) flip-flop 750-11410.

the signal FIF2SEARCH010 together with the signal EISIF2000 (indicates a non-EIS type instruction) causes the NAND gate 750-11408 to switch FIF2ASSIGN flip-flop 750-11410 to a binary ONE in response to a gating signal SETBVALID100 and T clock signal [CLKT020. The state of this flop-flop as the others is gated as an output when signal FLDTBVALID111 is a binary ONE.

It will be noted that signal FLTBVALID111 is switched to a binary ONE via an AND gate 750-11412, a clocked flip-flop 750-11414 and a delay buffer circuit 750-11416 in the case of a miss condition (i.e., signal HITTOTB010 is a binary ONE) generated in response to a directory search made for a read type command (e.g. IF2). This assumes that there is no hold condition (i.e., signal [HOLDDMEM000 is a binary ONE), that in the case of an IF2 command it was not due to a transfer NOGO (i.e., signal NOGO020 is a binary ONE) and that there is no cancel condition (i.e., signal [CAN- CELC010 is a binary ONE) for a read type operation decoded by the circuits of block 750-113 in response to the read command applied to the command lines (i.e., signal DREQREAD100 is a binary ONE wherein DREQREAD100=READ100·DREQCAC112).

Under similar conditions, an instruction fetch 1 assignment (FIF1ASSIGN) flip-flop 750-11418 is switched to a binary ONE via an input AND gate 750-11420 in response to an IF1 command (i.e., when signal IF1100 is a binary ONE) in which there was a miss detected (i.e., signal SETTBVALID100 is a binary ONE). The load transit buffer valid flip-flop 750-11414 remains set until signal SETLDTBVALID100 switches to a binary ZERO. It will be noted that the binary ZERO output signal FLDTBVALID000 is applied to circuits included as part of block 750-102.

The other pair of flip-flops 750-11422 and 750-11424 are set in response to signal SETLDTBVALID100 in the case of a miss condition. The load quad flip-flop 750-11424 is set to a binary ONE state when the command applied to the DMEM command lines is decoded as being a LDQUAD command (i.e., signal LDQUAD100 from decoder 750-113 is a binary ONE) and that the ZAC command applied to the ZADOB lines is coded as requiring a read quad operation (e.g. IF1, IF2, LDQUAD, PRERD and RDSNGLE commands specified by signal ZADOB04100 being set to a binary ONE).

The RDQUAD flip-flop 750-11422 is set to a binary ONE via an AND gate 750-11426 when a signal CQIN1100 from the circuits included within command queue block 750-107 is a binary ONE indicative of a double precision command (i.e., signal ZADOBO2100 is a binary ONE).

As seen from FIG. 7a, block 750-114 further includes a comparator circuit 750-11435. This circuit may be considered conventional in design and, for example, may take the form of the circuits disclosed in U.S. Pat. No. 3,955,177.

The comparator circuit 750-11435 is enabled by signals USETBRDY100 and DATA100. The signal USETBPDY100 indicates that the cache is waiting for instructions from memory to be loaded into the IBUF1 or IBUF2 buffers. The signal DATA100 is forced to a binary ONE by a NAND gate 750-11436 indicating receipt of information from memory. The comparator circuit includes two sections. One section compares the command queue input pointer signals and output pointer signals from blocks 750-108 and 750-109 respectively. This section forces signals CQCMP100 and CQBMP000 to a binary ONE and binary ZERO respectively when the pointer signals are equal. The section corresponds to block 750-110 in FIG. 4.

The other section compares input terminals A1, A2 and B1, B2, the control signals [ZRIB100, [ZRIB010 applied to input terminals A1, A2 to the states of the I fetch 1 and I fetch 2 flag signals ZIF1FLG000, ZIF2FLG000 applied to terminals B1, B2. When equal, this indicates that the information being received from memory at this time is either in response to an I fetch 1 or i fetch 2 command. It will be noted that control signal [ZRIB100 controls ZRIB switch 750-720.

The input terminals A4, A8 compare signals ZEXT0100, ZEXT1100 against signals MIFS1100 and DATAODD100 applied to the B4, B8 terminals. This indicates whether the information being addressed within the instruction buffer equals the information being received. More specifically, signals ZEXT0100 and ZEXT1100 are generated by the circuits of block 750-920 from the least two significant bit address of the instruction stored in the RIRA register. Thus, they specify the word location being addressed within the I buffer. Signal MIFS1100 is coded to specify whether the first or second half of the block is being received. Signal DATAODD100 specifies whether the first or second word of the first two word pairs is being received. The signal DATAODD100 is generated by an AND gate 750-11437.

Lastly, the comparator circuit 750-11435 compares a signal ENABTBRDY100 applied to terminal A16 from block 750-102 with the voltage VCC representative of a binary ONE applied to terminal B16. In the presence of a true comparison between the two sets of all six signals, the circuit 750-11435 forces its output to a binary ONE. This results in the complement output terminal forcing signal IBUFCMPR000 to a binary ZERO. This causes block 750-722 to force the IBUFRDY100 signal to a binary ONE as explained herein.

Additionally, section 750-114 includes an AND gate 750-11417. During the first half of a cache cycle (i.e., signal FHT120 from delay circuit 750-11810 is a binary ONE) when the FLDTBVALID flip-flop 750-11414 is a binary ONE, the AND gate 750-11417 forces control signal [RTB5-8100 to a binary ONE. This signal is applied as a clock strobe input to the level storage section of transit block buffer 750-102. This section is constructed from a 4×4 simultaneous dual read/write 16-bit memory organized as four words each 4 bits in length similar to the memory device of block 750-10238 and the memory devices used in constructing the 36bit read command buffer section of block 750-102 as well as the write command/data buffer 750-100.

FIG. 7a shows that the data reception and control block 750-115 includes a plurality of NAND gates 750-11500 through 750-11510 and a plurality of AND gates 750-11511 through 750-11514 connected as shown to generate the control strobe enable signals [LQBUF100, [IBUF1100 and [IBUF2100, reset buffer signal RESETBUF100 and write control buffer signal [WRTBUF0100. These signals are used to control the operation of the buffer circuits of section 750-7. As seen from FIG. 7a, the other write control buffer signal [WRTBUF1100 is generated by a buffer delay circuit 750-11515 in response to signal FARDA010. The signal [WRTBUF0100 is derived from the output of the two input data selector/multiplexer circuit 750-128 which selects either the signal RMIFS1100 from register 750-127 or signal RMIFSB1100 from register 750-129. The selection is made in accordance with the state of signal FARDA000 produced from the accept line ARDA of data interface 600. The multiplexer circuit 750-128, in accordance with the state of signal FARDA000, generates the two sets of signals MIFS2100, MIFS3100 and DMIFS2100, DMIFS3100 which are applied to the read address inputs of buffer 750-102.

It will be noted that section 750-115 also includes a double precision (FDPFSX) D type flip-flop 750-11517 which is set in response to clocking signal [CLKT020 to a binary ONE state via a first AND gate input in accordance with the state of the signal PTXDPFS100 applied to the AND gate via amplifier circuit 750-11518 from the DPFS line by SIU 100. The DPFS line when set indicates that two words of data are being sent from SIU 100. Switching occurs when SIU100 forces the signal PTXARDA100 applied thereto via an amplifier circuit 750-11519 from the ARDA line of interface 600 to a binary ONE. The ARDA line indicates that the read data requested by cache 750 is on the DFS lines from SIU100. The output of a FARDA flip-flop (not shown) which delays signal ARDA by one clock period is applied to a second hold AND gate input along with signal FDPFSX100. The FDPFSX flip-flop 750-11517 remains set for two clock periods. That is, the flip-flop 750-11517 is set in accordance with the number of SIU responses (DPFS signals). In the case of a read single command, the SIU generates two SIU responses, each response for bringing in a pair of words. In each case, this permits the writing of the two words into cache when signal RWRCACFLG100 is a binary ONE.

The binary ZERO output of flip-flop 750-11517 is inverted by a NAND/AND gate 750-11521 and delayed by a buffer delay circuit 750-11522 before it is applied to AND gate 750-11512. The same binary ZERO output without being inverted is delayed by a buffer delay circuit 750-11523 and applied to circuits which reset the states of bit positions of a transit buffer valid bit register which forms part of transit buffer 750-102.

It will also be noted that the double precision signal FDPF110 is combined in an AND gate 750-11524 with a write cache flag signal RWRTCACFLG100 from transit block buffer flag storage portion of buffer 750-102. The AND gate 750-1152 generates a memory write request signal MEMWRTREQ100 which is forwarded to section 750-9 for enabling memory data to be written into cache (i.e., controls address switch(s) selection).

As seen from FIG. 7a, the initiating request control circuits block 750-116 includes an active output port request flip-flop 750-11600. The flip-flop is a clocked D type flip-flop which includes two input AND/OR gating circuits. Flip-flop 750-11600 is set to a binary ONE state in response to clock signal [CLKT020 when block 750-114 forces a pair of signals ENABSETAOPR100 and SETAOPR100 to binary ONES. When set to a binary ONE, this, in turn, sets the AOPR line of interface 600, signalling the SIU100 of a data transfer request. The binary ZERO side of flip-flop 750-11600 is inverted by an inverter circuit 750-11602, delayed by a delay buffer circuit 750-11604 and applied to a hold AND gate. The flip-flop 750-11600 remains set until the clock time that signal FARA020 switches to a binary ZERO indicating that the SIU100 accepted the cache memory request.

The hold control block 750-117, as shown, includes an inhibit transit buffer hit FINHTBHIT flip-flop 750-11700, an AND gate 750-11702 and a plurality of AND/NAND gates 750-11704 through 750-11716. The flip-flop 750-11700 is set to a binary ONE state via a first input AND gate and a NAND gate 750-11701 in response to a T clock signal [CLKT020 when signals INHTBHIT100 and TBHIT100 are binary ONES. The NAND gate 750-11701 forces signal INHTBHIT100 to a binary ONE in the case of a cancel condition (i.e., signal [CANCELC012 is a binary ZERO).

The complement output side of flip-flop 750-11700 applies signal FINHTBHIT000 as one input to AND gate 750-11702. A directory busy signal DIRBUSY000 from block 750-526 is applied to the other input of AND gate 750-11702. When the directory is not performing a search (i.e., signal DIRBUSY000 is a binary ONE) and signal INHTBHIT100 is a binary ONE, AND gate 750-11702 forces signal INHTBACMP000 to a binary ONE. This, in turn, causes the gate 750-11704 to force signal TBHIT100 to a binary ONE when the AND gate 750-136 forces a transit block address compare signal TBACMP100 to a binary ONE. At the same time, gate 750-11704 forces signal TBHIT000 to a binary ZERO.

The AND/NAND gates 750-11708 through 750-11710 generate signals CPSTOP000 through CPSTOP003 which are forwarded to processor 700 for indicating a hold condition. The other AND/NAND gates 750-11714 through 750-11716 generate signals [HOLDDMEM000 through [HOLDDMEM003 to specify an internal hold condition for preventing the other sections of cache 750 from executing the command applied to the command lines by processor 700. Whenever there is a hold command condition (i.e., signal HOLDCMD000 is a binary ZERO), a miss condition (i.e., signal FRDMISS020 is a binary ZERO), a hold quad condition from block 750-916 (i.e., signal HOLDLDQUAD000 is a binary ZERO) or a transit block hit condition (i.e., signal TBHIT000 is a binary ZERO), the gates 750-11708 through 750-11710 force their respective output signals CPSTOP003 through CPSTOP000 to binary ZEROS and signals CPSTOP103 through CPSTOP100 to binary ONES. This, in turn, causes the processor 700 to halt operation.

Under similar conditions, in addition to a hold search condition (i.e., signal HOLDSEARCH000 is a binary ZERO) as indicated by AND gate 750-11712 forcing signal [EARLYHOLD000 to a binary ZERO or a hold cache condition (i.e., signal [HOLDCCU000 is a binary ZERO), the gates 750-11714 through 750-11716 force their respective output signals [HOLDDMEM000 through [HOLDDMEM003 to binary ZEROS and signals [HOLDDMEM100 through [HOLDDMEM103 to binary ONES.

Referring to the Figure, it is seen that the timing circuits of block 750-118 include a synchronous D type flip-flop 750-11800 with two AND/OR input circuits. The flip-flop 750-11800 receives a half T clocking signal [CLKHT100 via gate 750-11802 and inverter circuit 750-11804. A definer T clock signal DEFTCLK110 is applied to one of the data inputs via a pair of delay buffer circuits 750-11806 and 750-11808. Each buffer circuit provides a minimum delay of 5 nanoseconds.

Both the signals [CLKHT100 and DEFTCLK110 are generated by the common timing source. In response to these signals, the half T flip-flop 750-11800 switches to a binary ONE state upon the trailing edge of the DEFTCLK110 signal. It switches to a binary ZERO state upon the occurrence of the next [CLKHT100 signal (at the trailing edge).

The signals FHT100 and FHT000, in addition to signals FHT120, FHT010 and FHT020 derived from the binary ONE and binary ZERO output terminals of flip-flop 750-11800, are distributed to other circuits of section 750-1 as well as to other sections (i.e., 750-5, 750-9 and 750-114). The signals FHT120, FHT020 and FHT010 are distributed via another pair of delay buffer circuits 750-11810 and 750-11812 and a driver circuit 750-11814 respectively.

The T clock signals such as [CLKT020 and [CLKT022 generated by the common timing source as distributed in their "raw" form to the various flip-flops of registers. When there is a need to generate a ½ T clock signal, the ½ T clock signal [CLKHT020 is gated with the ½ T definer signal (FHT100) at the input of the flip-flop or register. The state of signal FHT100 is used to define the first and second halves of a T cycle. When signal FHT100 is a binary ONE, this defines a time interval corresponding to the first half of a T clock cycle. Conversely, when signal FHT100 is a binary ZERO, this defines a time interval corresponding to the second half of a T clock cycle.

For the purpose of the present invention, the data recovery circuits can be considered conventional in design and may, for example, take the form of the circuits described in the referenced patent applications. These circuits generate a data recovery signal for forwarding to processor 700 by "ANDING" the ½ T clock signal FHT000 with a signal indicating that data is being strobed into the processor's registers. This causes the data recovery signal to be generated only during the second half of a T clock cycle when such data is being strobed into the processor's registers.

In the case of sections 750-5 and 750-9, the signal FHT100 is used to control the switching of other timing and control flip-flops as explained herein.

DETAILED DESCRIPTION OF SECTION 750-3

Figure 7B:
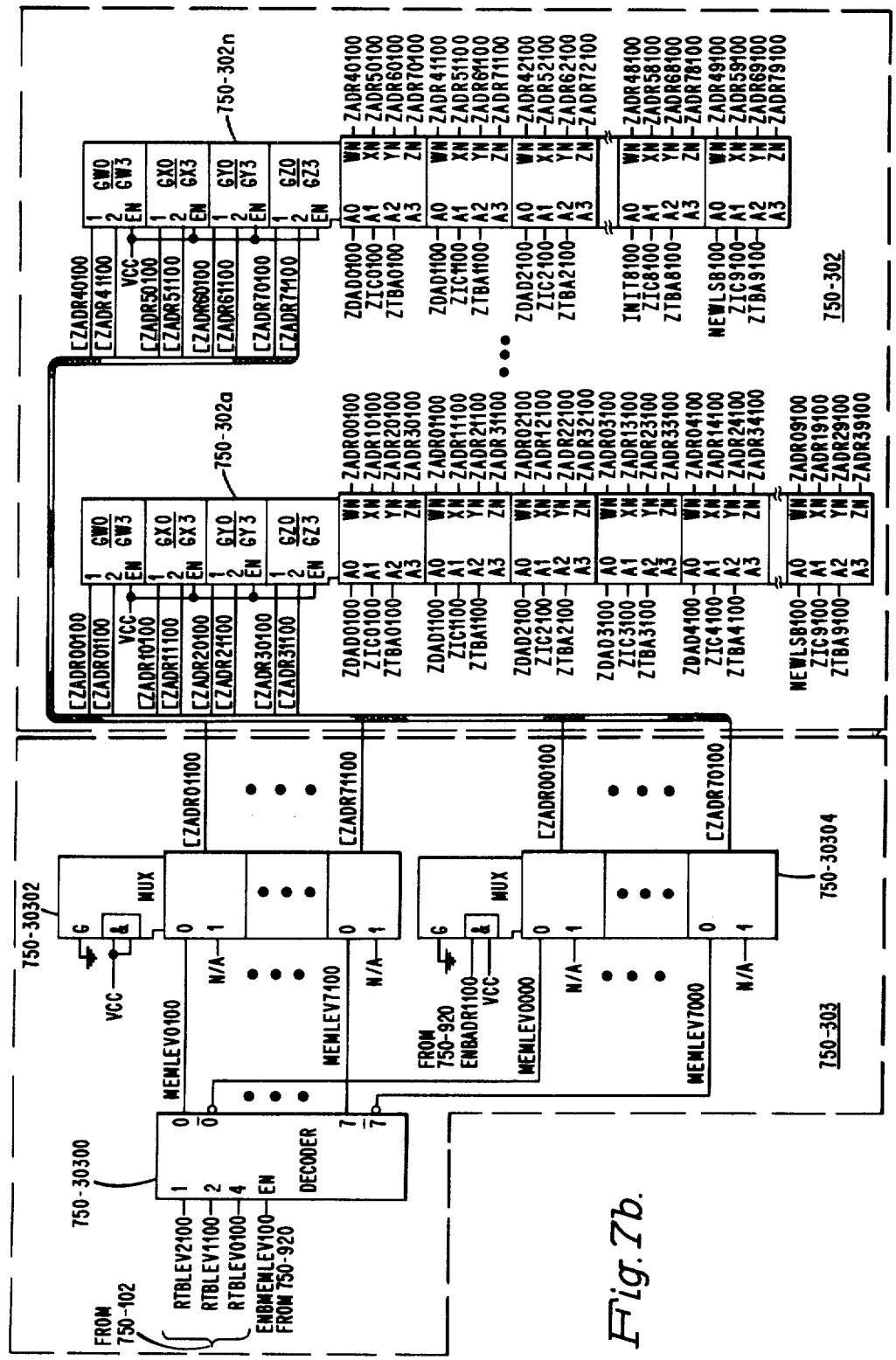

FIG. 7b shows in greater detail specific ones of the blocks of section 750-3. Corresponding reference numbers have been used where possible.

Referring to FIG. 7b, it is seen that the decoder circuits of block 750-303 include a decoder circuit 750-30300 which is enabled for operation by signal ENBMEMLEV100 from the circuits of block 750-920. The signals from non-inverted output terminals of decoder circuit 750-30300 are applied to the input terminals of a first multiplexer circuit 750-30302. The signals at the inverted output terminals are applied to the input terminals of a second multiplexer circuit 750-30304. The multiplexer circuit 750-30302 is always enabled for operation while the multiplexer circuit 750-30304 is only enabled when signal ENBADR1100 is forced to a binary ONE by the circuits of block 750-920. It is assumed that the "0" positions of both multiplexer circuits will always be selected.

Predetermined combinations of the two sets of control signals [ZADR01100 through [ZADR71100 and signals [ZADR00100 through [ZADR70100 are applied to the control input terminals of each of the eight crossbar address selection switches 750-302a through 750-302h, as shown. It is seen that each crossbar switch includes a number of sections, each section includes three parts indicated by the heavy lines between sections. For simplicity, the number of sections of each switch are shown together. For simplicity, the control portion of each section is shown only once since it is the same for all the sections which are required to make up the switch.

As seen from the Figure, depending upon the states of the pairs of control signals [ZADR00100, [ZADR01100 through [ZADR70100, [ZADR71100, the signals from one of the three sources are applied to each set of W, X, Y and Z terminals simultaneously.

DETAILED DESCRIPTION OF SECTION 750-5

FIG. 7c shows in greater detail specific ones of the blocks of section 750-5 as explained previously. Corresponding reference numbers have been used where possible.

Referring to FIG. 7c, it is seen that the directory hit/miss control circuits of block 750-512 include an encoder network comprising a plurality of NAND gates 750-51200 through 750-51220 and a plurality of amplifier circuits 750-51224 through 750-51228. The NAND gate circuits are connected to encode the set of signals ZFE1100 through ZFE7100 from block 750-506 and the set of signals ZHT1100 through ZHT7100 from the blocks 750-546 through 750-552 into the 3-bit code for controlling the operation of switch 750-306.

The signal GSRCH100 is generated by the circuits of block 750-526. As explained herein, this signal is only forced to a binary ONE during the second half of a T clock cycle. Thus, an output from one of the NAND gates 750-51200 through 750-51208 is generated only during that interval. More specifically, the hit signal specified by the state of the full-empty bit causes one of the signals ZCDLEV1000 through ZCDLEV7000 to be forced to a binary ZERO state. This, in turn, conditions NAND gates 750-51216 through 750-51220 to generate the appropriate 3-bit code.

Signal ZCDICENAB100 also generated by the circuits of block 750-526 is forced to a binary ONE only during the first half of a T clock cycle. Thus, outputs from NAND gates 750-51210 through 750-51214 are generated only during that interval. That is, the instruction address level signals ZNICLEV0100 through ZNICLEV2100 from block 750-910 produce signals ICL0000 through ICL2000 which, in turn, produce signals ZCD0100 through ZCD2100. It will be noted that the signals ZCD0100 through ZCD2100 correspond to ZNICLEV0100 through ZNICLEV2100.

The signals RDDBLL0000 through RDDBLL2000 are used to define the second cycle of operation for a read double command. Accordingly, when any one of the signals RDDBLL0000 through RDDBLL2000 is in a binary ZERO state, this forces a corresponding one of the signals ZCD0100 through ZCD2100 to a binary ONE.

The signals ZCD0100 through ZCD2100 are applied to different inputs of corresponding ones of the amplifier driver circuits 750-51224 through 750-51228. These circuits apply the control signals [ZCD0100 through [ZCD2100 to the control terminals of switch 750-306.

A next block shown in greater detail in FIG. 7c is block 750-526. As mentioned previously, block 750-526 includes a number of directory control flip-flops. The control state flip-flops shown include the directory assignment (FDIRASN) control state flip-flop 750-52600 and a plurality of timing flip-flops of a register 750-52610.

The flip-flop 750-52600 is a clocked D type flip-flop which is set to a binary ONE via first input AND gate in the case of a command request (i.e., signal REQCOMB0100 is a binary ONE) for a read type command (i.e., RDTYP100 is a binary ONE) when processor 700 requests data from memory and not cache 750 (i.e., signal BYPCAC110 is a binary ONE). In greater detail, in the absence of a hold condition (i.e., signal HOLD000 applied via an AND gate 750-52602 is a binary ONE), a go transfer (i.e., signal NOGO021 is a binary ONE), no cancel condition (i.e., signal CANCELC010 is a binary ONE) and processor 700 has signalled a request (i.e., signal DREQCAC111 is a binary ONE) an AND gate 750-52604 forces signal REQCOMB0100 to a binary ONE.

An AND gate 750-52606 forces the signal SETONBYP100 to a binary ONE in the case of read type when decoder circuit 750-528 forces signal RDTYP100 to a binary ONE when processor 700 forces the bypass cache signal BYPCAC110 to a binary ONE. The result is that the FDIRASN flip-flop 750-52600 switches to a binary ONE for specifying a directory assignment cycle of operation.

The flip-flop 750-52600 is also set to a binary ONE via a second input AND gate in the case of a command request (i.e., signal REQCOMB0100 is a binary ONE) when a miss condition is detected for the block requested to be read (i.e., signal SETONMISS100 is a binary ONE). The signal SETONMISS100 is forced to a binary ONE by an AND gate 750-52608 when signal RDTYP100 is a binary ONE and signal RAWHIT000 from block 750-512 is a binary one. The flip-flop 750-52600 is reset to a binary ZERO state upon the occurrence of clock signal [CLOCK112 generated from the common source in the absence of a set output signal from the two input AND gates.

A first flip-flop (FICENAB) of register 759-52610 is used to define the interval of time within a T clock cycle when instructions or operands are to be fetched from cache 750.

This flip-flop is switched to a binary ONE state via a first AND gate in response to a clock signal [CLOCKD120 when signal FHT100 generated by the timing circuits of block 750-112 is a binary ONE. Clock signal [CLOCKD120 from the common timing source is applied via an AND gate 750-52610 and an inverter circuit 750-52612 and an inverter circuit 750-52514. The FICENAB flip-flop resets on the following clock signal when signal FHT-100 has been switched to a binary ZERO.

The second flip-flop of register 750-52610 is used to define an interval during which operands (not intructions) are being fetched from cache 750 as a consequence of a special condition caused by an IF1 command which did not specify the last word in an instruction block. The FRCIC flip-flop is switched to a binary one via a first input AND gate in response to clock signal [CLOCK-D120 when signal FJAMZNI-CLEV000 is a binary ONE. The FRCIC flip-flop resets on the following clock pulse when signal FJAMZNI-CLEV000 has been switched to a binary ZERO.

As shown, the signal at the binary ZERO output terminal of the FICENAB flip-flop corresponds to the gate half T clock signal GATEHFTCHLK110 which is distributed to the circuits of block 750-920.

The signal FICENAB000 is combined with signal FRCIC000 and signal RCCDLZCDE000 within and AND gate 750-52616 to produce signal GSRCH100. The signal RDDBLZCDE000 is from decoder circuit. This gate forces signal GSRCH100 to a binary ONE during the second half of a T clock cycle when operands are being fetched (i.e., signal FICENAB000 is a binary ONE) except in the case of a read double command (i.e., signal RDDBLZCDE000 is a binary ONE).

The binary ZERO output of the FICENA flip-flop is combined with signal FRCIC000 within a NAND gate 750-52618. The NAND gate 750-52618 operates to force signal ZCDINCENAB100 to a binary ONE during the first half T interval when instructions are being fetched (i.e., signal FICENAB000 is a binary ZERO) or in the case of the type IF1 command described above (i.e., signal FRCIC000 is a binary ZERO).

The circuits of block 750-526 further include a NAND gate 750-52620 and a plurality of AND gates 750-52622 through 750-52528 connected, as shown. The circuits generate a first enable control signal DIRADDE100 for controlling the operation of decoder circuit 750-521. Additionally, they generate a second enable control signal FEDCODE100 for controlling the operation of a decoder circuit 750-52000 of block 750-520.

In greater detail, during a directory assignment cycle (i.e., signal FDIRASN100 is a binary ONE) in the absence of a transfer no go condition (i.e., signal NOGO21 is a binary ONE), AND gate 750-52626 forces signal DIRNOGO100 to a binary ONE. When a signal FSKIPRR000 from the circuits of block 750-916 is a binary ONE, this causes the AND gate 750-52628 to force signal DIRADDE100 to a binary ONE which enables decoder circuit 750-521 for operation. When either signal DIRNOGO100 or FSKIPRR000 is forced to a binary ZERO, this causes AND gate 750-52628 to disable decoder circuit 750-521 by forcing signal DIRADDE100 to a binary ZERO.

Under the same conditions, the AND gate 750-52624 forces signal FEDCODE100 to a binary ONE which enables decoder circuit 750-52000 for operation. The AND gate 750-52630 causes an amplifier circuit 750-52632 to force signal FORCEBYP000 to a binary ONE when both signals FSKIPRR000 and FBYP-CAC00 are binary ONES. The FORCEBYP000 is applied to the transit block flag section of block 750-102. The signal FBYPCAC000 is generated in a conventional manner in accordance with the signal applied to the line BYPCAC by processor 700. The signal is stored in a flip-flop, not shown, whose binary ZERO output corresponds to signal FBYPCAC000.

The circuits of block 750-520, as shown, include the decoder circuit 750-52000 and a pair of multiplexer circuits 750-52002 and 750-52004. It is assumed that normally the signals applied to the "0" input terminals of multiplexer circuits 750-52002 and 750-52004 are selected to be applied as outputs (i.e., the signal applied to the G input is a binary ZERO). Therefore, when the decoder circuit 750-520000 is enabled, the output signals FED0100 through FED7100 result in the generation of signals RWFE0100 through RWFE7100 in response to clock signal [CLOCK000.

The FIG. 7c also shows in greater detail register 750-504 as including a clocked four stage register 750-50400 and a plurality of amplifier circuits 750-50402 through 750-50602. The register 750-50400 includes D type flip-flops, the first three of which are connected for storing round robin signals OLDRR0100 through OLDRR2100. The fourth flip-flop is connected to indicate the presence of an alternate hit condition having been detected by the circuits 750-562, not shown. That is, it is set to a binary ONE state when signal ALTHIT100 is a binary ONE.

It will be noted that the flip-flops of register 750-50400 are only enabled in response to clock signal [CLOCK112 when signal FDIRASN000 is a binary ONE indicative of no directory assignment cycle being performed (a hit condition).

In the case of a hit condition detected within the half of a block being referenced, signal ALTHIT000 is forced to a binary ZERO. This causes the first three flip-flops of register 750-50400 to be loaded via a first set of input AND gates with the round robin signals RR0100 through RR2100 from block 750-500. When there is a hit condition detected within the other half (alternate) of the block being referenced, the circuits of block 750-512 force signal ALTHIT100 to a binary ONE. This causes the three flip-flops to be loaded via a second set of input AND gates with the alternate level signals ALTHITLEV0100 through ALTHITLEV2100 generated by the circuits of block 750-512.

The binary ONE signals of register 750-50400 are applied as inputs to the amplifier driver circuits 750-50402 through 750-50406 for storage in the transit block buffer 750-102. The same signals are applied to the A operand input terminals of an adder circuit of block 750-508. The adder circuit adds or increments the signals OLDRR0100 through OLDRR2100 by one via the binary ONE applied to the C1 terminal of the adder circuit. The sum signals NXTRR0100 through NXTRR2100 generated at the F output terminals are written into the round robin section of control directory 750-500.

Lastly, the signals OLDRR0100 through OLDRR2100 are applied as inputs to another set of amplifier driver circuits 750-50408 through 750-50412 for storage in one of the instruction address registers 750-900 and 750-902 of FIG. 7e.

DETAILED DESCRIPTION OF SECTION 750-7

FIG. 7d shows in greater detail different ones of blocks of section 750-7. As seen from FIG. 7d, block 750-722 includes a plurality of series connected NAND gates 750-72230 through 750-72234. The NAND gates 750-72230 and 750-72231 are connected to receive instruction buffer valid and instruction control signals IBUF1V100, [ZRIB010 and IBUF2V100, [ZRIB100 from I buffers 750-715 and 750-717 and block 750-920. The IBUF1V100 and IBUF2V100 signals indicate the instruction buffer into which information is being loaded. That is, when signal IBUF1V100 is a binary ONE, that specifies that I buffer 750-715 is loaded. When signal IBUF2V100 is a binary ONE, that specifies that I buffer 750-717 is loaded with an instruction word.

The control signals [ZRIB010 and [ZRIB100 specify which instruction buffer valid bit is to be examined which corresponds to the instruction buffer being addressed. That is, when signal [ZRIB010 is a binary ONE, the IBUF1 valid bit is specified by the circuits of block 750-920. When signal [ZRIB100 is a binary ONE, that specifies the IBUF2 valid bit. When either signal IBUF1RDY000 or signal IBUF2RDY000 is forced to a binary ZERO, NAND gate 750-72232 forces signal TBIBUFRDY100 to a binary ONE indicative of a ready condition.

The circuits of block 750-920 force an enabling signal USETBRDY100 to a binary ONE following the switching of the appropriate I buffer valid bit. This causes the NAND gate 750-72233 to force the TBRYD000 signal to a binary ZERO. The result is that NAND gate 750-72234 forces the IBUFRDY100 to a binary ONE signalling the ready condition.

It will also be noted that NAND gate 750-72234 also forces the IBUFRDY100 signal to a binary ONE when an instruction fetch ready signal IFETCHRDY000 is forced to a binary ZERO by the circuits of block 750-920. Signal IFETCHRDY000 is a binary ONE except when the instructions are being pulled from a block in cache. Lastly, NAND gate 750-72234 forces IBUFDRY100 signal to a binary ONE when an instruction buffer compare signal IBUFCMPR000 is forced to a binary ZERO by comparator circuit 750-11435.

As seen from FIG. 7d, the IBUF1 and IBUF2 sections 750-715 and 750-717 each include a plurality of 4×4 simultaneous dual read/write memories. Each memory is a 16-bit memory organized as 4 words of 4 bits each. Words may be independently read from any two locations at the same time as information is being written into any location.

The signals [WRTBUF0100 and [WRTBUF1100 are applied to the write address terminals of each memory while the signals [ZEXT0100 and [ZEXT1100 are applied to a different one of the sets of read address terminals together with the signal Vcc. The read address inputs are enabled by the Vcc signal applied to the G1 terminal. The signals [ZEXT0100 and [ZEXT1100 permit the read out of the contents of any one of the 4/-bit locations to the 1AY output terminals.

The memories 750-71500 through 750-71503 of block 750-715 are loaded with the signals RDFS(XO)110 through RDFSP(X)010 and signal Vcc in response to T clock signal [CLKHT021 when IBUF1 strobe signal [IBUF1120 from block 750-115 is forced to a binary ONE. Also, the contents of all the memory locations of each memory are cleared to ZEROS when the circuits of block 750-115 force IBUF1 reset signal RESIBUF1000 to a binary ZERO. That is, as seen from FIG. 7d, the pairs of series connected NAND gates 750-71504 and 750-71505 and 750-71704 and 750-71705 force reset signals RESIBUF1000 and RESIBUF2000 to binary ZEROS. Also, an initialize signal INIT000 when forced to a binary ZERO by processor 700 also forces signals RESIBUF1000 and RESIBUF2000 to binary ZEROS.

In a similar fashion, the memories 750-71500 through 750-71503 block 750-717 are loaded with signals RDFS(X0)110 through RDFSP(X)010 and signal Vcc in response to T clock signal [CLKHT021 when IBUF2 strobe signal is forced to a binary ONE. Since there are three additional groups of memories such as memories 750-71500 through 750-71503 included within each buffer to provide storage for four 36-bit instruction words, the (X) designation for input and output signals is used to indicate that such signals are similar except for the different values of (X). For example, X0 has the values 00, 17, 18 and 35 while X8 has the values 08, 09, 26 and 27. Each byte location includes a valid bit location which is switched to a binary ONE whenever information is loaded into that location. However, the output signals from each valid bit byte location are connected in common so that the arrangement can be viewed such that each word location includes one valid bit location.

The memories may be considered conventional in design and for example, such memories may take the form of the circuits disclosed in U.S. Pat. No. 4,070,657.

DETAILED DESCRIPTION OF SECTION 750-9

FIG. 7e shows in greater detail specific ones of the blocks of section 750-9. Corresponding reference numbers have been used where possible.

Referring to FIG. 7e, it is seen that the block 750-920 includes a first group of circuits of block 750-92000 which generate the four sets of write control signals WRT00100 through WRT70100, WRT01100 through WRT71100, WRT02110 through WRT72110 and WRT03100 through WRT73100. As seen from FIG. 7e, these circuits include a pair of multiplexer circuits 750-92002 and 750-92004, a register 750-92006 and four octal decoder circuits 750-92008 through 750-92014, connected as shown.

The multiplexer circuit 750-92002 has signals RHITLEV0100 through RHITLEV2100 from block 750-512 applied to the set of "0" input terminals while signals RTBLEV0100 through RTBLEV2100 applied to the set of "1" input terminals. During the first half of a T cycle when signal FDFN2HT100 applied to the control terminal G0/G1 is a binary ZERO, the signals RHIT-LEV0100 and RHITLEV2100 are applied to the output terminals. They are clocked into the top three flip-flops of register 750-92006 in response to T clock signal [CLKHT02. This enables processor operands to be written into cache 750-300 during the second half of the T clock cycle. During the second half of a T cycle when signal FDFN2HT100 is forced to a binary ONE, the signals RTBLEV0100 through RTBLEV2100 are clocked into the register 750-92006 in response to the T clock signal [CLKHT02. This enables memory data to be written into cache 750-300 during the first half of the next cycle.

The second multiplexer circuit 750-92004 has signals ZONE0100 through ZONE3100 from switch 750-144 applied to the set of "0" input terminals while signal MEMWRREQ100 from block 750-112 is applied to the set of "1" input terminals. When signal FDFN2HT100 is a binary ZERO, the signals ZONE0100 through ZONE3100 are applied to the output terminals. They are clocked into the bottom four flip-flops of register 750-9206 in response to T clock signal [CLKHT02. During the first half of a T clock cycle, NAND gate 750-92005 forces signal ENBWRT100 to a binary ONE which enables the previously loaded signals to be applied to the output terminals. This enables the processor zone bits to be used in specifying which operand bytes are to be updated when writing processor data into the specified level of cache. When signal FDFN2HT100 is forced to a binary ONE, the signal MEMWRREQ100 is clocked into the register 750-92006. This causes all the zones bits to be forced to binary ONES for causing all of the bytes of each data word received from memory to be written into the specified level of cache during the first half of the next T clock cycle.

As seen from FIG. 7e, different ones of the signals RWRTLEV0100 through RWRTLEV2100 are applied to the enable input terminals of octal decoder circuits 750-92008 through 750-92014. The signals RWRTLEV0100 through RWRTLEV2100 are applied to the input terminals of each of the octal decoder circuits 750-92008 through 750-92014.

The block 750-920 includes a second group of circuits of block 750-92020. These circuits generate the half T clock signal applied to the circuits of block 750-92000, the enable memory level signal ENABMEMLEV100, and enable address signal ENADR1100 applied to the circuits of block 750-303. They also generate the sets of control signals [ZIC010, [ZIC110 and [RICA100, [RICB100 applied to the circuits of instruction address registers 750-900 and 750-902 in addition to control signals [RIRA100 and [RIRB100 applied to the registers 750-308 and 750-310.

The circuits of block 750-92020 include a pair of half definer flip-flops of a register 750-92022, a group of three control flip-flops of register 750-92024 and a clocked flip-flop 750-92026. The circuits also include a number of AND gates, NAND gates, AND/NAND gates and AND/OR gates 750-92030 through 750-92041.

The series connected AND/NAND gate 750-92030, AND/OR gate 750-92032 and AND gates 750-92034 and 750-92035 in response to a signal FLDQUAD100 from 750-916, a signal FWFIDESC010 from processor 700 and signals FACTVRIC000 and FACTVRIC100 from register 750-92024 generate control signals [ZIC000, [ZIC010 and [ZIC110. These signals are used to control the operation of ZIC switch 750-906 and the different sections of registers 750-900 and 750-902 (e.g. level valid bit storage and level bit storage) in addition to registers associated therewith.

The series connected AND gate 750-92036, the AND/NAND gate 750-92037 and NAND gates 750-92038 through 750-92041 operate to generate register strobe signals [RICA100 and [RICB100. These signals control the loading of registers 750-900 and 750-902. The AND gate 750-92036 forces signal VALRDIBUF100 to a binary ONE when a hit condition was detected in the case of a read command (i.e., signal FRDMISS000 is a binary ONE), the transfer was a go (i.e., signal NOGO020 is a binary ONE) and signal CMPDATA/ICLEV000 from the comparator circuit of block 750-912 is a binary ONE.

The signal FRDMISS000 is obtained from the binary ZERO output of the flip-flop, not shown, which as mentioned is set in accordance with the Boolean expression:

FRDMISS=(RDCMD·[HOLDDMEM·$\overline{HIT}$·$\overline{TOIC}$·[$\overline{CANCELC}$).

The signals GOODFTCHA100 and GOODFTCHB100 generated by circuits, not shown, indicate whether the RICA register 750-900 or RICB register 750-902 is being used at that time and its contents are therefore incremented. For example, signal GOODFTCHA100 is generated in accordance with the following Boolean expression:

GOODFTCHA = $\overline{INSTIF1}$·FLDQUAD·FACT-$\overline{VRIC}$·FDFN2HT + FDFN2HT·FL-DQUAD·FACTVRIC.

Signal GOODFTCHB is generated in a similar fashion except for the reversal in states of signals FACTVRIC and $\overline{FACTVRIC}$.

It is seen that when signal EXECRDIBUF100 is forced to a binary ONE when processor 700 forces signal RDIBUF110 to a binary ONE, the NAND gate 750-92039 causes NAND gate 750-92041 to force signal [RICA100 to a binary ONE when signal GOODFT-CHA100 is a binary ONE. The signal ENBSTRBA000 indicates when the RICA register 750-900 is being initially loaded. That is, when signal ENBSTRBA000 is forced to a binary ZERO, it causes NAND gate 750-92041 to force signal [RICA100 to a binary ONE. More specifically, signal ENBSTRBA is generated in accordance with the following Boolean expression:

ENBSTRBA = $\overline{FLDQUAD}$·FACTVRIC·$\overline{F}$-$\overline{NEWIF1}$·FDFN1HT + FDFN1HT·$\overline{FACT}$-$\overline{VRIC}$·FJAMZNICLEV·$\overline{FHOLDIF1}$+(IN-STIF1+DCDLDQUAD)·FACTVRIC·FDFN2-HT·[$\overline{CANCLCMD}$ + FDFN2HT·[$\overline{ZIC}$·$\overline{INH2}$-$\overline{HT}$·ENAB2HT.

wherein ENAB2HT = ENABRIC1 + ENABRIC2 and $\overline{INH2HT}$ = [$\overline{CANCLCMD}$·$\overline{FLASTINST}$. Under either set of conditions, signals [RICA100 and [RICB100 enable the strobing of their corresponding registers when they are either being initially loaded or following incrementing as when instructions are being fetched or pulled out from cache.

The NAND gate 750-92042, AND/NAND gate 750-92043 and NAND gates 750-92044 through 750-92049 are connected to generate register strobe signals [RIRA100 and [RIRB100 in a fashion similar to the generation of register strobe signals [RICA100 and [RICB100.

The NAND gate 750-92046 forces signal [RICA100 to a binary ONE in the case of a new instruction fetch (i.e., signal NEWINST000 is a binary ZERO) or when the processor 700 takes an instruction from RIRA register 750-308 (i.e., signal TAKEINST000 is a binary ZERO). The NAND gate 750-92049 forces signal [RIRB100 in the case of a new operand fetch (i.e., signal NEWDTA000 is a binary ZERO) or when processor 700 takes a data word from RIRB register 750-310 (i.e., signal TAKEDATA000 is a binary ZERO).

The AND gate 750-92050 and AND/NAND gate 750-92051 generate signal ENBMEMLEV100 during the second half of a T clock cycle (i.e., signal FDFN2HT101 is a binary ONE) when the circuits of block 750-112 force memory write request signal MEMWRTREQ100 to a binary ONE. The NAND gate 750-92052 generates signal ENBADR1100 during the second half of a T clock cycle (i.e., signal FDFN1HT101 is a binary ZERO) or when the instruction counter is in use (i.e., signal USEIC000 is a binary ZERO).

As concerns the flip-flop registers, it is seen that the flip-flop of register 750-92026 is switched to a binary ONE state via a first AND gate when AND gate 750-92053 is conditioned to force signal INSTIF1100 to a binary ONE in response to an IF1 command being decoded by decoder circuit 750-922 (i.e., signal DCDIF1100 is a binary ONE) which does not require additional descriptors (i.e., signal FFPIMEIS020 from processor 700 is a binary ONE) and AND gate 750-92054 forces signal [CANCELCMD000 to a binary ONE in response to a no cancel condition (i.e., signal [CANCELC010 is a binary ONE) and a no hold condition (i.e., signal [HOLDDMEM001 is a binary ZERO).

The flip-flop register 750-92026 is reset to a binary ZERO via a second input AND gate which receives signals ENABNEWINST000 and NEWIF1FDBK100 from a pair of NAND gates 750-92042 and 750-92043 and AND gate 750-92055. The binary ONE output of the flip-flop register 750-92026 is applied to NAND gate 750-92056. NAND gate 750-92056, during the first half of a T clock cycle (i.e., signal FDFN1HT100 is a binary ONE), switches signal USEIC000 to a binary ZERO when signal FNEWIF1100 is switched to a binary ONE.

The second flip-flop register 750-92022 includes the pair of timing flip-flops which are both set to binary ONES in response to signal GATEHFTCLK100 from section 750-5 in response to ½ T clock signal [CLKHT021. The flip-flops of register 750-92022 are reset to binary ZEROS in response to the next ½ T clock signal [CLKHT021.

The flip-flops of register 750-92024, as mentioned previously, provide various state control signals. The first flip-flop (FRDIBUF) is switched to a binary ONE state when NAND gate 750-92060 forces signal SETRDIBUF100 to a binary ONE in response to read I buffer request from processor 700 (i.e., signal EXECRDIBUF000 is a binary ZERO) or an inihibit ready condition (i.e., signal FINHRDY010 is a binary ZERO) when AND gate 750-92061 forces signal ENABSETRDIBUF100 to a binary ONE. The signal ENABSETRDIBUF100 is forced to a binary ONE in the case of a command which is not quad command (i.e., signal FLDQUAD000 is a binary ONE) or an instruction fetch 1 command (i.e., signal GOODIF1000 is a binary ONE). The FRDIBUF flip-flop is reset a clock period later in response to T clock signal [CLKT021 via a second input AND gate.

The second flip-flop (FACTVRIC) of register 750-92024 is set and reset in accordance with the Boolean expressions previously given via the NAND gates 750-92062 and 750-92064, the AND gate 750-92063 and AND/NAND gate 750-92065. The third flip-flop (FRDDATA) is set to a binary ONE state via a first input AND gate in response to signal SETRDIBUF100 when the command is a load quad command (i.e., signal FLDQUAD100 is a binary ONE). The FRDDATA flip-flop is reset to a binary ZERO state a clock period later via a second input AND gate in response to the T clock signal [CLKT021.

The next group of circuits included within block 750-920 include the circuits of block 750-92070. As seen from FIG. 7e, these circuits include a first plurality of AND gates, AND/NAND gates and NAND gates 750-92071 through 750-92086, connected as shown. These gates generate control signals SETACURLEV100, [RICACNTL100 and RSTACURLEV200 which control the setting and resetting of the current level and level valid bit positions of RICA register 750-900 in accordance with the states of signals SETALEV1VAL100, RSTALEV1VAL000 and SETLEV2-VAL100. These signals are generated by another plurality of AND gates and NAND gates 750-92087 through 750-92095.

A second plurality of AND gates, AND/NAND gates and NAND gates 750-92100 through 750-92116, in a similar fashion, generates signals SETBCURLEV100, RSTBCURLEV200 and [RICBCNTL100 which set and reset the current level and valid bits for the RICB register 750-902 in accordance with signals SETBLEV1VAL100, RSTBLEV1VAL000 and SETBLEV2-VAL100. These signals are generated by another plurality of AND gates and NAND gates 750-92120 through 750-92125.

A plurality of AND gates 750-92126 through 750-92129, in response to signals SETALEV1VAL100, SETBLEV1VAL-100, SETALEV2VAL100 and SETBLEV1VAL-100, generate control signals [RICALEV100 through [RICBLEV2100 when signal [CANCELCMD000 is a binary ONE. These signals are applied to the control input terminals of the level bit storage sections of the RICA and RICB registers 750-900 and 750-902 for controlling the loading of hit level signals from section 750-512.

A further plurality of AND/NAND, AND/OR gates and NAND gates 750-92130 through 750-92137, in response to signals from the level valid bit storage and level storage sections of registers 750-900 and 750-902, generate the use transit buffer ready signal USETBRDY100 and the control signals [ZRIB010 and [ZRIB100 which are applied to the circuits of block 750-114.

It is also seen that block 750-92070 includes a four D type flip-flop register 750-92140, the pair of AND gates 750-92141 and 750-92142, the pair of AND/NAND gates 750-92143 and 750-92144 and the pair of AND-/OR gates 750-92145 and 750-92146, connected as shown. The flip-flops of register 750-92140 are loaded with the contents of bit positions 8 and 9 of the RICA and RICB registers 750-900 and 750-902 in response to T clock signal [CLKHT020 under the control of signals [RICA100 and [RICB100. That is, the top pair of register flip-flops are clocked when signal [RICA100 applied to terminal G1 is forced to a binary ONE while the bottom pair of register flip-flops are clocked when signal [RICB100 applied to terminal G2 is forced to a binary ONE. The signals [ZIC000 and [ZIC100 applied to terminals G3 and G4 control independently the generation output signals from the top pair of flip-flops and bottom pair of flip-flops respectively at the corresponding sets of output terminals.

Pairs of binary ZERO output signals are combined within AND gates 750-92141 and 750-92142 to generate address signals ZEXT0100 and ZEXT1100, in addition to those signals required for the generation of control signal NEXTLEVVAL100 which is applied to the control input terminals of comparator circuit 750-912.

A last group of circuits include a flip-flop register 750-92150 and a plurality of AND gates, an AND/NAND gate, NAND gates and AND/OR gate 750-92151 through 750-92156. These circuits are connected to generate signal IFETCHRDY-000 which is applied to the circuits of section 750-114. The gates 750-92153 and 750-92154 are connected to generate timing signals DFN2HT101 and DFN2HT100 in response to signal FHT010 from block 750-112. These signals are forced to binary ONES during the second half of a T clock cycle of operation.

The flip-flop register 750-92150 is set to a binary ONE via a first input AND gate when AND gates 750-92151 and 750-92152 force signals SETINHRDY100 and CANCELINHRDY-000 to binary ONES. It is reset to a binary ZERO via a second input AND gate when NAND gate 750-92155 forces signal RSINHRDY000 to a binary ZERO. The binary ZERO output of register 750-92150 is applied to AND/OR gate 750-92156. When signal FINHRDY000 is forced to a binary ZERO, it causes gate 750-92156 to force signal IFETCHRDY-000 to a binary ONE state.

Additionally, FIG. 7e shows in greater detail the switch 750-910 and comparator circuits of blocks 750-912 and 750-914. The switch 750-910 is a crossbar switch which operates in the manner previously described. The W outputs select one of the two sets of signals applied to the A0 and A1 terminals in accordance with the state of signal [ZIC110. The X outputs select one of the two sets of signals applied to the A3 and A4 terminals in accordance with the state of signal [ZIC110. The Y and Z outputs select one of the four sets of signals applied to the A0-A4 terminals in accordance with the states of signals [ZIC110, [ZNICLEV100 and [ZIC110, ZCURLEV100.

The output signals ZNICLEV0100 through ZNICLEV2100 from the Y output terminals of circuit 750-910 are applied to the B input terminals of comparator circuit 750-912 for comparison with the signals RTBLEV0100 through RTBLEV2100 from section 750-102. The comparator circuit 750-912 is enabled when decoder circuit 750-922 has decoded an IF1 command (i.e., signal DECODEIF1010 is a binary ONE) and signal NEXTLEVVAL100 is a binary ONE. The comparison results in the generation of signals CMPDATA/ICLEV100 and CMPDATA/ICLEV000.

Other comparator circuits of blocks 750-912 and 750-914 operate in a similar manner to generate signals CMPCURLEV100 and CMPALTLEV100. In greater detail, another section of circuit 750-912 compares signals ZICLEV0100 through ZICLEV2100 with signals C7RR0100 through C7RR2100. When there is a true comparison, signal CMPCURLEV100 is forced to a binary ONE. This section is enabled via a NAND gate 750-91202 when either signal ZLEV1VAL000 or signal ZLEV2VAL000 is a binary ZERO.

The comparator circuit 750-914 has two sections enabled by pairs of signals ZCURLEV100, ZLEV1VAL100 and ZCURLEV000, ZLEV2VAL100 as shown. The first section compares level 1 signals ZLEV10100 through ZLEV12100 with round robin signals C7RR0100 through C7RR2100. When there is a true comparison, the output signal at the A=B terminal is forced to a binary ZERO which causes NAND gate 750-91402 to force signal CMPALTLEV100 to a binary ONE.

In a similar fashion, the second section compares level 2 signals ZLEV20100 through ZLEV22100 with round robin signals C7RR0100 through C7RR2100. When there is a true comparison, the output signal is forced to a binary ZERO which causes NAND gate 750-91402 to force signal CMPALTLEV100 to a binary ONE.

DESCRIPTION OF OPERATION

With reference to FIGS. 1 through 7e, the operation of the preferred embodiment of the present invention will now be described.

As mentioned, the cycle arrangement of the preferred embodiment divides a T clock cycle into first and second halves. That is, when signal FHT100 is a binary ONE, this defines the first half of a T clock cycle. When signal FHT100 is a binary ZERO, this defines the second half of a T clock cycle.

During the first half of the T clock cycle, either instructions are fetched or memory data is written into cache store 750-300. In both cases, the level to be accessed is already established. That is, for instructions, the level is stored in either the RICA or RICB instruction address register at the time an IF1 or IF2 command received from processor 700 was executed. For memory data, the level is stored in one of the register locations of transit block buffer 750-102 as a result of the circuits of block 750-520 having detected a miss condition which caused cache 750 to fetch the requested data from memory. During the second half of a T clock cycle, either operand data is accessed from cache or processor data is written into/read from cache in accordance with the results of a directory search.

To illustrate the operation of the preferred embodiment of the present invention, it will be assumed by way of example that processor 700 executes a first branch or transfer instruction causing the switching from a first sequence of instructions to a second sequence of instructions.

It is assumed that the block or sequence of instructions switched to does not reside in cache store 750-300 and therefore must be fetched from main memory 800. Further, each transfer instruction is assumed to be a "GO".

For further information about the transfer instructions, reference may be made to the cited copending patent applications and in the publication "Series 60 (Level 66)/6000 MACRO Assembler Program (GMAP)" by Honeywell Information Systems Inc., Copyright 1977, Order Number DDOBB, Rev. 0.

As indicated herein, processor 700 carries out various operations during I, C and E cycles of operation in executing instructions. This results in the issuance of cache commands by processor 700 to cache unit 750 as described herein.

When processor 700 executes the first transfer or branch instruction, this results in the generation of an IF1 command followed by an IF2 command. It is assumed that prior to the transfer instruction, processor 700 had been fetching instructions from cache store 750-300 using the address and level information contained in RICB register 750-902.

The operation of cache unit 750 in executing the IF1 and IF2 commands now will be described. The IF1 command upon receipt by cache unit 750 is decoded by the decoder circuits 750-922. The decoder circuits 750-922 cause the circuits of block 750-920 to generate signals for loading the alternate instruction address register which is assumed to be RICA with signals corresponding to the incremented value of the address included within the IF1 command. That is, during the first T clock cycle, the address signals from switch 750-530 are incremented by one by circuit 750-913 and loaded into the address bit positions of RICA instruction address register 750-900 in response to $\frac{1}{2}$ T clock signal [CLKHT100 when signal [RICA100 is a binary ONE. The signal [RICA100 is forced to a binary ONE by the circuits 750-920 when signal ENBSTRBA000 of FIG. 7d is forced to a binary ZERO during the first half of the first T clock cycle.

The IF1 command address is also applied as an input to the directory circuits of block 750-502 via ZDAD switch 750-530 for a search cycle of operation. Since the instruction block is not in cache, the circuits of block 750-512 generate the appropriate hit signals RAWHIT000, HITTOTB010 and HITTOIC010 indicative of a miss condition which are applied to sections 750-1, 750-5 and 750-9.

In the case of a miss condition, the circuits of block 750-526 of FIG. 7c switch the directory assignment flip-flop 750-52600 to a binary ONE in response to signal RAWHIT000 which is a binary ONE. The signal ALTHIT000 which is a binary ONE causes the round robin bit signals read out from directory 750-500 to be loaded into register 750-50400. The round robin signals are incremented by one so as to indicate the next level for replacement and are written back into directory 750-500 at the address location.

Also, the round robin signals from register 750-50400 are applied as signals TBRR0100-2100 to transit block buffer 750-102 for subsequent loading therein.

Also, the full-empty bits and high order bits of the IF1 command address (i.e., bits 10-23) are written into directories 750-500 and 750-502 at the location specified by the low order bits of the IF1 address (i.e., bits 24-33). On the next T clock, the FDIRASN flip-flop resets to a binary ZERO completing the directory assignment cycle.

It will be appreciated that due to the miss condition, the decoding of the IF1 command causes the level 1 valid bit and hit/miss positions of the RICA instruction address register 750-900 to be set to a binary ONE and binary ZERO (i.e., hit signal HITTOC7100 is a binary ZERO). Accordingly, the level signals loaded into the level 1 bit positions of RICA instruction address register 750-900 are ignored since the processor 700 is signalled subsequently to pull the block of instructions fetched in response to the IF1 command from the IBUF1 section 750-715 and not from cache store 750-300 (i.e., signalled via the USETBRDY line) as explained herein.

Prior to the switching of the FLDTBVALID flip-flop 750-11414 of FIG. 7a, before the directory assignment cycle, the write address signals FTBPTR0100-1100 from in pointer 750-106 are decoded which results in the writing of the IF1 command address into the next available location of transit block buffer 750-102. That is, on the T clock that completes the directory search, one of the transit block locations of buffer 750-102 is loaded with the IF1 address signals as a consequence of the miss condition. At that time, a corresponding location in the command queue 750-108 is loaded with the necessary control information required for transferring the IF1 command to memory.

Since the block of instructions requested are not in cache store 750-300, signal FRDMISS020 from the control miss flip-flop of section 750-9, not shown, is a binary ZERO while signal FRDMISS120 from the same flip-flop is a binary ONE. As seen from FIG. 7a, signal FRDMISS020 causes the AND/NAND gates 750-11708 through 750-11710 to force the CPU stop signals CPSTOP000-005 to binary ZEROS which is effective to stop or hold up processor operations on the subsequent T clock. At the same time, signals FRDMISS120 and FIF2SEARCH000 and NAND gate 750-11706 to force signal HOLDSEARCH000 to a binary ZERO. This, in turn, causes the AND/NAND gates 750-11714 through 750-11716 to force the internal hold signals [HOLDDMEM000-003 to binary ZEROS. This holds up further operations being performed by cache sections 750-1, 750-5 and 750-9 until it is determined whether the IF1 command was due to a transfer type instruction and whether it was a GO or NO-GO condition.

During the period processor 700 is being held, the above determination is made. Where the IF1 command is due to a transfer instruction which is signalled by processor 700 as a NO-GO, the IF1 command stored in the transit block buffer 750-102 is cancelled as explained herein. In that case, the alternate RICB instruction register 750-902 becomes the current instruction address register and the address contained therein which is not incremented is used to access the next instruction from cache store 750-300 on the next $\frac{1}{2}$ T clock.

Since it is assumed that the IF1 command is due to a transfer instruction which is a transfer GO indicating that the IF2 command is to be executed, the decoding of the IF2 command causes AND/OR gate 750-11402 to force signal SETIF2TIME100 to a binary ONE (i.e., signal NO-GO030 is a binary ONE) forces signal SETIF2-SEARCH100 to a binary ONE. This switches the FIF2SEARCH flip-flop 750-11400 to a binary ONE in the absence of a cancel command signal being received from processor 700 (i.e., signal [CANCEL012 is a binary ONE).

The flip-flop 750-11400 forces signal FIF2-SEARCH000 to a binary ZERO which causes NAND gate 750-11706 to force signal HOLDSEARCH000 to a binary ONE preventing further holding up of the internal operations of cache sections 750-1, 750-5 and 750-9.

At that time, since signal [HOLDMEM000 is a binary ONE on the T clock, the FLDTBVALID flip-flop 750-11414 is set to a binary ONE. That is, in the case of a miss condition, signal HITTOTB010 causes the FLDTBVALID flip-flop 750-11414 of FIG. 7a to switch to a binary ONE on the T clock when the FDIRASN flip-flop is set. On the next T clock, this causes the contents of in pointers 750-106 and 750-108 to be incremented by one in preparation of the next command. The appropriate control flag bits are set and written into the buffer flag section of transit block buffer 750-102.

As seen from FIG. 7a, the decoding of the IF1 command causes AND gate 750-11420 to switch the FIF1ASSIGN flip-flop 750-11418 to a binary ONE state in the case of a miss condition (i.e., signal SETLDTBVALID100 is a binary ONE). In response to the decoding of an IF2 command, the FIF2ASSIGN flip-flop 750-11410 switches to a binary ONE state in response to signal FIF2SEARCH010 being a binary ZERO, or signal EISIF2000 is a binary ZERO (special type operation) resetting IBUF1 locations to ZEROS in the case of a go condition (i.e., NOGO30=1). Additionally, the AND gate 750-11426 switches the FRDQUAD flip-flop 750-11410 to a binary ONE as a consequence of the miss.

The write flag and read quad flag bit positions of flag storage 750-10238 to be forced to binary ONES as a result of signals FORCEBYP000 and FRDQUAD100 being binary ONES. The signal FORCEBYP000 is generated by the AND circuit 750-52630 and is normally a binary ONE. The signal FRDQUAD100 is generated by the FRDQUAD flip-flop when the FLDTBVALID flip-flop 750-11414 switches to a binary ONE.

On the T clock of the directory assignment cycle, the IF1 command is read out from transit block buffer 750-102, in response to out pointer address signals from command queue 750-107, into the RDTS register 750-119 via the ZTBC position of ZDTS switch 750-118. The level signals TBRR0100-2100 are loaded into the addressed transit buffer location on the ½ T clock. The IF1 command is transferred to SIU100 on the DTS lines via switch 750-102 of FIG. 4. The appropriate memory identifier signals are loaded into the RMITS register 750-124 and steering signals into the steering register (not shown). These signals are applied to the MITS and SDTS lines, respectively. For further information regarding the generation and use of steering signals, reference may be made to U.S. Pat. No. 4,006,466.

As mentioned, each transit block location has both an I fetch 1 and I fetch 2 flag flip-flop associated therewith. As seen from FIG. 7a, during the I fetch 1 assignment cycle, the I fetch 1 flag flip-flop corresponding to the location specified by write pointer signals FTBPTR0000-1000 decoded by decoder circuit 750-10601 is set to a binary ONE state. At the same time, the other three I fetch 1 flag flip-flops are reset to binary ZEROS. That is, when the in pointer is pointing to location 0, then signal IN0100 is a binary ONE while signals IN1100-3100 are binary ZEROS. This causes the FIF10 flip-flop to be set to a binary ONE and the FIF11-13 flip-flops to be reset to binary ZEROS. The multiplexer circuit 750-1255 is conditioned by signal FIF1ASSIGN100 to select as outputs the signals IN0100-3100 applied to its position 1 terminals which results in the I fetch 1 flip-flop associated with that location being set to a binary ONE. When signal FIF1ASSIGN100 switches to a binary ZERO, the multiplexer circuit 750-10255 is conditioned to select as outputs the signals HOLD0100-3100 applied to its position 0 terminals. This is effective to hold the I fetch 1 flag flip-flop in a binary ONE state.

The execution of the IF2 command by cache unit 750 is similar to the IF1 command. The IF2 address is applied as an input to the directory circuits of block 750-502 via ZDAD switch 750-530 for a search cycle of operation.

Again, prior to the directory assignment cycle (i.e., when the FLDTBVALID flip-flop 750-11414 is a binary ZERO), the write address signals FTBPTR0100-1100 from in pointer 750-106 are decoded and cause the IF2 command to be written into the next available location of transit block buffer 750-102.

On the next T clock, the FLDTBVALID flip-flop 750-11414 is again set to a binary ONE together with the switching of FDIRASN flip-flop. On the next T clock, the contents of the in pointers 750-106 and 750-108 are incremented by one in preparation of the next command. Also, the appropriate control flag bits are set and written into the buffer flag section of buffer 750-102 in the manner previously described.

During the directory assignment cycle, the level signals from round robin register 750-50400 are incremented by one and written back into directory 750-500. Also, the round robin signals are applied as signals TBRR0100-2100 to transit block buffer 750-102 for subsequent loading therein. Further, the full-empty bits and high order bits of the IF2 address (i.e., bits 10-23) are written into directories 750-500 and 750-502, respectively at the locations specified by the low order bits of IF2 address (i.e., bits 24-30).

Again, due to the miss condition, the decoding of the IF2 command causes the level 2 valid bit and hit/miss positions of the RICA instruction address register 750-900 to be set to a binary ONE and to a binary ZERO, respectively (i.e., hit signal HITTOC7100 is a binary ZERO). Again, the level signals loaded into the level 2 bit positions of RICA instruction address register 750-900 are ignored since processor 700 will pull the block of instructions fetched in response to the IF2 command from the IBUF2 section 750-717 and not from cache store 750-300.

As seen from FIG. 7a, during the I fetch 2 assignment cycle defined by the FIF2ASSIGN flip-flop 750-11410 (i.e., switches to a ONE in response to an IF2 command which resets the IBUF2 locations to ZEROS), the I fetch 2 flag flip-flop corresponding to the location specified by the write pointer signals FTBPTR0000-1000 decoded by circuit 750-10601 is set to a binary ONE state while the other three I fetch 2 flag flip-flops are reset to binary ZEROS. That is, signal FIF2ASSIGN100 conditions multiplexer circuit 750-10256 to select as outputs position 1 signals IN0100-3100. The I fetch 2 flip-flop associated with the location containing the IF2 command is switched to a binary ONE while the remaining three flip-flops are reset to binary ZEROS.

On the T clock of the directory assignment cycle, the IF2 command is read out from the transit block buffer 750-102, in response to out pointer address signals from command queue 750-107 into the RDTS register 750-119 via the ZTBC position of ZDTS switch 750-118. The level signals TBRR0100-2100 are loaded into the addressed transit buffer location on the ½ T clock. The IF2 command is transferred to SIU100 in the same manner as described above.

Referring to FIG. 7a, it is seen that bits 2 and 3 corresponding to signals DMIF2100 and DMIF3100 condition multiplexer circuit 750-10260 to select the pair of I fetch 1 and I fetch 2 flag flip-flops associated with the transit block location storing the IF1 command. The outputs of these flip-flops provide flag signals ZIF1FLG100 and ZIF2FLG100 which are applied to the circuits of block 750-115.

As seen from FIG. 7a, the signals ZIF1FLG100 and ZIF2FLG100 when both binary ONES cause the NAND gates 750-11508 and 750-11509 to force signals [IBUF1100 and [IBUF2100 to binary ONES during the first half of a T clock cycle (i.e., when signal FHT100 is a binary ONE). These signals enable IBUF1 and IBUF2 sections 750-715 and 750-717 for operation. However, at any given time, only one section is enabled (i.e., only one of the signals ZIF1FLG100 and ZIF2FLG100 is a binary ONE).

Now, when the pairs of instruction words of the block are transferred to cache unit 750, bit 1 of the RMIFS line and signals FARDA000 and FDPFS100 are coded to specify which pair (normally even/odd wherein 0=even=words 0, 1 and 1=th odd=words 2, 3) and which word of the pair is being transferred. From FIG. 7a, it is seen that comparator circuit 750-11465 is enabled when signals USETBRDY100 and DATA100 are binary ONES.

Referring to FIG. 7e, it is seen that the states of the signals ZLEV1LOC000 and ZLEV1LOC100 generated by AND/NAND gate 750-92130 in accordance with the setting of the hit/miss bit position of RICA instruction address register 750-900 conditions the AND/OR gate 750-92137 to force signal USETBRDY100 to a binary ONE. This signal, generated by the circuits of block 750-920, indicates that the cache unit 750 is waiting for instructions to be written into the IBUFl section 750-715 of IBUF2 section 750-717.

Additionally, these circuits force signals [ZRIB100 and [ZRIB010 to the appropriate states for indicating which I fetch flag is to be compared (i.e., I fetch 1 signal ZIF1FLG0000 or I fetch 2 flag signal ZIF2FLG000). The signals ZEXT0100 and ZEXT1100 generated from bit positions 8 and 9 of the RICA instruction address register 750-900 by the circuits of block 750-920 are compared with signals MIFS1100 and DATAODD100 for indicating when the instruction word requested is the one that is being received.

When the comparator circuit 750-11465 establishes that the instruction word being written into the IBUF1-/IBUF2 section is the same as the instruction word requested, the circuit 750-11465 forces signal IBUFCMPR000 to a binary ZERO slightly before the occurrence of the ½ T clock. The TBIBUFRDY100 signal is forced to a binary ONE after the occurrence of the ½ T clock when the instruction word is written into the IBUF1/IBUF2 section.

The ENABTBRDY100 signal is forced to a binary ONE state upon completion of the I fetch 1 and I fetch 2 assignment cycle of operation at which time the valid bit positions, in each of the IBUF1 and IBUF2 sections 750-715 and 750-717, are reset to binary ZEROS. Accordingly, signal ENABTBRDY100 prevents false generation of the instruction buffer ready signal IBUFRDY100 by the valid bit positions before they are reset. Since instructions are to be fetched from the instruction buffer and not from cache store 750-300, signal IFETCH-RDY000 is a binary ONE.

Referring to FIG. 7d, it is seen that signals ZEXT0100 and ZEXT1100 condition the different memory chips for simultaneous read out of the contents of a designated one of the pair of locations. When an instruction word is being written into the addressed location, the appropriate valid bit signal read out from that location is forced to a binary ONE (i.e., signal IBUF1V100 or IBUF2V100). This, in turn, results in a corresponding one of NAND gates 750-72230 and 750-72231 forcing signal IBUF1RDY000 or IBUF2-RDY000 to a binary ZERO. Accordingly, NAND gate 750-72232 is operative to force signal TBIBUFRDY100 to a binary ONE.

As mentioned, NAND gate 750-72233 forces signal TBRDY000 to a binary ZERO which causes the NAND gate 750-72234 to force signal IBUFRDY110 to a binary ONE. Also, the requested instruction word is immediately transferred to processor 700.

In greater detail, it will be assumed that the first instruction word received is the even word of the first pair. In response to the signal applied to the ARDA line, the even word of the first pair is loaded into the RDFS register 750-702 on the T clock. On a first ½ T clock, the contents of the RDFS register is written into IBUF1 section at the even location for the pair specified by the states of signals FARDA000, FDPFS100, and RMIFS1100 and the valid bit for that location is set to a binary ONE.

If the processor 700 is waiting for the even instruction word, the circuits of block 750-114 force the IBUFRDY line to a binary ONE. The instruction word specified by signals ZEXT0100 and ZEXT1100 which is contained in the RDFS register 750-720 is selected via the ZDIN switch and applied via position 3 of the ZDI switch 750-312 is clocked into the processor's RBIR register on the T clock while the odd instruction word of the first pair is clocked into RDFS register 750-702. Thereafter, the processor 700 is restarted or released upon the resetting of the FRDMISS flip-flop via the generation of a data recovery signal.

On the second ½ T clock, the contents of the RDFS register 750-702 are written into the odd location for the pair, and the valid bit position is set to a binary ONE. If the processor 700 is waiting for the odd instruction word, the circuits of block 750-114 force the IBUFRDY line to a binary ONE and that word is loaded into the processor's RBIR register on the T clock via the RDSF register 750-702.

The above operations are repeated for the second pair of instruction words. When the odd word of the second pair is written into the IBUF1 section into the location specified by signals FARDA000, FDPFS100, and RMIFS1100, the transfer is complete at which time the transit block valid indicator flag associated with the command is reset to a binary ZERO. When the cache write flag for the command is set to a binary ONE, the instruction words are also written into cache store 750-300 via the RDFSB register 750-712 on the ½ T clock. The remaining instruction words in the block are then pulled from the IBUF1 section via the ZRIB switch and position 3 of the ZIB switch.

In a similar manner, the instruction words of the IF2 block received from main store are written into the IBUF2 section locations and into cache store 750-300 when the cache write flag is set to a binary ONE (normally the case). It will be noted that processor 700 is not held because of the miss condition detected in response to the IF2 command. However, when the processor 700 is held because it pulled all of the instructions from the IF1 block and is waiting for receipt of the IF2 block of instructions, as soon as the requested instruction word is detected as having been written into one of the IBUF2 locations, the processor 700 is released on the subsequent T clock and the requested instruction word is applied to the ZDI bus as explained above. The remaining instruction words are then pulled from the IBUF2 section via the ZIB switch.

From the foregoing, it is seen how the arrangement of the present invention provides for immediate transfer of instruction words thereby improving the performance of processor 700.

It will be appreciated that many changes may be made to the preferred embodiment of the present invention without departing from its teachings. For example, the block size and capacities of the instruction buffer sections may be changed. Further, such sections may be implemented as part of a single storage unit or as separate storage units as disclosed herein. Also, changes in the arrangement by which instruction words are transferred may be made such as having all instruction words transferred via the same path. Other changes will be obvious to those skilled in the art.

While in the accordance with the provisions and statute, there has been illustrated and described the best form of the invention known, certain other changes may be made to the system described without departing from the spirit of the invention as set forth in the appended claims and that in some cases, certain features of the invention may be used to advantage without a corresponding use of other features.

What is claimed is:

1. A cache unit for use with a data processing unit for providing fast access to data and instructions fetched from a main store coupled to said cache unit in response to commands received from said data processing unit, said cache unit comprising:

instruction address register means coupled to said data processing unit, said instruction address register means including a number of bit positions for storing an address in response to a predetermined type of said commands previously received from said data processing unit, said address specifying a next instruction word to be accessed by said data processing unit;

an addressable instruction buffer coupled to said main store and to said instruction address register means, said instruction buffer comprising a number of sections, each section comprising:

a plurality of addressable locations for storing a sequence of instruction words received from said main store, each location including a plurality of bit positions for storing an instruction word and at least one bit position connected to switch from a first state to a second state when an instruction word is being written in said location; and, control means coupled to said instruction address register means, to said processing unit to said main store and to each of said sections of said instruction buffer, said control means being operative in response to a signal corresponding to said second state received from said one bit position of one of said locations specified by said instruction address register means to generate an output signal to said processing unit, said signal indicating that said next instruction word specified by said instruction address register means has been received from said main store and is being written into one of said buffer locations of one of said sections thereby enabling said processing unit to begin immediately the processing of said next instruction specified by said instruction address register means.

2. The cache unit of claim 1 wherein said first and second states correspond to a binary ZERO and a binary ONE respectively.

3. The cache unit of claim 1 wherein said cache unit further includes:

data register means coupled to said main store, and to said instruction buffer, said data register means being connected to apply each of said instruction words received from said main store as an input to said instruction buffer; and, output means coupled to said data register means and to said processing unit, said output means transferring said next instruction word from said data register means to said processing means when detected by said control means as having been received.

4. The cache unit of claim 3 wherein said processing unit includes an instruction register coupled to said output means and wherein said unit further includes timing circuits for applying T clock pulse signals to said data register means, and to said processing unit instruction register, said data register means being conditioned by one of said T clock pulse signals to store said next instruction word and said processing unit instruction register being conditioned by the next T clock pulse signal to store said next instruction word loaded into said data register means.

5. The cache unit of claim 3 wherein said timing circuits couple to each of said sections for applying ½ T clock pulse signals which are 180 degrees out of phase with said T clock pulse signals and wherein each of said sections includes:

a plurality of data input terminals coupled to said data register means; and, a plurality of control terminals coupled to said control means, said control terminals including an enabling input terminal and reset input terminal, said control means being operative in response to a predetermined type of command to apply a signal reset to said reset input terminal of a designated one of said sections for resetting all of said locations to binary ZEROS and said control means being operative in response to signals from said main store indicating transfer of instruction words to apply an enabling signal to said enabling input terminal of said designated one of said sections for writing each of said instruction words into the locations specified by the signals applied to another set of said control terminals in response to said ½ T clock pulse signals.

6. The cache unit of claim 5 wherein said number of sections is two and wherein each of said commands has a command code and an address, said command code of said predetermined type of command being coded to specify the fetching of a first or second sequence of instructions and said address identifying a group of locations within said main store from which said sequence of instructions is to be fetched.

7. The cache unit of claim 6 wherein said control means is operative in response to said predetermined type of command having a command code specifying the fetching of said first sequence of instruction words to apply said signals to said reset input terminal and said enabling input terminal of a first one of said sections for resetting all of said locations to binary ZEROS and for enabling the writing of each of said instruction words of said first sequence respectively.

8. The cache unit of claim 7 wherein said control means is operative in response to said predetermined type of command having a command code specifying the fetching of said second sequence of instruction words to apply said signals to said reset input terminal and said enabling input terminal of a second one of said sections for resetting all of said locations to binary ZEROS and for enabling the writing of each of said instruction words of said second sequence respectively.

9. The cache unit of claim 8 wherein said control terminals further includes:
a set of read address terminals coupled to said control means for receiving address signals from predetermined bit positions of said instruction address register means and wherein said unit further includes:
multiposition switching means having a pair of sets of input terminals, one set being coupled to said first section and the other set being coupled to said second section and a plurality of output terminals coupled to said processing unit, said switching means being connected to be conditioned by said control means to transfer each of the instruction words to said output terminals from one of said sections read out in response to said address signals applied to said set of read address terminals of said one section.

10. The cache unit of claim 6 wherein said cache unit further includes a buffer store organized into a plurality of levels, each level containing a number of blocks of word locations for storing said data and instructions and wherein said instruction address register means further includes:
a first register including said number of bit positions for storing said address, a number of sets of control bit positions for storing indications defining the source of instruction words and a number of sets of level signals for defining the levels of said buffer store from which first and second sequences of instruction words are currently being accessed by said data processing unit; and,
a second register including said number of bit positions for storing an address, said indications and said number of sets of level signals in response to a sequence of said predetermined types of commands.

11. The cache unit of claim 1 wherein said control means includes:
compare circuit means including first and second sets of input terminals and and output terminal, a pair of said first and second sets of input terminals being connected to compare signals for defining when the instruction word requested is the one that is being received from said main store and said compare circuit means being operative upon detecting an identical comparison between the signals applied to said first and second sets of input terminals to generate an output compare signal; and,
instruction buffer ready control means individually coupled to each of said instruction buffer sections and to said compare circuit means, said instruction buffer ready control means being selectively conditioned by said output compare signal and said signal from said one bit position of one of said locations of said one section to generate said output signal.

12. The cache unit of claim 11 wherein another pair of said first and second sets of input terminals are connected to compare signals for designating the section into which said instruction words being received from said main store are to be written.

13. The cache unit of claim 11 wherein one of said pair of said first set of input terminals is connected to receive a memory identifier signal coded to specify which instruction word pair is being transferred and the other one of said pair being connected to receive a signal coded to specify which instruction word of said word pair is being received.

14. The cache unit of claim 13 wherein said unit includes means for coupling said memory identifier signal to said control means and wherein said control means includes gating means coupled to said means and to said instruction buffer, said gating means being operative in response to said memory identifier signal to generate a first write address signal specifying into which half of said plurality of locations of said one section said instruction word is being written.

15. The cache unit of claim 14 wherein said unit further includes gating means coupled to receive control signals from said main store coded to indicate the transfer of a pair of words, said gating means being operative in response to said control signals to generate said signal coded to specify said which instruction word; and,
wherein said control means includes circuit means connected to receive a predetermined one of said control signals for generating a second write address signal specifying into which one of said half of said plurality of locations said instruction word is being written.

16. The cache unit of claim 11 wherein said each section further includes:
a plurality of data input terminals, at least one of said data input terminals being connected to a voltage signal representative of a binary ONE;
a plurality of write address terminals coupled to said control means; and,
said one bit position of the location addressed by the signals applied to said plurality of write address terminals being switched from a binary ZERO to said binary ONE upon said instruction word being written into other ones of said plurality of bit positions of said location.

17. The cache unit of claim 16 wherein said each section further includes:
a plurality of output data terminals at least one of said output data terminals corresponding to said one bit position being coupled to said control means; and,
a plurality of read address terminals coupled to predetermined bit positions of said instruction address register means, said one of said output data terminals applying said binary ONE signal to said control means when an instruction word is being written into the location specified by the address bits contained in said predetermined bit positions applied to said plurality of read address terminals.

18. A cache unit for use with a data processing unit for providing fast access to data and instructions fetched from a main store coupled to said cache unit in response to a plurality of different types of commands received from said data processing unit, said cache unit comprising:
instruction address register means including a number of bit positions for storing an address in response to a first predetermined type of one of said commands previously received from said data processing unit, said address specifying from which a next instruction word is to be accessed by said data processing unit;

an addressable instruction buffer coupled to said main store and to said instruction address register means, said instruction buffer comprising:
- a first section comprising a plurality of addressable locations for storing a first sequence of instruction words received from said main store, each location including a plurality of bit positions for storing an instruction word and at least another bit position for storing a first instruction buffer valid indication for signalling when said instruction word has been written in said location;
- a second section comprising a plurality of locations for storing a second sequence of instruction words received from said main store, each location including a plurality of bit positions for storing an instruction word and at least another bit position for storing a second instruction buffer valid indication for signalling when said instruction word is being written into said location; and,
- control means for controlling the operation of said instruction buffer, said control means being coupled to said instruction address register means, to said first section, to said second section and to said processing unit, said control means comprising:
  - means operative in response to each first and second predetermined types of commands specifying a transfer of a sequence of instructions from said main store to generate reset signals for initializing each of said plurality of locations of said first and second sections respectively to a first state; and,
  - instruction buffer ready control logic means coupled to said instruction buffer for receiving signals corresponding to said first and second instruction valid indications read out from the locations specified by said instruction address register means, to said main store for receiving signals identifying the instruction word being transferred to one of said sections and to said instruction address register means for receiving signals identifying said next instruction within one of said instruction sequences to be accessed by said processing unit, said instruction ready control logic means being operative in response to said signals from said buffer, said instruction address register means and said main store to generate an output signal upon detecting that said next instruction word has been received and is being written into one of the locations of said buffer enabling its immediate transfer to said data processing unit.

19. The cache unit of claim 18 wherein said cache unit further includes:
- a data register coupled to said main store, and to said instruction buffer sections, said data register being connected to apply each of said instruction words received from said main store as an input to said instruction buffer sections; and,
- output means coupled to said data register and to said processing unit, said output means transferring said next instruction word from said data register to said processing means when detected by said control means as having been received.

20. The cache unit of claim 19 wherein said processing unit includes an instruction register coupled to said output means and wherein said unit further includes timing circuits for applying T clock pulse signals to said data register and to said processing unit instruction register, said data register being conditioned by one of said T clock pulse signals to store said next instruction word and said processing unit instruction register being conditioned by the next T clock pulse signal to store said next instruction word from said data register.

21. The cache unit of claim 19 wherein said cache unit further includes a buffer store organized into a plurality of levels, each level containing a number of blocks of word locations for storing said data and instructions and wherein said instruction address register means further includes:
- a first register including said number of bit positions for storing said address, a number of sets of control bit positions for storing indications defining the source of instruction words requested by said processing unit and a number of sets of level signals for defining the levels of said buffer store from which first and second sequences of instruction words are currently being accessed by said data processing unit; and,
- a second register including said number of bit positions for storing an address, said indications and said number of sets of level signals in response to a sequence of said predetermined types of commands.

22. The cache unit of claim 18 wherein said control means further includes:
- compare circuit means including first and second sets of input terminals and an output terminal, a pair of said first and second sets of input terminals being connected to compare signals for defining when the instruction word requested is the one that is being received from said main store and said compare circuit means being operative upon detecting an identical comparison between the signals applied to said first and second sets of input terminals to generate an output compare signal; and,
- said instruction buffer ready control logic means individually coupled to said instruction buffer first and second sections and to said compare circuit means, said instruction buffer ready control logic means being selectively conditioned by said output compare signal and to one of said signals from said another bit positions of one of said locations of a corresponding one of said first and second sections to generate said output signal.

23. The cache unit of claim 22 wherein one of said pair of said first set of input terminals is connected to receive a memory identifier signal coded to specify which instruction word pair is being transferred and the other one of said pair being connected to receive a signal coded to specify which instruction word of said word pair is being received.

24. The cache unit of claim 23 wherein said unit further includes gating means coupled to receive control signals from said main store coded to indicate the transfer of a pair of words, said gating means being operative in response to said control signals to generate said signal coded to specify said which instruction word; and,
- wherein said control means further includes circuit means connected to receive a predetermined one of said control signals for generating a second write address signal specifying into which one of said half of said plurality of locations said instruction word is being written.

25. The cache unit of claim 22 wherein said first and second sections each further includes:
- a plurality of data input terminals, at least one of said data input terminals being connected to a voltage signal representative of a binary ONE;
- a plurality of write address terminals coupled to said control means; and,
- said another bit position of the location addressed by the signals applied to said plurality of write address terminals being switched from a binary ZERO to said binary ONE upon said instruction word being written into other ones of said plurality of bit positions of said location.

26. A cache system for use with a data processing unit for providing fast access to data and instructions fetched from a main store coupled to said cache system, in response to commands from said data processing unit, said cache system comprising:
- an instruction address register including a number of bit positions for storing control information and an address in response to a predetermined one of said commands from said data processing unit, said address specifying a next instruction word to be accessed by said data processing unit;
- a first addressable instruction buffer coupled to said main store and to said instruction address register means, said buffer having a plurality of data input terminals for receiving instruction words from said main store, said first instruction buffer comprising:
  - a plurality of addressable locations for storing a first sequence of said instruction words, each location including a plurality of bit positions for storing an instruction word and at least another bit position for storing a predetermined indication when said instruction word is being written into said location;
- a second addressable instruction buffer coupled to said main store and to said instruction address register means, said buffer having said plurality of data input terminals for receiving said instruction words from said main store, said second buffer comprising:
  - a plurality of addressable locations for storing a second sequence of said instruction words, each location including a plurality of bit positions for storing an instruction word and at least said another bit position for storing said predetermined indication when said instruction word is being written into said location; and,
  - control means coupled to said instruction address register, to said processing unit and individually to said first and second instruction buffers, said control means being operative in response to a signal corresponding to said predetermined indication read out from one of said locations specified by said instruction address register means to generate an output signal to said processing unit, said signal indicating that said instruction word specified by said instruction address register means has been transferred by said main store in response to a predetermined type of one of said commands applied to said cache unit by said data processing unit and is being written into one of said locations of said instruction buffer designated in accordance with the coding of said predetermined type of command.

27. The cache system of claim 26 wherein said first and second buffers further includes:
- a plurality of control terminals coupled to said control means, said control terminals including an enabling input terminal and reset input terminal, said control means being operative in response to a predetermined type of command to apply a signal reset to said reset input terminal of a designated one of said buffers for resetting all of said locations to binary ZEROS and said control means being operative in response to signals from said main store indicating transfer of instruction words to apply an enabling signal to said enabling input terminal of said designated one of said buffers for writing each of said instruction words into the locations specified by the signals applied to another set of said control terminals.

28. The cache system of claim 27 wherein said predetermined type of command is coded to specify the transfer of a first sequence of said instruction words and wherein said control means is operative in response to said predetermined type of command having a command code specifying the fetching of said first sequence of instruction words to apply said signals to said reset input terminal and to said enabling input terminal of said first buffer for resetting all of said locations to binary ZEROS and for enabling the writing of each of said instruction words of said first sequence respectively.

29. The cache unit of claim 27 wherein said control means is operative in response to said predetermined type of command having a command code specifying the fetching of said second sequence of instruction words to apply said signals to said reset input terminal and to said enabling input terminal of a second buffer for resetting all of said locations to binary ZEROS and for enabling the writing of each of said instruction words of said second sequence respectively.

30. The cache system of claim 26 wherein said cache system further includes:
- a data register coupled to said main store, and to said data input terminals of said first and second instruction buffers, said data register being connected to apply each of said instruction words received from said main store as an input to said instruction buffers; and,
- output means coupled to said data register and to said processing unit, said output means transferring said next instruction word from said data register to said processing means upon being received.

31. The cache system of claim 30 wherein said processing unit includes an instruction register coupled to said output means and wherein said system further includes timing circuits for applying T clock pulse signals to said data register, and to said processing unit instruction register, said data register being conditioned by one of said T clock pulse signals to store said next instruction word and said processing unit instruction register being conditioned by the next T clock pulse signal to store said next instruction word from said data register.

32. The cache system of claim 27 wherein said control terminals further includes:
- a set of read address terminals coupled to said control means for receiving address signals from predetermined bit positions of said instruction address register means and wherein said system further includes:
- multiposition switching means having a pair of sets of input terminals, one set being coupled to said first buffer and the other set being coupled to said second buffer and a plurality of output terminals coupled to said processing unit, said switching means being connected to be conditioned by said control means to transfer each of the instruction words to said output terminals from a designated one of said buffers read out in response to said address signals applied to said set of read address terminals of said one buffer.

33. The cache system of claim 26 wherein said cache system further includes a cache store organized into a plurality of levels, each level containing a number of blocks of word locations for storing said data and instructions and wherein said number of bit positions of said instruction address register further includes:

a number of sets of bit positions for storing indications defining the source of instruction words and a number of sets of level signals for defining the levels of said cache store from which first and second sequences of instruction words are currently being accessed by said data processing unit; and, said cache unit further including another register including said number of bit positions for storing an address, said indications and said number of sets of level signals in response to a sequence of said predetermined types of commands.

34. The cache system of claim 26 wherein said control means includes:

a comparator circuit including first and second sets of input terminals and an output terminal, a pair of said first and second sets of input terminals being connected to compare signals for defining when the instruction word requested is the one that is being received from said main store and said compare circuit means being operative upon detecting an identical comparison between the signals applied to said first and second sets of input terminals to generate an output compare signal; and, instruction buffer ready control means individually coupled to each of said instruction buffers and to said comparator circuit, said instruction buffer ready control means being selectively conditioned by said output compare signal and said signal from said another bit position of one of said locations of one of said buffers to generate said output signal.

35. The cache system of claim 34 wherein one of said pair of said first set of input terminals is connected to receive a memory identifier signal coded to specify which instruction word pair is being transferred and the other one of said pair being connected to receive a signal coded to specify which instruction word of said word pair is being received.

36. The cache system of claim 35 wherein said system includes means for coupling said memory identifier signal to said control means and wherein said control means includes gating means coupled to each of said instruction buffers, said gating means being operative in response to said memory identifier signal to generate a first write address signal specifying into which half of said plurality of locations of said one of said buffers said instruction word is being written.

37. The cache system of claim 36 wherein said system further includes gating means coupled to receive control signals from said main store coded to indicate the transfer of a pair of words, said gating means being operative in response to said control signals to generate said signal coded to specify said which instruction word; and, wherein said control means includes circuit means connected to receive a predetermined one of said control signals for generating a second write address signal specifying into which one of said half of said plurality of locations said instruction word is being written.

38. The cache system of claim 34 wherein at least one of said data input terminals of each of said instruction buffers is connected to a voltage signal representative of a binary ONE and said each instruction buffer further including a plurality of write address terminals coupled to said control means, said another bit position of the location addressed by the signals applied to said plurality of write address terminals being switched from a binary ZERO to said binary ONE upon said instruction word being written into other ones of said plurality of bit positions of said location of a designated one of said instruction buffers.

39. The cache system of claim 38 wherein said each instruction buffer further includes:

a plurality of output data terminals at least one of said output data terminals corresponding to said another bit position being coupled to said control means; and, a plurality of read address terminals coupled to predetermined bit positions of said instruction address register, said another of said output data terminals applying said binary ONE signal to said control means when an instruction word is being written into the location specified by the address bits contained in said predetermined bit positions, applied to said plurality of read address terminals.

* * * * *